United States Patent [19]

Kuroda et al.

[11] Patent Number: 5,648,048

[45] Date of Patent: Jul. 15, 1997

[54] WET-TYPE FLUE GAS DESULFURIZATION PLANT

[75] Inventors: Hiroshi Kuroda, Tokyo; Fumito Nakajima, Kure; Masakatsu Nishimura, Kure; Hiroyuki Kaku, Kure; Shigeru Nozawa, Kure; Shigehito Takamoto, Kure; Takanori Nakamoto, Kure; Hirofumi Kikkawa, Kure; Hiroshi Ishizaka, Kure; Atsushi Katagawa, Kure; Mitsuharu Kon, Tokyo; Masayuki Yamamoto, Kure; Kunikatsu Yoshida, Kure, all of Japan

[73] Assignee: Babcock-Hitachi Kabushiki Kaisha, Japan

[21] Appl. No.: 347,487

[22] PCT Filed: Apr. 7, 1994

[86] PCT No.: PCT/JP94/00583

§ 371 Date: Mar. 22, 1995

§ 102(e) Date: Mar. 22, 1995

[87] PCT Pub. No.: WO94/23826

PCT Pub. Date: Oct. 27, 1994

[30] Foreign Application Priority Data

| Apr. 9, 1993 | [JP] | Japan | 5-083656 |
| Nov. 11, 1993 | [JP] | Japan | 5-282569 |
| Dec. 22, 1993 | [JP] | Japan | 5-324264 |
| Dec. 24, 1993 | [JP] | Japan | 5-328824 |

[51] Int. Cl.$^6$ ............................................. B01D 47/06
[52] U.S. Cl. ...................... 422/168; 422/169; 55/223; 55/228
[58] Field of Search ........................ 422/168, 169; 261/16, 17, 87; 55/223, 228, 257.1

[56] References Cited

U.S. PATENT DOCUMENTS

| 3,353,336 | 11/1967 | Caballero | 55/228 |
| 3,795,486 | 3/1974 | Ekman | 55/228 |
| 3,807,145 | 4/1974 | Engalitcheff, Jr. et al. | 55/228 |
| 3,948,608 | 4/1976 | Weir, Jr. | 422/169 |
| 4,049,399 | 9/1977 | Teller | 55/223 |
| 4,343,771 | 8/1982 | Edwards et al. | 422/168 |
| 4,366,132 | 12/1982 | Hölter et al. | 422/169 |
| 4,374,813 | 2/1983 | Chen et al. | 55/228 |
| 4,765,805 | 8/1988 | Wahl et al. | 55/228 |
| 4,865,817 | 9/1989 | Burgess et al. | 422/168 |
| 4,954,148 | 9/1990 | Alexander, Sr. | 55/223 |

FOREIGN PATENT DOCUMENTS

| 51-50282 | 5/1976 | Japan . |
| 227868 | 7/1990 | Japan . |
| 38409 | 1/1991 | Japan . |

*Primary Examiner*—Robert J. Warden
*Assistant Examiner*—E. Leigh Dawson
*Attorney, Agent, or Firm*—Lorusso & Loud

[57] ABSTRACT

An elongated absorber housing, including an inlet duct and an outlet duct, is integrally provided on an upper portion of a circulation tank. The absorber is a self-supporting structure supported by only the circulation tank. At least the furthest upstream spraying stage in a spraying zone in the inlet duct includes spray pipes provided with spray nozzles for spraying an absorbing liquid in a direction cocurrent with gas flow, and at least the furthest downstream spraying stage includes spray nozzles for spraying the absorbing liquid in a direction countercurrent to the gas flow. The absorber is an integral structure in which the upper portion of the circulation tank forms a part of the duct, whereby the absorber is self-supportable and, moreover, is of a simple structure, giving it high strength and eliminating of the need for provision of fitments for supporting the absorber.

32 Claims, 35 Drawing Sheets

WET-TYPE FLUE GAS DESULFURIZATION PLANT

TECHNICAL FIELD

The present invention relates to a wet-type flue gas desulfurization plant, and more particularly, to a wet-type flue gas desulfurization plant having a structure in which an exhaust gas flow path is defined in a direction which is not vertical (which will be referred to as a horizontal desulfurization plant hereinafter).

BACKGROUND ART

The so-called limestone-gypsum wet-type flue gas desulfurization system, which is conventional and well-known, is designed to absorb sulfur oxides (hereinafter referred to as $SO_x$ or $SO_2$) from an exhaust gas by using a calcium compound such as limestone or lime as an absorbent and to convert calcium sulfite, which is a reaction product, into stable gypsum which is recovered as a by-product. A desulfurizing reaction in this limestone-gypsum process is represented by the following reaction formula:

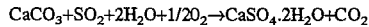

$$CaCO_3 + SO_2 + 2H_2O + 1/2O_2 \rightarrow CaSO_4 \cdot 2H_2O + CO_2$$

FIG. 63 illustrates a conventional flue gas desulfurization plant in which gypsum is recovered as a by-product by using limestone as an absorbent. An exhaust gas 101 is passed into an absorber tower 102 and brought into contact with a circulated slurry in a spraying zone 103 to become cooled, dedusted and desulfurized. Thereafter, the resulting gas is subjected to mist removal in a demister 104 and then discharged from the absorber tower 102.

On the other hand, a limestone slurry 117, which is used as the absorbent is supplied to a circulating tank 105 by a limestone slurry pump 110 and is then fed to the spraying zone 103 within the absorber tower 102 through a plurality of spray nozzles, fed by a circulating pump 108. The spray comes into contact with the exhaust gas 101, whereby the sulfur oxides in the exhaust gas 101 are absorbed. Then, the resulting slurry is returned into the circulation tank 105 for recirculation. The slurry 117, after absorption of $SO_x$, is passed into a thickener 112 by a withdrawing pump 109, where it is thickened, and then the thickened slurry is stored in a gypsum slurry tank 113 and finally dehydrated by a centrifugal separator 115, whereby gypsum 116 in the form of a powder is recovered. A supernatant liquid 118 recovered in the thickener 112 and the centrifugal separator 115 is recirculated and reused for adjustment of scrubbing water and the limestone slurry within the system.

However, the prior art technique suffers from the disadvantage that the sprayed liquid slurry 117 is brought into contact with the exhaust gas flowing in a vertical direction in the absorber tower 102 or in the spraying zone 103 and hence, to insure a proper contact time, the height of the absorber tower 102 is increased, resulting in an increase in size and a complication in structure such as an increased length of upstream and downstream air ducts. Another disadvantage is that the capacity of the circulation pump 108 must be increased to match the increase in height of the absorber tower 102, resulting in an increased consumption of power. As the ducts become more complicated, the nonuniformity of gas flow within the absorber tower 102 is increased, resulting in a reduction in desulfurizing performance.

A system has been also proposed in which an absorbent circulating tank (pit) is connected to a horizontal absorber which is designed to spray the absorbing liquid horizontally. However, this system is not preferred, because the mist does not freely separate out, and the level of liquid in the bottom of the absorber tower varies, due to variations in amount of liquid sprayed and amount of exhaust gas, and thereby influences the gas flow. In addition, a system of a type in which an absorber and a circulating tank are separated, resulting in a necessarily increased length of the tower, has been proposed.

Accordingly, it is an object of the present invention to provide a wet-type flue gas desulfurization plant in which the length of the tower is reduced, and the apparatus is simplified.

It is another object of the present invention to provide a wet-type flue gas desulfurization plant which is self-supportable and in which the consumption of power is reduced.

It is a further object of the present invention to provide a desulfurizing plant which is economic and capable of achieving high desulfurizing performance.

It is a yet further object of the present invention to provide a wet-type flue gas desulfurization plant having high reliability, in which the absorber is compact, but still the amount of mist scattered can be reduced.

Further, it is another object of the present invention to provide a wet-type flue gas desulfurization plant in which the nonuniformity of exhaust gas flow is prevented, and spray pipes are firmly supported.

It is a further object of the present invention to provide a wet-type flue gas desulfurization plant in which performance of operation is enhanced by quality control of the absorbing liquid sprayed for contact with an exhaust gas, in which the quality of the produced gypsum is maintained, and in which the desulfurizing performance is enhanced.

It is a yet further object of the present invention to reduce the pressure drop within the absorber by efficiently removing the scattered mist and to reduce the size of the absorber to provide a high desulfurizing performance at reduced costs of equipment and operation.

DISCLOSURE OF THE INVENTION

To achieve the above objects, according to a first aspect of the present invention, there is provided a wet-type flue gas desulfurization plant comprising an absorber tower having a gas flow path defined therein in a direction which is not vertical and having an inlet duct for permitting admission of an exhaust gas containing sulfur oxides. Spray heads spray an absorbing liquid into a spraying zone for contact with the exhaust gas, and an outlet duct is provided with a demister for removing scattered mist. A circulation tank stores the absorbing liquid collected in the absorber tower and is adapted to oxidize sulfur oxides in the absorbing liquid with air, while the absorbing liquid is being stored. A circulating system recirculates the stored absorbing liquid to a spraying zone in the absorber tower. The absorber tower, including the inlet and outlet ducts, is integral with the circulation tank and is a self-supporting structure, i.e. supported by only the circulation tank. Alternatively, the absorber tower may be a structure in which at least an uppermost-stream spray stage of the spray zone in the inlet duct includes spray nozzles for spraying the absorbing liquid in a direction cocurrent with the exhaust gas flow, and at least a downstream spray stage which includes spray nozzles for spraying the absorbing liquid countercurrent to the exhaust gas flow.

The flue gas desulfurization plant according to the present invention features an absorber tower structure wherein the tower duct passes through an upper portion of the circulation tank, i.e., an integral structure in which the upper portion of the circulation tank forms a part of the tower duct (absorber housing), whereby the absorber is self-supportable and moreover, is of a simple structure, leading to high strength and elimination of the need for provision of fitments for supporting the tower duct portion.

In the flue gas desulfurizing plant having such structure, it is important to have a flue gas desulfurizing effect at least equivalent to that of the prior art flue gas desulfurizing plant having a vertical absorber tower. It can be easily appreciated that, in order to avoid the disadvantage associated with the prior art flue gas desulfurizing plant having the vertical absorber tower, i.e., the increase in height of the absorber tower, the absorber tower is constructed horizontal, so that the direction of gas flow is restricted to the horizontal, and the absorbing liquid is sprayed toward the gas flow, thereby permitting a reduction in length of the absorber.

However, if the absorbing liquid is sprayed in the horizontal direction, when the flow velocity of the exhaust gas is relatively low, the gas-liquid contact efficiency is reduced due to dropping of the sprayed droplets under the influence of gravity. When the flow velocity of the exhaust gas is relatively higher, on the other hand, the amount of sprayed droplets entrained by the exhaust gas is increased, thereby not only causing corrosion or wearing of downstream portions, but also increasing power utility consumption due to a loss of the absorbing liquid, and causing a failure of operation in the worst case. It has been generally difficult to guide the exhaust gas into the absorber tower in the horizontal direction or in a direction which is not vertical, so that the exhaust gas is brought into gas-liquid contact with the sprayed droplets.

However, from results of studies which will be described hereinafter, it has been ascertained by the present inventors that high desulfurizing and dedusting performances are obtained even with an absorber tower in which the gas flow is not vertical under particular conditions.

The contact time with the sprayed absorbing liquid can be prolonged by permitting the exhaust gas to flow in a direction which is at least not vertical, and most desirably horizontal, and moreover setting the horizontal length of the exhaust gas flow path at a large value. Consequently, it is possible to shorten the absorber tower, to simplify the duct work and to reduce the nonuniformity of the gas flow.

At the furthest upstream absorbing-liquid spraying stage, a draw-in effect (an ejector effect) with less nonuniformity of the exhaust gas is provided by spraying the absorbing liquid in the same flow direction as the exhaust gas, i.e. cocurrently in the "parallel-flow direction". In addition, even if the absorbing liquid is sprayed in the absence of an exhaust gas flow, the liquid does not enter the upstream duct in the plant and, hence, special provision for corrosion is not needed in the plant.

At the furthest downstream absorbing-liquid spraying stage, the absorbing liquid is brought into gas-liquid contact with sulfur oxides or dust in the exhaust gas, at a high relative velocity by spraying the absorbing liquid in the direction opposing (countercurrent) the exhaust gas flow. Therefore, not only a high removal efficiency is provided, but also the mist entrained with the exhaust gas in the upstream side is collected, leading to a reduction in amount of mist entering downstream. In order to reduce the deviation of spraying due to a stagger of vertical locations at any spraying stage (a head difference), it is desirable that the spray pipes are disposed laterally (i.e., horizontally).

The absorber tower and the circulation tank permitting free fall of sprayed droplets are of an integral structure, so that the contact time of droplets of the sprayed absorbing liquid with the exhaust gas can be prolonged. The bottom of the absorber tower is inclined so as to cause solids in the absorbing liquid to flow into the absorbent circulation tank without being accumulated.

In the above-described plant, a means for recovering the sprayed absorbing liquid and guiding the latter into the circulation tank may be provided on the inclined portion of the bottom of the inlet duct. This means for recovering the sprayed absorbing liquid and guiding the latter into the circulation tank may be of a structure adapted to guide the recovered liquid to drop in a direction tangential to a horizontal section of a peripheral wall of the circulation tank, and more specifically, may be comprised of a weir or a groove provided on or in the inclined portion of the bottom of the inlet duct.

In the prior art vertical absorber tower, it is necessary to provide a plurality of agitators in order to uniformly disperse oxidizing-air within the circulation tank. Thus, a power cost for agitation is introduced. On the contrary, according to the present invention, particularly with the horizontal desulfurizing plant with the inlet duct bottom inclined, the sprayed absorbing liquid is recovered in or on the inclined portion of the bottom of the inlet duct, where it is collected by the sprayed absorbing liquid recovering/guiding means (i.e., the weir or the groove) and then delivered into the circulation tank.

The disposition of the weir or the groove on or in the inclined portion of the inlet duct bottom at a location displaced from the center ensures that the liquid dropped from the inclined portion into the circulation tank drops in a direction tangential to the horizontal section of the peripheral wall of the circulation tank. The amount of liquid thus collected in the circulation tank is a thousand tons/hr in the flue gas desulfurizing plant installed in association with a boiler in a 200 MW scale steam power station, and if this liquid is successively collected and dropped into the circulation tank, the liquid in the circulation tank is circulated. Thus, the liquid in the circulation tank is circulated without use of any agitators by the energy of this falling liquid. This makes it possible to eliminate agitators for dispersing the air into the liquid in the circulation tank and agitators for agitating the liquid in the circulation tank. Because the liquid in the circulation tank is circulated without use of agitators, the produced gypsum particles cannot be accumulated on the bottom of the circulation tank due to the circulation of the liquid. In this manner, the agitators which have been provided in the prior art can be eliminated, leading to a simplification in structure of the circulation tank and to a reduction in power cost.

Further, the amount of air supplied into the circulation tank can be reduced by supplying air to the liquid collected into the weir or the groove in the inclined portion of the inlet duct bottom or to a portion near the liquid surface in the circulation tank where the liquid moves violently.

The horizontal wet-type flue gas desulfurizing plant according to the present invention may be of a construction such that the cross-sectional area perpendicular to the gas flow, of the inlet duct, including spray pipes provided with spray nozzles disposed at a plurality of stages in a gas flow direction, is stepwise increased in the gas flow direction, and the sectional area, perpendicular to the gas flow, of the furthest downstream portion of the inlet duct is smaller than the cross-sectional area, perpendicular to the gas flow, of the gas flow path located between the inlet and outlet ducts and above the circulation tank.

Since the multiple-stage spray nozzles are disposed in the inlet duct, the density of the absorbing liquid sprayed from the spray nozzles is higher downstream of the inlet duct. By stepwise increasing the sectional area perpendicular to the gas flow of the inlet duct in the gas flow direction, for example, by forming the inlet duct bottom surface as an inclined surface, the density of the sprayed absorbing liquid in the gas flow direction within the inlet duct can be made uniform, so that the desulfurization of the exhaust gas is advanced equally in each duct area.

The efficiency of absorption of $SO_x$ in the exhaust gas increases, as the gas flow velocity in the inlet duct is increased. In order to increase the gas flow velocity in the inlet duct, it is necessary to decrease the sectional area of the inlet duct. If the gas is passed toward the outlet duct while remaining at the flow velocity within the inlet duct, the load for collecting the mist in the demister is increased. Therefore, the cross-sectional area, perpendicular to the gas flow, of the furthest downstream portion of the inlet duct is smaller than the cross-sectional area, perpendicular to the gas flow, of the gas flow path located between the inlet and outlet ducts and above the circulation tank, thereby permitting the gas flow velocity to be reduced, so that the mist entrained in the gas flow may freely drop toward the circulation tank without being directed toward the demister. In this case, when the bottom surface of the inlet duct is formed as an inclined surface, the lowermost stage spray nozzles of the spray pipes, mounted in a plurality of stages in the gas flow direction in the inlet duct, are disposed in substantially the same horizontal plane, so that they are not immersed in the sprayed and collected absorbing liquid flowing along the bottom surface of the inlet duct.

In order to prevent an increase in mist collecting load on the demister due to an increase in gas flow velocity in the inlet duct, and in order to prolong the time of contact of the sprayed droplets of absorbing liquid with the exhaust gas to the utmost, to insure an efficient contact and to reduce the amount of mist entering the downstream demister, a resisting means for renewing the surfaces of the sprayed absorbing liquid droplets and scattered mist may be disposed between the spray stages and the demister.

In the desulfurization plant according to the present invention, the exhaust gas passed through the spraying zone flows in a downstream direction while entraining the mist, and passes through a liquid film formed by the scattered mist particles colliding against the resisting means, at its opening, located upstream of the demister. When the exhaust gas passes through the liquid film, a target degree of desulfurization is achieved. Within the absorber tower in the desulfurization plant according to the present invention, the surface (boundary film) of the sprayed absorbing liquid droplets entrained br the exhaust gas in an absorber tower is not renewed because of low velocity of the droplets relative to the exhaust gas and because it has already reached saturation with $SO_x$, thus lowering desulfurizing performance, even if there is, for example, sufficient contact space between the spraying zone and the demister. However, the placement of resisting means, such as a porous plate, between the spraying zone and the demister ensures not only that the scattered mist and sprayed droplets collide against the resisting means and are thereby collected, but also that the liquid film is renewed by passage of the exhaust gas through the liquid film formed on the resisting means by the collected mist and droplets, thereby promoting efficiency of the desulfurizing reaction.

It should be noted that the resisting means is not limited to a porous plate, and that any other means may be used if it is capable of renewing the surface of the sprayed absorbing liquid mist and droplets.

The mist entrained by the exhaust gas, after being cooled, dusted and desulfurized, is recovered in a mist catching zone for recirculation, and is thus prevented from entering the downstream side of absorber tower, thereby preventing corrosion of the downstream components.

The resisting means for renewing the surface of the sprayed droplets may be (1) a weir formed with its tip end turned upstream on the duct sidewall and bottom, in front of the furthest upstream demister, (2) a plurality of plates disposed at distances defining flow paths in the gas flow direction, or (3) a porous plate. When a plurality of plates is used, each plate may have folds. When a porous plate is used, a flat porous plate may be disposed to present a flat surface in a direction perpendicular to the gas flow, or a plurality of flat porous plates may be used with each presenting a flat surface in a direction parallel to the gas flow.

The resisting means may be disposed in the exhaust gas flow path downstream of the inlet duct and upstream of the circulation tank, or may be disposed in the exhaust gas flow path downstream of the circulation tank and upstream of the demister in the outlet duct.

If the duct bottom having the resisting means disposed thereon has a bottom surface inclined downwardly toward the circulation tank, and a liquid-withdrawing slit is provided in the resisting means where it connects to the bottom surface, the mists and droplets collected on the resisting means easily fall into the circulation tank. A resisting means washing system using supernatant water produced in the gypsum recovery equipment or supplemented water may be provided.

The desulfurizing plant according to the present invention may be of a construction in which at least two demisters are provided in the outlet duct, so that the vertical sectional area of the furthest upstream demister is larger than the vertical sectional area of the outlet duct, and a weir is mounted on the duct wall surface upstream of the furthest upstream demister. Thus, when the gas flow velocity is increased, the gas flows along the duct wall surface in a crawl and therefore, a large amount of the scattered mist reaches the demister. If the mist collected along the duct wall surface is removed by the duct weir located in front of the furthest upstream demister, the performance of the demisters is not reduced, even as the mist load on the demisters is increased. Collected-mist recovering pipes leading to the circulation tank are provided in a groove provided in the duct end entering the demister for ensuring that the vertical sectional area of the furthest upstream demister is larger than the vertical sectional area of the outlet duct. The demister washing system ensures that the washing water for the downstream demister can be utilized as washing water for the upstream demister, and the washing water used in the furthest upstream demister can be returned into the circulation tank.

In the horizontal desulfurizing plant according to the present invention, spray nozzles of spray pipes may be placed on the wall surface of the inlet duct, a gas blow-through preventing means may be provided on a wall surface portion located in a region which is free from the sprayed droplets and created between the spray nozzles.

With the above construction, the structure is such that the spray pipes and supports for the pipes are not located within the inlet duct. Therefore, the sprayed droplets remain for a long time in the absorber tower without collecting on these inserts to stop absorbing $SO_2$ gas, and thus, the sprayed droplets can effectively contribute to the desulfurizing reaction.

The inner wall surface of the inlet duct can be effectively utilized in that the spray nozzles are mounted on the wall surface of the inlet duct. Depending upon the type and flow rate of the exhaust gas introduced into the inlet duct, the concentration of sulfur oxides contained in the exhaust gas and the like, the amount of absorbing liquid sprayed can be varied for each group of the spray nozzles separately disposed on the sidewalls and ceiling wall, or the amount of absorbing liquid sprayed can be varied for each particular portion of the sidewall surface or the ceiling wall surface.

In the prior art technique, when the spray pipes and supports for the pipes are placed within the absorber tower, they are made of a high-quality material in order to resist corrosion because the absorbing liquid used is strongly acidic. On the contrary, according to the present invention, the pipes and the like are placed outside the absorber tower and therefore, it is not necessary to employ such a high-quality material.

The chance of contact of the sprayed absorbing liquid with the exhaust gas is increased by the gas blow-through preventing means which is provided on the wall surface portion located in the region which is free from the sprayed droplets and which is created between the spray nozzles.

The gas blow-through preventing means may be comprised of, for example, guide plates of a shape extending along the angle of spray of the absorbing liquid from the spray nozzles, or recessed grooves defined by an inward depression in the inner wall surface of the inlet duct extending in the gas flow direction. When the recessed grooves are used, the spray nozzles may be mounted on upstream inclined wall surfaces of the recessed grooves. If so, the blow-through of the gas can be effectively prevented.

In the horizontal desulfurizing plant according to the present invention, spray nozzles may be provided on the ceiling portion of the circulation tank for spraying the absorbing liquid toward the liquid surface in the circulation tank, so that the scattered mist is removed by spraying the absorbing liquid from the spray nozzles. Thus, if the sprayed droplets are ejected toward the liquid surface in the circulation tank, because of a larger specific gravity as compared with the exhaust gas, the scattered mist contained in the exhaust gas travels straight under an inertial force and, hence, collides against the droplets sprayed from the ceiling and travelling toward the liquid surface in the circulation tank and, as a result, is collected.

Alternatively, a partition plate may be provided on the ceiling surface above the circulation tank, so that the gas is caused to flow in the vicinity of the liquid surface in the circulation tank, and spray nozzles for spraying the absorbing liquid may be provided at a lower end of the partition plate. Alternatively, the ceiling surface itself above the circulation tank may be made to project downwardly, so that the flow of the exhaust gas is temporarily diverted to near the liquid surface in the circulation tank, and spray nozzles may be provided on the projecting portion of the ceiling. With either construction, the effect of collection of the scattered mist by the demister is likewise increased.

In the horizontal desulfurizing plant according to the present invention, all the spray pipes provided in the spraying zone in the inlet duct may be pipes supported at their opposite ends by the sidewalls of the inlet duct to horizontally traverse the gas flow path in the inlet duct for introducing the absorbing liquid from the opposite ends.

The horizontal disposition of the spray pipes supported on the opposite sidewalls of the inlet duct ensures that the resistance to the exhaust gas by the pipes is varied equally from the horizontally opposite sides toward the central portion and therefore, uniformity of the exhaust gas flow can be increased and, as a result, the gas-liquid contact is uniformly achieved, leading to an enhanced desulfurizing performance. In addition, the same amount of the absorbing liquid can be supplied through the opposite sidewalls into the horizontally disposed spray pipes and hence, can be supplied symmetrically in equal proportions from the horizontally opposite sides to the central portion into the spray pipes toward the respective spray nozzles.

When the spray pipes are disposed horizontally within the inlet duct, the sectional area of the spray pipes is stepwise reduced from a portion adjacent the sidewall of the inlet duct toward the center of the inlet duct. Thus, even if the flow rate of the absorbing liquid is gradually reduced from the sidewall surface of the spray zone toward the center thereof, the flow velocity of the slurry (absorbing liquid) can be maintained substantially constant at all points within the spray pipes. By maintaining the flow velocity of the slurry substantially constant at every place within the spray pipes in this manner, solids can be prevented from settling and accumulating within the spray pipes. The spray pipes may be of a configuration such that the inside diameter at the central portion in the inlet duct is smaller than that at the outer portion, and a support may be provided at the central portion in the inlet duct at which the inside diameter of the pipe is smaller, thereby providing mechanical strength to the central portion having a smaller sectional area. The support acts as a resisting member for the exhaust gas flow in the substantially central portion of the spray pipe, so that the exhaust gas flow in the zone of the absorber tower with the spray pipes disposed therein is not disturbed, and the gas flow velocity is uniform. In addition, when the spray pipes are disposed horizontally within the inlet duct, the spray nozzles may be placed on the respective undersides of the spray pipes. This ensures that when the spraying of the absorbing liquid is stopped the absorbing liquid remaining in the pipe is discharged by gravity, and hence, solids in the absorbing liquid can be prevented from settling and accumulating in the spray pipe, thereby preventing any problem of clogging of the spray pipe.

In the horizontal desulfurizing plant according to the present invention, a gas flow path may be defined for causing the direction of the exhaust gas flowing from the inlet duct toward the outlet duct to be changed downwardly between the inlet and outlet ducts. If so, the mist load on the demister is not increased.

More specifically, (1) a gas flow direction changing obstacle (which may be an inclined plate for turning the gas flow downwardly, or a flat plate like baffle hung down from the ceiling portion) may be placed on the ceiling wall surface upstream of the demister in the outlet duct, so that the entire gas flow path is curved above the circulation tank and turned again upwardly at the inlet to the mist collecting zone. With this construction, the gas flow is once turned downwardly above the circulation tank and then turned again upwardly and, therefore, the scattered mist separates from the gas flow and drops into the absorbing liquid in the circulation tank. In this manner, the amount of scattered mist reaching the demister is considerably reduced. If the inclination angle of the inclined plate with respect to the horizontal direction or the length of baffle plate projecting into the gas flow path is set within a certain range, the mist cannot deposit on the insert (the inclined plate or the baffle plate).

The predetermined angle, with respect to the horizontal direction, of the inclined plate mounted on the ceiling portion of the circulation tank, for changing the direction of the gas flow downwardly, may be larger than the inclination angle of the bottom surface of the inlet duct adjacent the circulation tank, thereby enabling the direction of the gas flow to be turned toward the circulation tank. In this case, unless the vertical sectional area of an opening for the gas flow path under the gas flow changing obstacle is larger than at least the vertical sectional area of the inlet duct, the gas flow rate is not effectively reduced.

(2) A louver-type insert may be placed on the duct lower wall surface in front of the demister, or collision plates having a recessed section (e.g., U- or V-shaped section) opening toward the upstream gas flow may be disposed at a plurality of stages, e.g., two or more stages, in a zigzag arrangement and in a lattice fashion along the entire gas flow path to traverse the outlet duct upstream of the demister. Thus, the amount of mist scattered can be reduced without change of the structure of the absorber tower. With the collision plates having the recessed section, an increase in pressure drop can be prevented by the zigzag arrangement of the collision plates. If the back surface of the louvre-type insert or the collision plate having the recessed section, as viewed in the gas flow direction, is washed with water, there is no accumulation of dried slurry thereon. With the louver-type insert, by setting the angle of the louver in a range of from about 5 degree to 40 degrees, with respect to the horizontal, the front and back of the insert are always wetted by the scattered mist and, hence, the scattered mist can be removed without any problem of accumulation.

(3) Further, to improve the slurry spraying method, the slurry spraying direction of the spray nozzles near the wall surface of the absorber tower may be turned inwardly of the absorber tower, i.e., in a direction away from the wall surface of the absorber tower. This makes it possible to prevent the mist of the sprayed slurry from colliding against the wall surface of the absorber tower and thereby becoming reentrained.

(4) If the slurry spraying direction of the spray nozzles is downward with respect to the horizontal, the amount of mist scattered can be reduced. Further, the wall surface of the absorber tower above the circulation tank may be inclined so that the gas flow flows upwardly after flowing downwardly toward the circulation tank. This ensures that the scattered mist separates from the gas flow and drops onto the liquid surface of the slurry within the circulation tank and thus, the amount of scattered mist reaching the demister can be considerably reduced.

The amount of mist entering the demister can be considerably reduced by adoption of any of the above-described features (1) to (4). A reduction in desulfurizing performance and an increase in pressure drop are avoided.

The horizontal desulfurizing plant according to the present invention further include a means for removing the absorbing liquid from the circulation tank and neutralizing it with limestone having a particle size which is greater than that of gypsum obtained by neutralizing the absorbing liquid with limestone and a means for recirculating the neutralized liquid to the spraying zone in the inlet duct.

If the concentration of the gypsum particles in the extracted absorbing liquid is high, a separator for separating those particles from the neutralized absorbing liquid may be provided to allow recirculating of the absorbing liquid with small amounts of gypsum particles to the spraying zone in the inlet duct.

Main reactions in the desulfurizing plant according to the present invention are as follows:

The absorbing liquid (containing water as a primary component) absorbs $SO_2$ from the exhaust gas to produce $H_2SO_3$ which is oxidized by air to form $H_2SO_4$ (dilute sulfuric acid). $H_2SO_4$ is neutralized with limestone ($CaCO_3$) to produce gypsum ($CaSO_4 \cdot 2H_2O$).

| | |
|---|---|
| (Absorbing reaction) | $H_2O + SO_2 = H_2SO_3$ |
| (Oxidizing reaction) | $H_2SO_3 + \frac{1}{2} O_2 = H_2SO_4$ |
| (Neutralizing reaction) | $H_2SO_4 + CaCO_3 + H_2O =$ $CaSO_4 \cdot 2H_2O + CO2$ |

According to the present invention, in blowing air into the circulation tank to oxidize sulfurous acid, the absorbing liquid has a pH value as low as 2 to 3 (in the other technique the pH is 4 to 5). Therefore, a high oxidation rate is achieved, and a smaller amount of air and a smaller amount of power for the agitators for finely dispersing the oxidizing air are required. In addition, coarse limestone is used and hence, it is not necessary to pulverize the limestone. The limestone has a large particle size (of 0.5 mm or more and preferably 1.0 mm or more) and hence, can be easily separated from the smaller size gypsum particles (usually having a particle size of 20 to 100 μm). Thus, even if a large amount of limestone is used, the quality of gypsum is not reduced, and the desulfurizing performance is enhanced. In this case, the absorbing liquid may be agitated by the agitators, and/or bubbled with air in order to prevent the gypsum particles from forming scale around the limestone particles. The absorbing reaction may be promoted by controlling the amount of oxidizing air introduced, so that the concentration of dissolved oxygen in the absorbing liquid after oxidized by air in the neutralizing device and so on is 1 ppm or more.

DESCRIPTION OF THE PREFERRED EMBODIMENTS

The present invention will now be described in detail by way of embodiments in connection with the accompanying drawings. However, the present invention is not intended to be limited to the described embodiments.

First Embodiment

Figure 1:
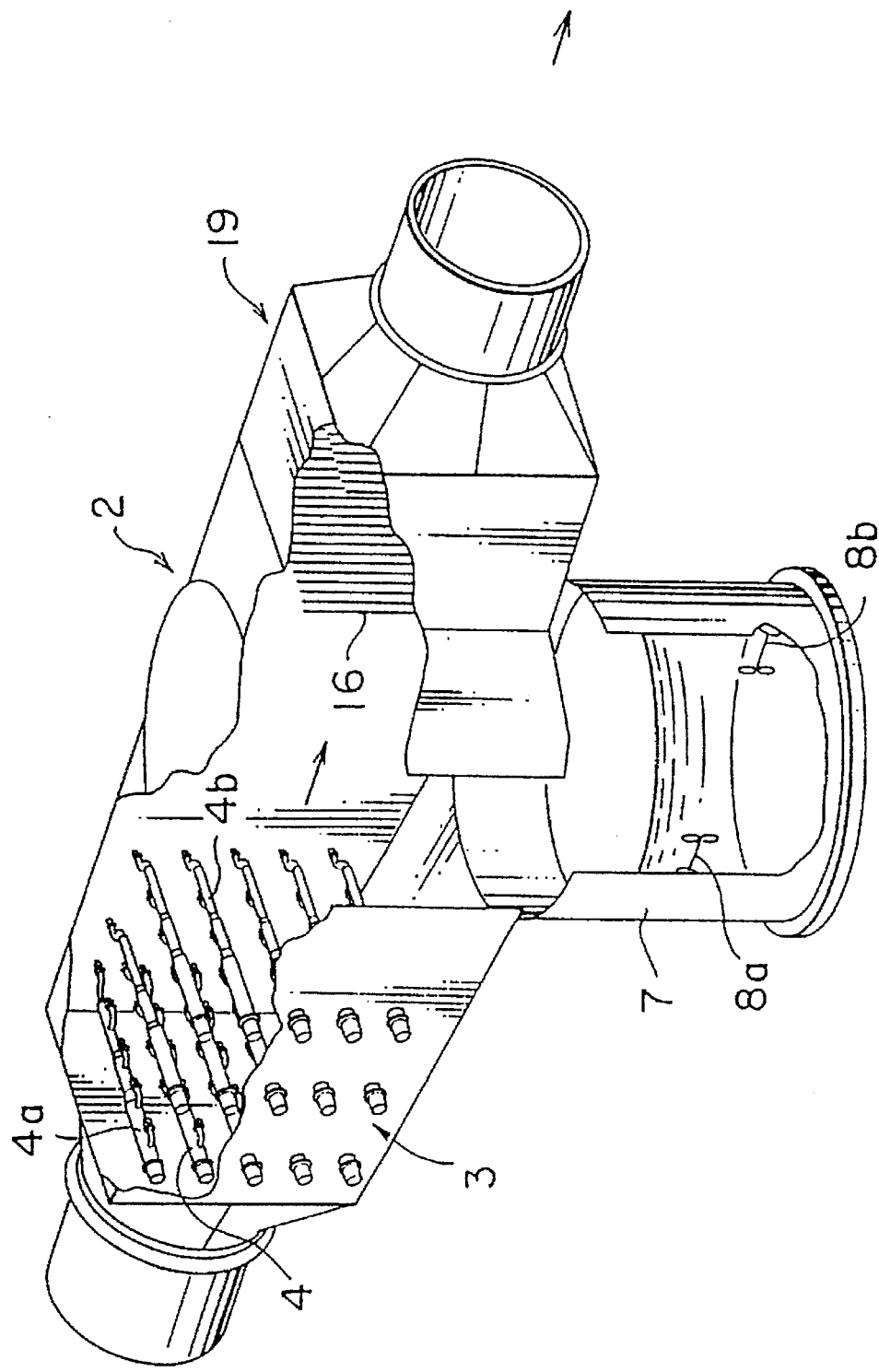
FIG. 1 is a schematic perspective view of a wet-type flue gas desulfurizing plant according to a first embodiment of the present invention.
Figure 2:
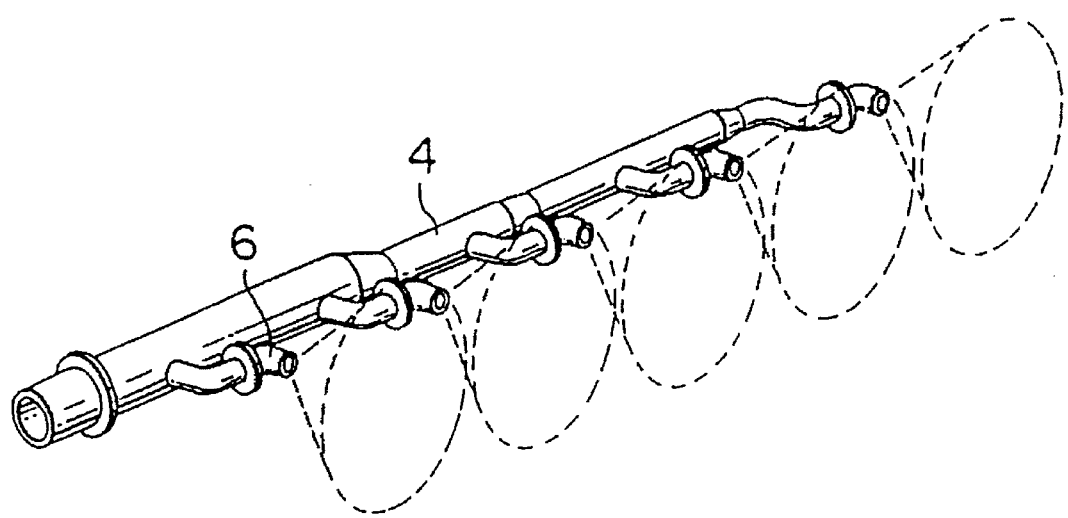
FIG. 2 is an enlarged view of a spray pipe shown in FIG. 1.
Figure 3:
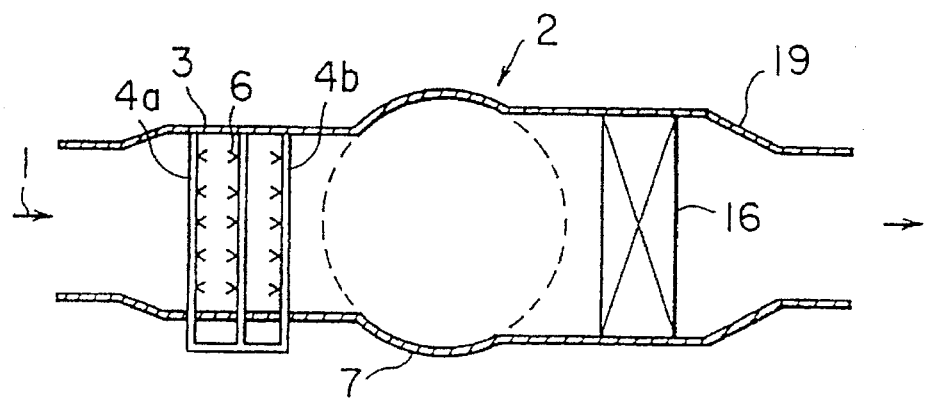
FIG. 3 is a schematic horizontal cross-sectional view of the upper portion of the wet-type flue gas desulfurizing plant according to the first embodiment of FIG. 1.
Figure 4:
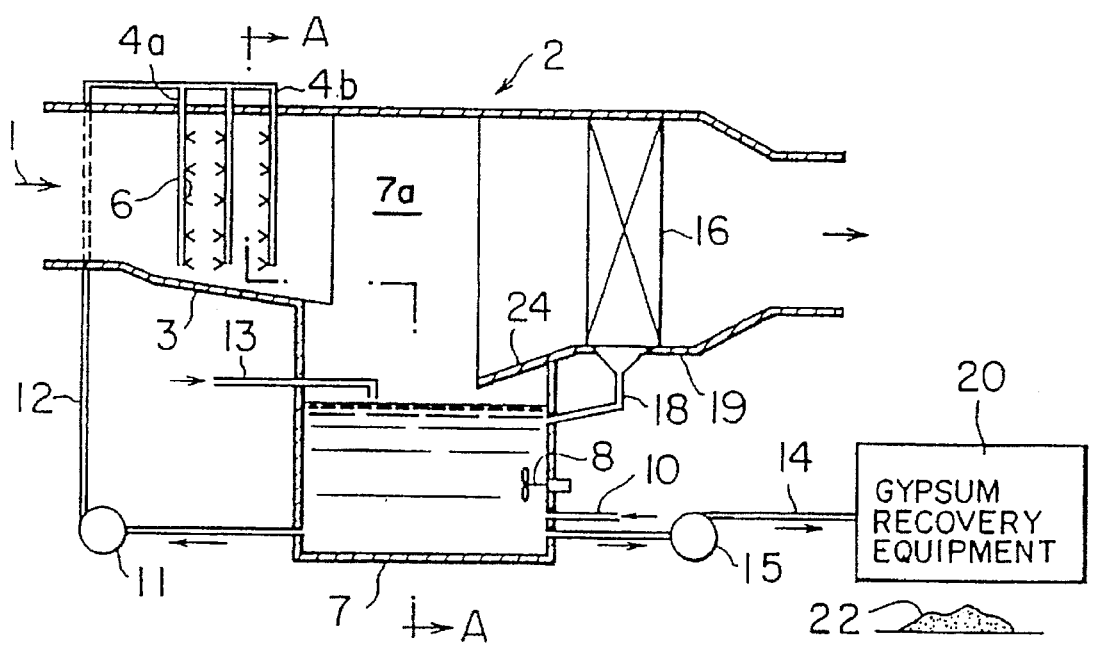
FIG. 4 is a schematic vertical cross-sectional view of the wet-type flue gas desulfurizing plant shown in FIG. 3 and surrounding devices.

FIGS. 1 to 5 illustrate a wet-type flue gas desulfurizing plant according to one embodiment of the present invention. As shown in FIG. 1, spray pipes 4 are disposed in a plurality of stages along the gas flow path and in a plurality of rows perpendicular to the gas flow path, horizontally extending across the inside of an inlet duct 3. Inlet duct 3 feeds an exhaust gas 1 to an absorber 2 which has an exhaust gas flow path extending in a horizontal direction or in a direction which is at least not vertical. The number of the stages of spray pipes 4 and the number of spray nozzles disposed on the spray pipes 4 are not particularly limited, and a suitable number may be selected. In FIG. 1, furthest upstream spray pipes 4a of the spray pipes 4 are disposed to spray an absorbing liquid in the same direction as the flow of exhaust gas 1 (cocurrent stream spray pipes), and furthest downstream spray pipes 4b are disposed to spray the absorbing liquid in a direction opposing the flow of the exhaust gas 1 (countercurrent spray pipes Such spray pipes 4a–4b form a spray zone in the inlet duct 3. A circulation tank 7 is provided downstream and below the inlet duct 3. As shown in FIG. 4, the circulation tank 7 is provided with an agitator means 8 mounted on a sidewall of the circulation tank 7, oxidizing air blowing pipes 10 mounted in the vicinity of blades of the agitator means 8, pump 11 and absorbing liquid circulating pipe 12 for recirculating the absorbing liquid from the circulation tank 7 into the inlet duct 3, feed pipe 13 for supplying fresh calcium-based absorbing liquid to the circulation tank 7, and pipe 14 and pump 15 for withdrawing the absorbing liquid (absorbent slurry) from the circulation tank 7. As shown in FIG. 1, the agitator means 8 may be comprised of oxidizing agitators 8a for finely dispersing the introduced oxidizing air, and agitators 8b dedicated to agitation of the absorbing liquid within the circulation tank 7.

An outlet duct 19 is provided at an exhaust gas exit portion of the absorber tower 2, i.e., at a downstream portion above the circulation tank 7, and includes a folded plate-like demister 16 and pipe 18 (see FIG. 4) for returning mist collected in the demister 16 into the circulation tank 7. The absorbing liquid slurry withdrawn from the circulation tank 7 through the absorbing liquid withdrawing pump 15 is thickened in a gypsum recovering apparatus 20 for recovery of gypsum 22.

Using FIG. 4 as an example, the embodiments described herein all include an absorber housing defining a gas flow path and including a central area 7a, defined as the area located directly above the circulation tank 7, the inlet duct 3 located upstream of the central area 7a, and the outlet duct 19 located downstream of the central area 7a.

All illustrated embodiments of the invention may be provided with oxidizing agitators 8a and agitators 8b for agitating the absorbing liquid, oxidizing air blowing pipe 10, an absorbing liquid circulating pipe 12, feed pipe 13 for supplying fresh calcium-based absorbing liquid, pipe 14 for withdrawing the absorbing liquid and gypsum recovering apparatus 20, some of the devices being not illustrated in some of the figures.

The absorber tower 2, which includes the inlet duct 3 and outlet duct 19 defines the direction of flow of an exhaust gas as horizontal or as a direction which is not vertical, extends through an upper sidewall of the self-supporting circulating tank 7, so that the entire system is self-supporting. It is desirable that a baffle 24 (see FIG. 4) is provided at the junction between the horizontal portion having the outlet duct 19 and the sidewall of the circulation tank 7 for preventing scattering of mist raised by the gas flow.

In this manner, the desulfurization plant is constructed as an integral structure in which the upper portion of the circulation tank 7 forms a portion of the horizontal absorber tower 2. Therefore, the desulfurization plant is self-supporting and moreover, is of a simple structure. Thus, unlike the prior art vertical absorber tower structure, in the desulfurization plant of the present invention, it is not necessary to provide a fitment for supporting the tower duct portion, and yet the apparatus has high strength and, accordingly, relatively low cost.

In the single-tower type flue gas desulfurization plant of the above-described construction, the exhaust gas 1 is passed into the inlet duct 3 of the absorber tower 2, where it is first brought into contact with droplets of the absorbing liquid sprayed in parallel flows from the furthest upstream spray pipes 4a. During this time, the exhaust gas 1 is drawn by an ejector effect produced by the furthest upstream spray pipes 4a, while, at the same time, is cooled to a saturated-gas temperature and partially dedusted and desulfurized. It should be noted that in order to prevent damage to the inside of the tower due to a loss of power supply when a high temperature gas is permitted to flow into the absorber tower 2, a water spray device (not shown) is preferably further provided upstream of the spray pipes 4a. The exhaust gas 1 is dedusted and ultimately desulfurized to a target value by means of spray pipes 4 further downstream (including the furthest downstream spray pipes 4b). The furthest downstream spray pipes 4b spray the absorbing liquid countercurrent to the exhaust gas 1 to perform the cooling, dedusting and desulfurization of the exhaust gas 1, and also to collect the mist received from the upstream side. In order to reduce deviation in spray due to staggering (head difference) of vertical positions of any spray pipes 4a–4b, it is desirable to arrange the spray pipes 4 laterally (horizontally), as shown in FIG. 1. The spray pipe 4 has its diameter reduced successively from its base toward its distal end, as shown in FIG. 2, so that the amount of droplets sprayed (shown by a dashed line), the spraying rate and the like are equalized across the pipe. It is also desirable that the spray nozzles 6 of the spray pipes 4 are staggered in the direction of the exhaust gas flow or in a direction perpendicular to the exhaust gas flow from the spray nozzles 6 of the adjacent spray pipes 4. Thus, it is possible to increase the gas-liquid contact efficiency of the absorbing liquid with the exhaust gas 1 by arranging the nozzles in such a manner that the conical sprays of the absorbing liquid, shown by the dashed line in FIG. 2, do not overlap. Particularly, it is important that the spray nozzles 6 of the spray pipes 4 are arranged in such a manner that the concurrent and countercurrent spray patterns from the adjacent spray pipes 4 are not overlapped one on another.

The exhaust gas 1 cooled, dusted and desulfurized in this manner is discharged from the absorber tower 2 after being cleared of the entrained mist.

On the other hand, the limestone slurry which is the absorbing liquid is supplied through the feed pipes 13 into the circulation tank 7 and mixed with the slurry present in the circulation tank 7. Then, the mixed absorbing slurry is sprayed into the inlet duct 3 for contact with the exhaust gas 1. The spray then freely drops directly into the circulation tank 7, or onto the bottom of the inlet duct 3, which is slanted downward toward the circulation tank 7, whereby it naturally flows along the slanted bottom back into the circulation tank 7.

The absorbing liquid returned to the circulation tank 7 has its pH restored therein. In the circulation tank 7, air blown from the oxidizing air blowing pipes 10 is dispersed into the absorbing liquid as fine bubbles by the agitator 8a and, hence, CaSO₃ produced by absorption of SO$_x$ in the absorbing liquid is oxidized into gypsum. The absorbing liquid in the circulation tank 7 contains gypsum and unreacted limestone and liquid containing the same is withdrawn by the withdrawing pump 15, thickened in a hydrocyclone (not shown) on the order of 40 to 50%, and overflow water (not shown) is recirculated and reused as scrubbing water within the absorber tower 2, water for preparing the limestone slurry or the like. The thickened gypsum slurry is discarded as is, or if necessary, may be further dehydrated for recovery as powdery gypsum by a centrifugal separator, a belt filter or the like.

The cooling and dedusting of the exhaust gas 1 and the absorption of sulfur oxides in the desulfurization plant of the present invention are carried out in a spray process in which the absorbing liquid is sprayed into the exhaust gas flow and, hence, the performance thereof is largely influenced by the nature of the gas flow. By spraying the absorbing liquid, in a direction cocurrent with the exhaust gas flow, from the uppermost-stream spray pipes 4a in the plant according to the present invention, an ejector effect is provided to convey the exhaust gas 1 with assist of an appropriate spray rate of the absorbing liquid. However, the sprayed droplets are entrained in the exhaust gas flow in the absorber tower 2 and scattered to a large degree downstream. This is not advantageous, because it causes corrosion of the downstream duct, instruments and other components therein. For this reason, the demister 16 is provided. However, the amount of mist and droplets scattered from the uppermost-stream spray pipes 4a is very large and hence, the load on the demister 16 for collecting the mist therein would be too high, causing a rescattering of mist and requiring a complicated design for the demister 16 itself. The present inventors have made various tests and studies directed to reduction of the mist load at the inlet of the demister 16 and, as a result, it has been found that by arranging at least the furthest downstream spray pipes 4b such that the absorbing liquid sprayed therefrom is brought into countercurrent contact with the exhaust gas 1, a large amount of mist scattered from the furthest upstream spray pipes 4a can be collected and, therefore, the mist load on the demister 16 can be substantially reduced.

To ensure that the scattering downstream is reduced, that the time of contact with the exhaust gas 1 is prolonged, and that the sprayed absorbing liquid can be recovered to the utmost, it is desirable that the inlet duct 3 be integral with the circulation tank 7.

Further, in an absorber of the horizontal type, if the flow rate of the exhaust gas 1 within the absorber tower 2 is too low, the sprayed droplets separate from the exhaust gas flow by gravity and drop onto the bottom of the tower 2. Thus, even if the contact distance is made as long as possible, e.g. in the horizontal direction, no gas-liquid contact occurs after such separation. Conversely, if the flow rate of the exhaust gas 1 is too high, the amount of entrained mist is too large, resulting in problems of a large loss of the absorbing liquid, corrosion of the downstream duct, instruments and components therein, and an increased pressure drop.

Figure 5:
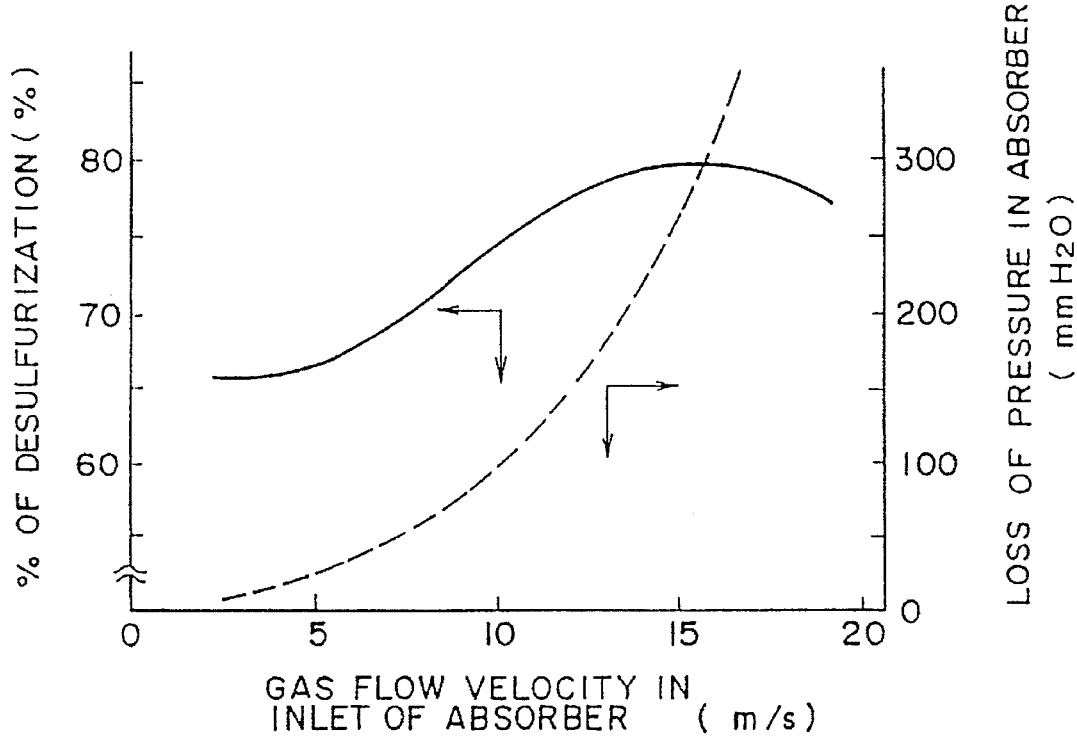
FIG. 5 is a graph illustrating the relationship between the flow velocity in an inlet of an absorber tower, the percent desulfurization and the pressure drop in the plant shown in FIG. 1.
Figure 6:
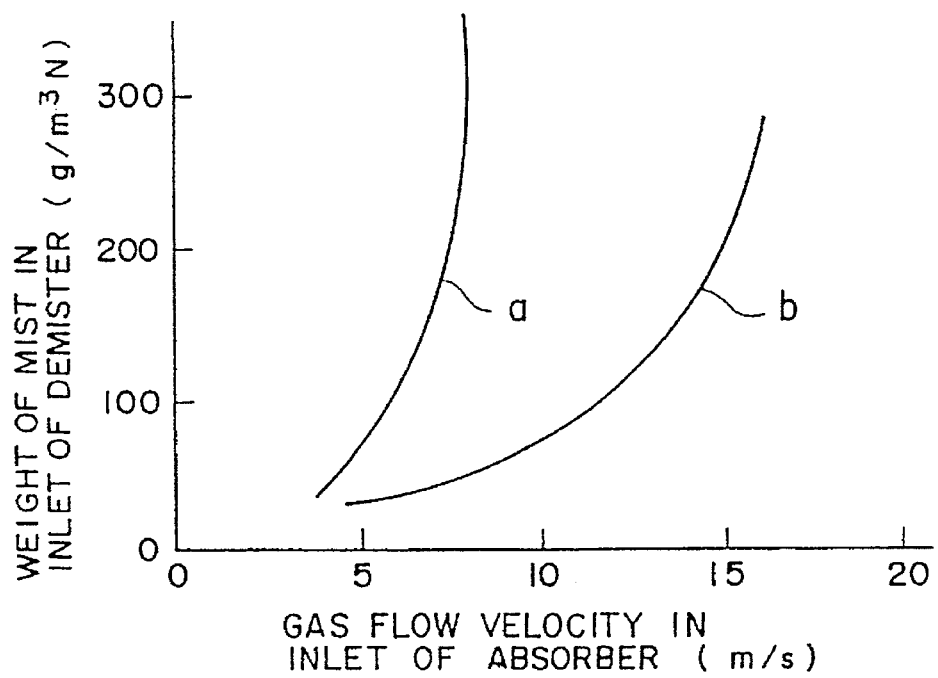
FIG. 6 is a graph illustrating the relationship between the the flow velocity in the inlet of the absorber tower of the plant shown in FIG. 1 and the amount of mist entering the demister.

As a result of study of the various problems associated with different gas flow rates within the absorber tower 2, it has been found that there is an optimal range for the gas flow rate within the absorber tower 2. FIG. 5 and FIG. 6 are graphs illustrating the relationship between the gas flow rate at the inlet of the absorber tower 2, the percent desulfurization, the pressure drop and the amount of mist at the inlet of the demister 16, under conditions of a gas flow rate of 3,000 m³N/hr and a SO₂ concentration of 2,000 ppm. The higher the gas flow rate, the higher the percent desulfurization. Preferably, the gas flow rate is 5 m/sec or more. However, if the gas flow rate is equal to or more than 15 m/sec., the percent desulfurization is reduced, again due to a decrease in gas-liquid contact time or the like. Likewise, the amount of mist at the inlet of the demister 16 is sharply increased as the gas flow rate is increased. Therefore, in order to reduce the pressure drop and the amount of mist at the inlet of the demister 16 as much as possible, and to increase the percent desulfurization, it is desirable that the gas flow rate at the inlet of the absorber tower 2 is on the order of 5 to 15 m/sec. It has also been found that the amount of mist at the inlet of the demister 16 is smaller when the absorbing liquid is sprayed both cocurrent and countercurrent to the gas flow (as shown by curve b in FIG. 6), as compared to the case where the absorbing liquid is sprayed in a direction parallel to the gas flow (as shown by curve a in FIG. 6).

Experiment Example 1

An experiment of treatment of an exhaust gas 1 was carried out using the wet-type desulfurization plant shown in FIGS. 3 and 4.

Test Conditions were as follows:

| | |
|---|---|
| Amount of Gas: | 3,000 m³N/hr. |
| SO₂ Concentration: | 2,000 ppm |
| Concentration of Dust at Inlet: | 200 mg/m³N |
| Temperature of Gas at Inlet: | 150° C. |
| Amount of Oxidizing Air: | 30 m³N/hr |
| Number of Stages of Spray Pipes: | 3 |
| Liquid-Gas ratio: | 20 liter/m³N |
| Size of Inlet of Absorber Tower: | □350 mm across |
| Percent excess Limestone: | 10% |
| (Test Results) | |
| Desulfurization Percent: | 80% |
| Oxidation Percent: | 99.7% |
| Tower Pressure Drop: | 80 mm H₂O |
| Amount of mist at Outlet: | 100 mg/m³N |

Inspection of the interior after operation for 100 hours observed no scaling and no corrosion at the upstream and downstream sides of the absorber tower 2.

Comparative Experiment Example 1

In contrast to Example 1, when the direction of spraying of the absorbing liquid from the first spray pipes (the furthest upstream spray pipes 4a) was counter to the direction of exhaust gas flow, the absorbing liquid sprayed before starting the flow of the exhaust gas 1 flowed upstream of inlet duct 3, resulting in a reduced level of the absorbing liquid in the circulation tank 7. However, after start of the flow of exhaust gas 1, the liquid level in the circulation tank 7 was returned to the original level.

| | |
|---|---|
| Desulfurization Percent: | 82% |
| Oxidation Percent: | 99.7% |
| Tower Pressure Drop: | 110 mm H₂O |
| Amount of mist at Outlet: | 100 mg/m³N |

As a result of an inspection of the interior after operation for 100 hours, a considerable amount of accumulation of solids in the inlet duct 3 in the absorber tower 2 was observed.

Comparative Experiment Example 2

In contrast to Experiment Example 1, when the direction of spraying of the absorbing liquid from the third spray pipes (the downmost-stream spray pipes 4b) was cocurrent with the exhaust gas flow, carrying-over of liquid from the outlet duct 19 with the gas flow resulted in a reduced liquid level in the circulation tank 7 and inability to continue to operate the plant. Thereafter, a large amount of drainage from the outlet duct 19 was observed.

Second Embodiment

The horizontal desulfurization plant shown in FIGS. 3 and 4 has an inlet duct 3 with spray nozzles 6 disposed therein at a plurality of stages in the direction of the gas flow and a cross-sectional area which is stepwise increased. The cross-sectional area, perpendicular to the gas flow, of the downstream terminus of the inlet duct 3 is smaller than the cross-sectional area, perpendicular to the gas flow, of the gas flow path located between the inlet duct 3 and an outlet duct 19 and above circulation tank 7.

Since the spray nozzles 6 are disposed in a plurality of stages in the inlet duct 3, the density of the absorbing liquid sprayed from such spray nozzles 6 is higher at the upstream end of the inlet duct 3. Therefore, by stepwise increasing, in the direction of the gas flow, the cross-sectional area of the inlet duct 3 perpendicular to the gas flow, for example by providing an inclined bottom surface for the inlet duct 3, it is possible to equalize the density of the sprayed absorbing liquid in the gas flow direction within the duct 3 to ensure that the desulfurization of the exhaust gas 1 advances equally in every duct area.

As the gas flow rate in the inlet duct 3 becomes higher, the efficiency of absorption of $SO_x$ in the exhaust gas 1 is increased. Therefore, in order to increase the gas flow rate in the inlet duct 3, it is necessary to decrease the sectional area of the inlet duct 3, but if the gas is passed to the outlet duct 19 while remaining at such an increased flow rate, the load for collection of mist in the demister 16 is increased.

As shown in FIG. 4, the cross-sectional area, perpendicular to the gas flow, of the downstream end of the inlet duct 3 is smaller than the cross-sectional area, perpendicular to the gas flow, of the gas flow path centrally located between the inlet duct 3 and outlet duct 19, above circulation tank 7, thereby ensuring that the gas flow rate is reduced in the central portion, so that the mist entrained in the gas flow is not directed toward the demister 16 and is free to separate by gravity.

When the bottom surface of the inlet duct 3 is an inclined surface, the lowermost spray nozzles 6 in each of spray pipes 4 mounted at a plurality of stages in the inlet duct 3 are placed in substantially the same horizontal plane, to thereby ensure that the spray nozzles 6 are prevented from being immersed in the absorbing liquid flowing along the bottom surface of the inlet duct 3.

In the horizontal wet-type desulfurization plant according to the present invention, the sectional area of the inlet duct 3 is smaller than that of the outlet duct 19. For this reason, the gas flow rate in the inlet duct 3 is higher than that in the outlet duct 19 due to the difference in cross-sectional area between the inlet and outlet ducts 3 and 19, to provide an improved desulfurizing performance. This improvement holds true as the magnitudes of the cross-sectional areas of the inlet and outlet ducts 3 and 19 are varied. Preferably, the ratio of the cross-sectional area, perpendicular to the gas flow, of the downstream end of the inlet duct 3 of the absorber tower 2 to the cross-sectional area, perpendicular to the gas flow, of the gas flow path above the circulation tank 7 is 100:120 to 200.

Experiment Example

A test to determine the influence exerted by the gas flow on the amount of mist was carried out using a 3,000 $m^3N/hr$ pilot test plant. Results of this test are given below. The gas flow rate reported below was that at the furthest upstream portion of the inlet of the absorber tower, i.e., the highest flow rate.

(a) Conditions

| | |
|---|---|
| Gas Flow Velocity: | 5 to 20 m/sec. |
| Liquid-Gas Ratio: | 20 liter/$m^3N$ |
| Number of Stages of Spray Pipes: | 3 |

The circulation liquid used was water.

(b) Results

Figure 7:
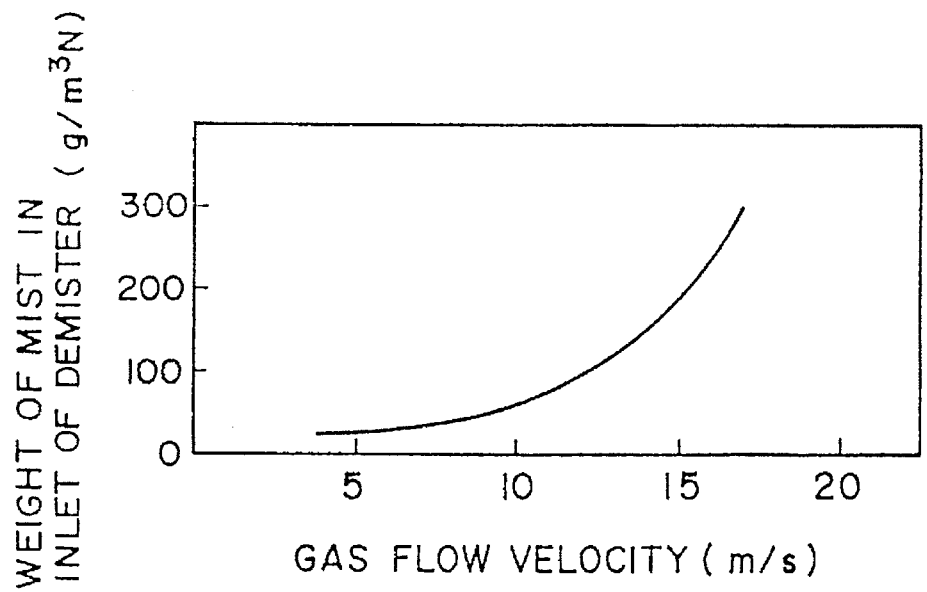
FIG. 7 and FIG. 8 are graphs of the amount of mist exiting the demister versus gas flow velocity in tests of operation apparatus in accordance with the first embodiment.
Figure 8:
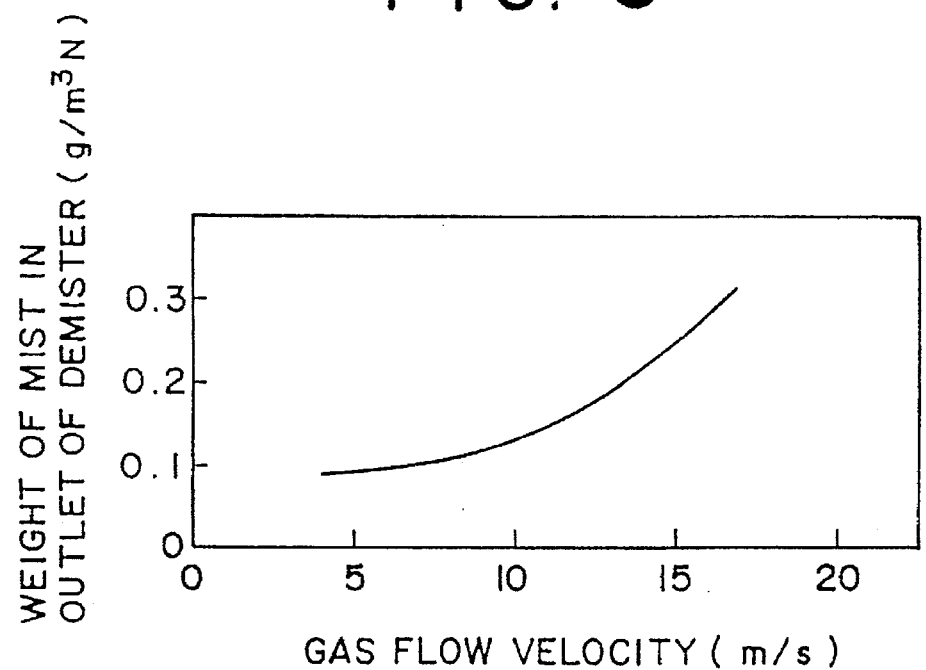

Results are shown in FIGS. 7 and 8. FIG. 7 is a graph illustrating a mist characteristic curve in which the ordinate indicates the amount of mist in the inlet of the demister 16 and the abscissa indicates the gas flow rate. FIG. 8 is a graph illustrating a mist characteristic curve in which the ordinate indicates the amount of mist at the outlet of the demister 16 and the abscissa indicates the gas flow rate. As the gas flow rate is increased, the amount of mist in the inlet of the demister 16 is increased and, at the same time, the amount of mist in the outlet of the demister 16 is also increased. This indicates that, in order to reduce the concentration of mist in the cleaned gas discharged out of the system and to enhance the mist removing performance, it is effective to lower the gas flow rate within the outlet duct 19 upstream of the demister 16.

Figure 9:
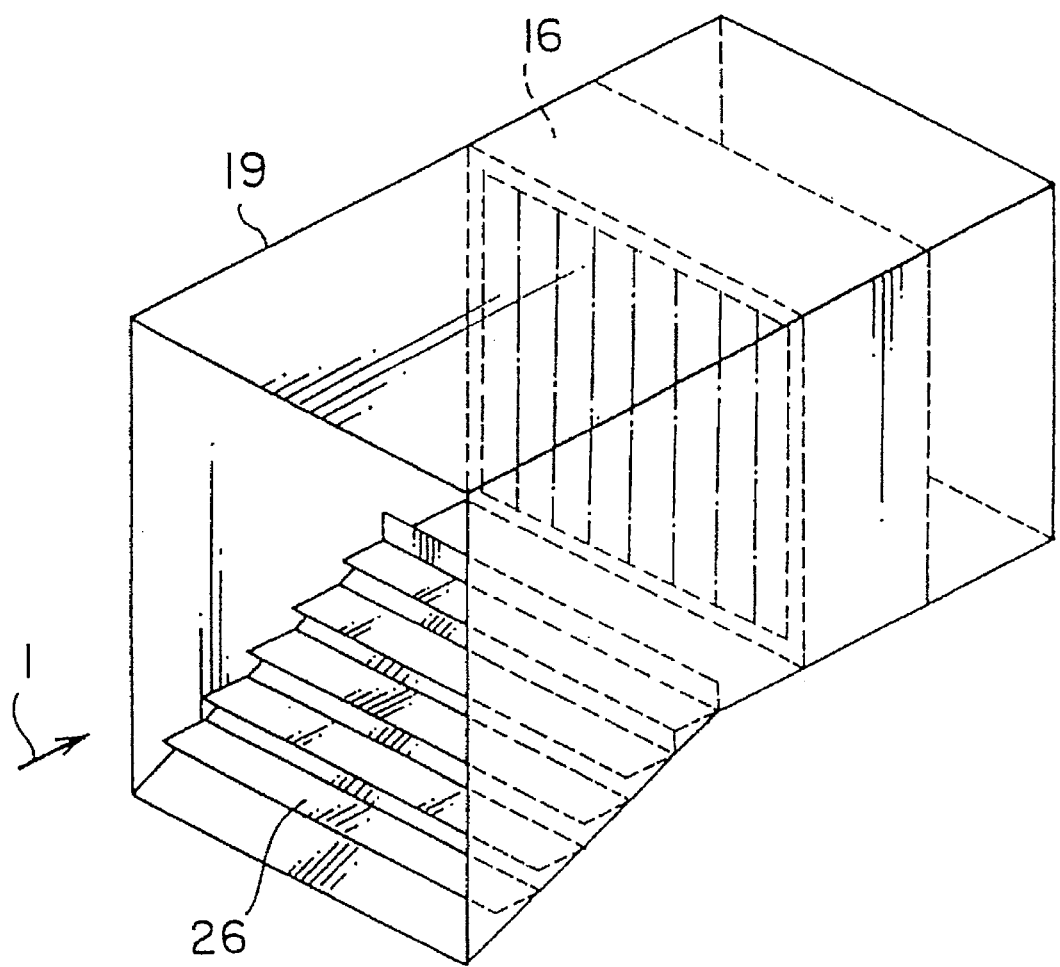
FIG. 9 is a perspective view of a modification of an outlet duct in the absorber tower in the second embodiment of the present invention.

A plurality of misting (reentrainment) prevention plates 26 may be provided on the inclined bottom surface of the outlet duct 19 in the desulfurization plant of this embodiment, as shown in FIG. 9. The misting prevention plates 26 serve to prevent the mist collected on the bottom surface of the outlet duct 19 from being rerentrained by the exhaust gas flow, thus reducing the amount of mist flowing into the demister 16.

It should be noted that the misting prevention plates 26 are also applicable to other embodiments of the present invention.

Third Embodiment

Figure 10:
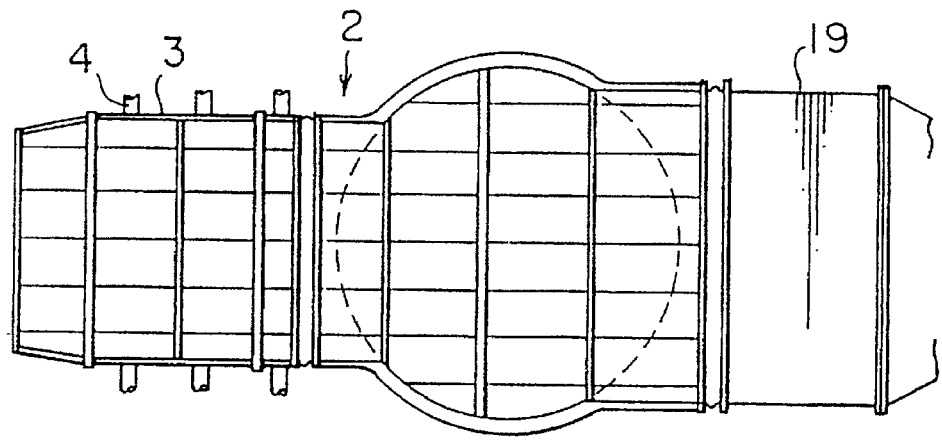
FIG. 10 is a schematic horizontal sectional view of a wet-type flue gas desulfurizing plant according to a third embodiment of the present invention.
Figure 11:
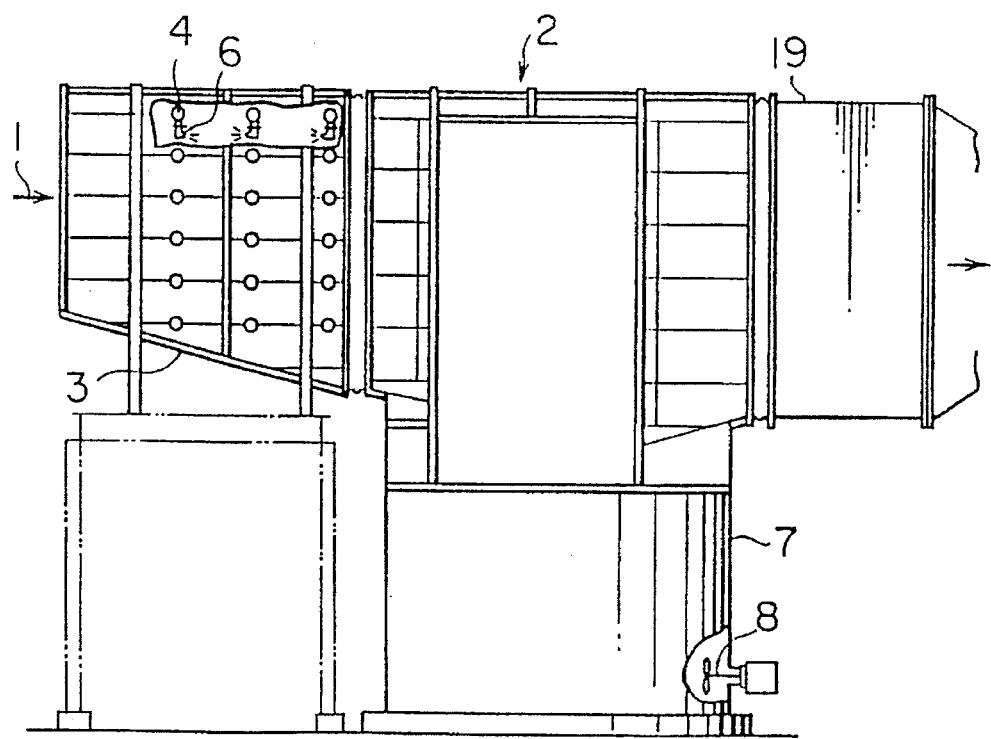
FIG. 11 is a side view of the desulfurizing plant shown in FIG. 10.

The wet-type flue gas desulfurization plant of this embodiment is shown in plan view in FIG. 10 and in a side view in FIG. 11.

In the first embodiment shown in FIG. 1, the spray pipes 4 are disposed horizontally to extend from one of the sidewall surfaces of the inlet duct 3 to the opposite sidewall surface. For this reason, the base portion of the spray pipe 4 is larger in resistance to the exhaust gas flow, while the tip end of the spray pipe 4 is smaller in resistance to the exhaust gas flow. Thus, there is the disadvantage that the gas flow in the inlet duct 3 is deflected at the tip end of the spray pipes 4, so that the gas-liquid contact is not performed uniformly, resulting in reduced desulfurizing performance. In addition, the spray pipes 4 are supported only at their base portions on the wall surface of the inlet duct 3 and for this reason, the tip end of each of the spray pipes 4 is suspended mid-air, resulting in an unstable supported-state for the pipes 4. Further, since the spray nozzles 6 are disposed in the same horizontal plane of the pipes 4, there is the disadvantage that when the spraying of the absorbing liquid is stopped, a portion of the absorbing liquid may remain in the spray pipes 4 or the spray nozzles 6 and the solids (gypsum, limestone and/or the like) in the absorbing liquid may settle and accumulate, thereby causing the spray pipes 4 or the spray nozzles 6 to become clogged. Therefore, the present embodiment is intended to address these disadvantages of the embodiment shown in FIG. 1.

Figure 12:
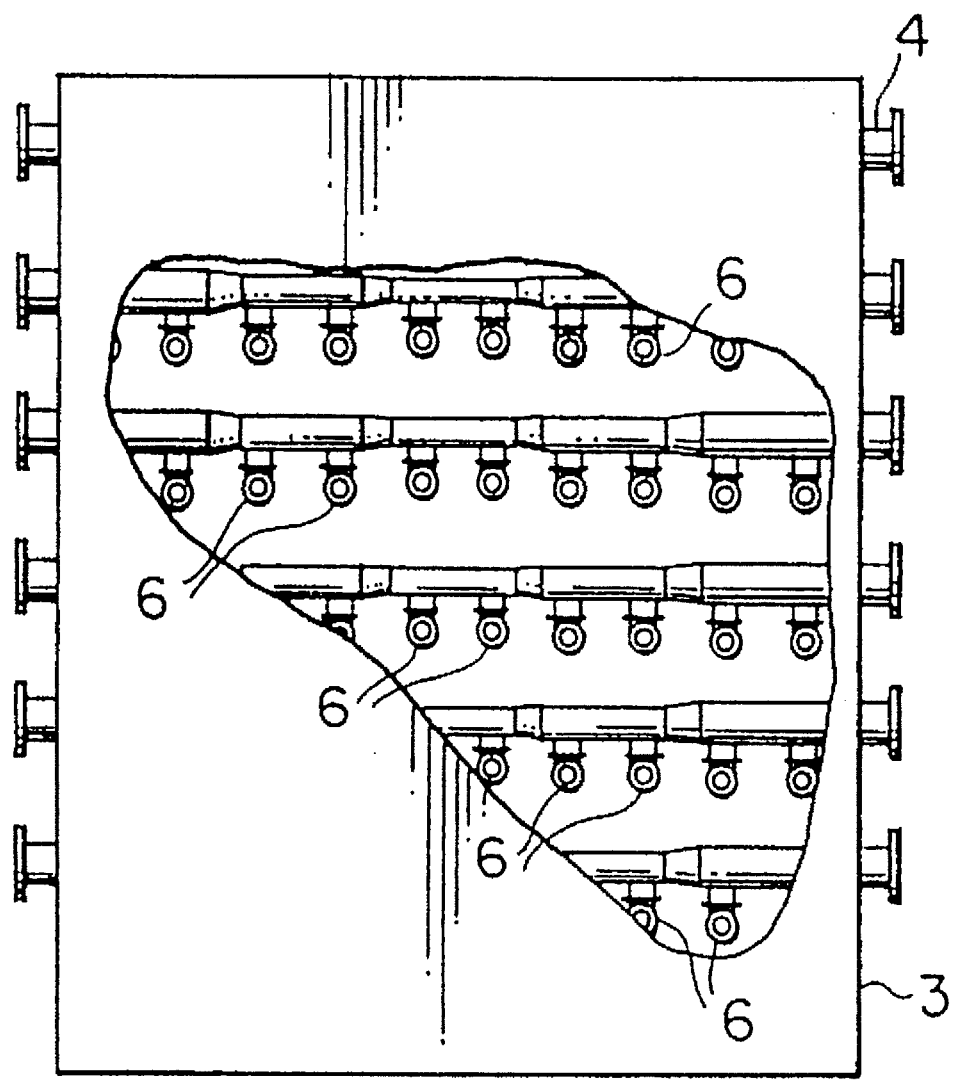
FIG. 12 is a view of an inlet duct of an absorber tower shown in FIGS. 10 and 11, as viewed in the direction of gas flow (without the front end wall)

As shown in FIGS. 10 and 11, an absorber tower 2 defines an exhaust gas flow path in a direction which is not vertical and includes spray pipes 4 having spray nozzles 6 mounted thereto for spraying an absorbing liquid in a direction countercurrent or cocurrent to the flow of an exhaust gas 1. The spray pipes 4 are disposed in a plurality of rows within an inlet duct 3 and are supported at opposite ends thereof by sidewalls of the inlet duct 3. The spray pipes 4 are disposed in a single stage or in a plurality of stages spaced along the gas flow path. The inside of the inlet duct 3 is shown in FIG. 12 (actually the front end wall of the FIG. 12 has been removed) in a view taken in the direction of the gas flow. As shown in FIG. 12, the plurality of rows of spray pipes 4 are disposed between opposite sidewalls of the inlet duct 3 and are interconnected at a central portion in the inlet duct 3. The absorbing liquid may be supplied in equal amounts from the opposite sidewalls of the inlet duct 3 to the spray pipes 4, and the diameter of each of the spray pipes 4 is gradually decreased from the sidewall outward to the center of the inlet duct 3, so that even if the flow rate of the absorbing liquid within the spray pipes 4 decreases toward the center, the flow velocity within the spray pipes 4 is constant for all spray points.

The spray nozzles 6 are disposed on the underside of the spray pipes 4 and, hence, when the spraying of the absorbing liquid is stopped, the slurry remaining within such pipes 4 can be discharged from the spray nozzles 6, thereby preventing any trouble of clogging of the spray pipes 4 due to solids in the absorbing liquid settling and accumulating in the spray pipes 4.

Experiment Example

To demonstrate the effectiveness of this embodiment, comparative tests were carried out using the wet-type desulfurization plants shown in FIG. 1 and FIGS. 10 and 11. Test conditions were as follows:

| | |
|---|---|
| Amount of Gas: | 3,000 m³N/hr. |
| Size of Inlet of Absorber Tower: | □350 mm |
| SO₂ Concentration: | 2,000 ppm |
| Liquid-Gas Ratio: | 20 liter/m³N |
| Percent of Excess Limestone: | 10% |
| (Test Results) | |
| Percent Desulfurization | |
| Plant shown in FIG. 1: | 80% |
| Plant shown in FIGS. 10 and 11: | 82% |

Figure 13:
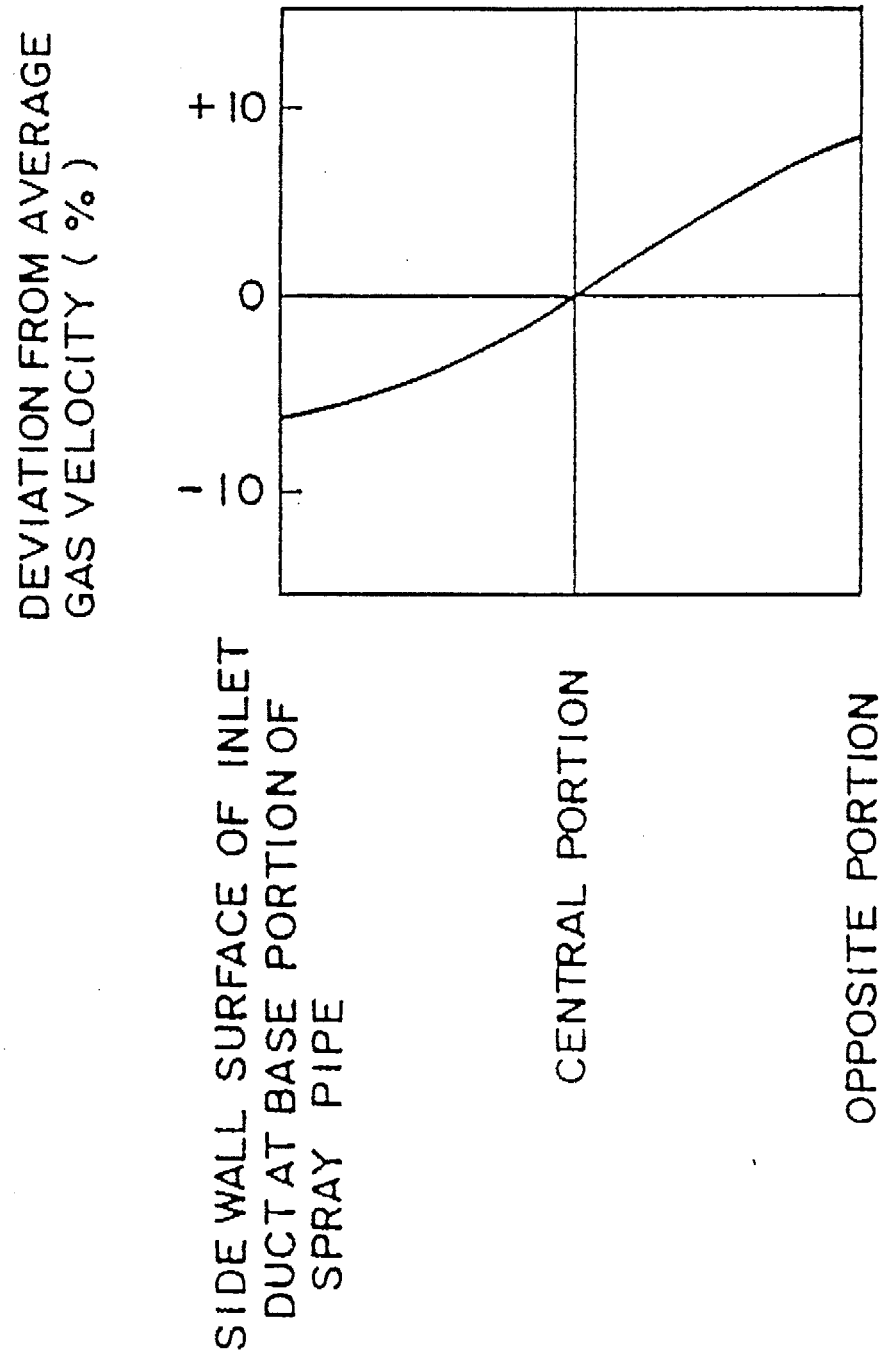
FIG. 13 is a diagram of a profile of gas flow velocity in the inlet duct in the plant shown in FIG. 1.
Figure 14:
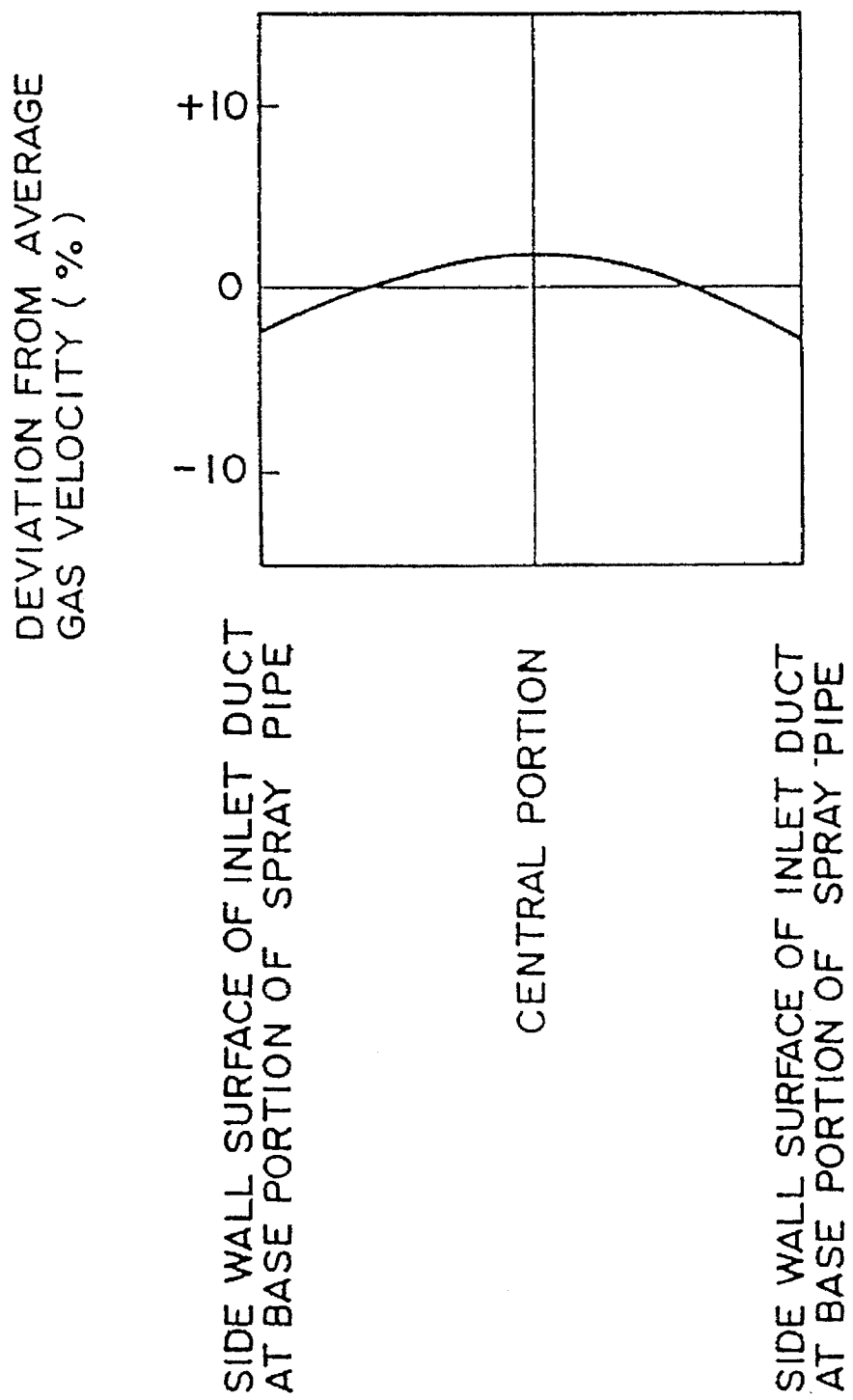
FIG. 14 is a diagram of a profile of gas flow velocity in the inlet duct shown in FIG. 12.

Gas flow velocity profiles in the inlet duct 3 are shown in FIG. 13 (corresponding to the plant shown in FIG. 1) and FIG. 14 (corresponding to the plants shown in FIGS. 10 and 11).

If the gas flow velocity profile in the inlet duct 3 is defined by deviation (%) relative to an average gas flow velocity, the gas flow velocity is lower in the region near the sidewall supporting the base portions of the spray pipes 4 relative to the region near the opposite sidewall, in the plant shown in FIG. 1. This is because the effective cross-sectional area of the inlet duct 3 is varied, because the spray pipes 4 in the plant shown in FIG. 1 are tapered from their bases toward their distal ends. On the other hand, in the plant shown in FIGS. 10 and 11, because of a reduced diameter of the central portion of the spray pipes 4, the gas flow velocity there is increased and, as compared with the plant shown in FIG. 1, variation in gas flow velocity is decreased. For this reason, it could be confirmed that, in this embodiment, the gas-liquid contact in the inlet duct 3 is more uniform as compared with the plant in the first embodiment, leading to a relatively increased desulfurizing performance.

Figure 15:
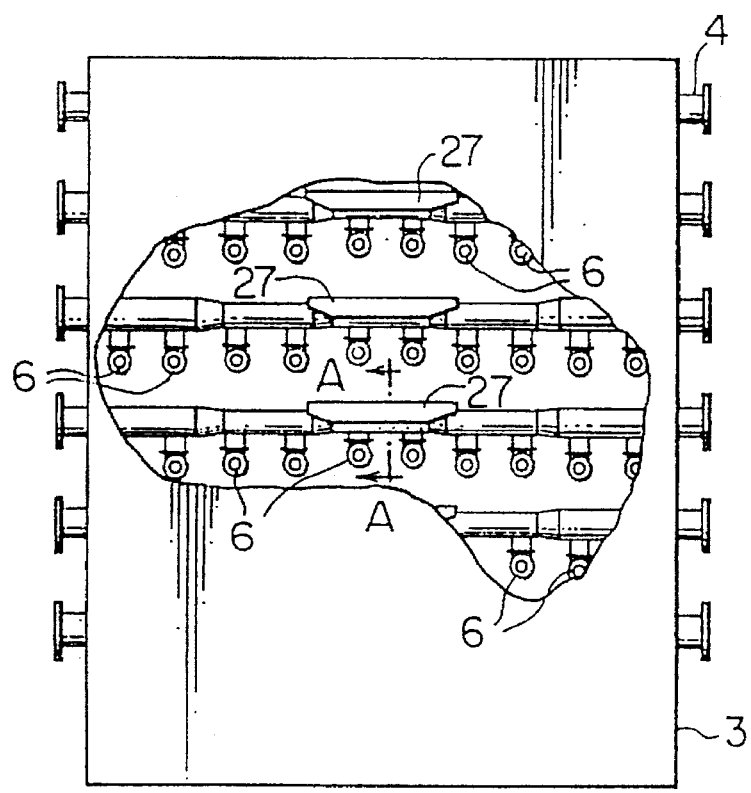
FIG. 15 is a view, partially in cross-section, of a modification to the spray pipes shown in FIG. 12 (without the front end wall)
Figure 16:
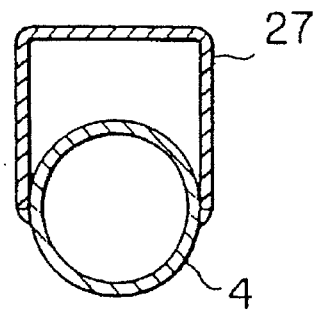
FIG. 16 is a cross-sectional view taken along line A—A in FIG. 15.

After stopping the spraying of the absorbing liquid, the spray pipes 4 were inspected and it was found that no absorbing liquid remained in any of the spray pipes 4, and no clogging of the spray pipes 4 and spray nozzles 6 by the solids was observed. In order to improve the ability to increase the gas flow velocity at the central portion of the spray pipes 4 in the plant shown in FIGS. 10 and 11, spray pipes 4 shown in FIG. 15 and FIG. 16 (FIG. 16 is a sectional view taken along a line A—A in FIG. 15, and spray nozzles 6 are not shown) can be used in place of the spray pipes 4 shown in FIG. 12. FIG. 15 is a view of the spray pipes 4 taken from a direct-on of a gas flow in the inlet duct 3 (actually the front end wall of the FIG. 15 has been removed). In order to maintain the strength of the spray pipes 4, a support 27 is mounted to the central reduced-diameter portion of the spray pipes 4. Thus, the thickness of the spray pipes is substantially uniform over their horizontal span, so that the gas flow in the inlet duct 3 is not disturbed, thereby enabling the gas flow velocity in the inlet duct 3 to be equalized.

One technique for improving the spraying of the slurry from the spray nozzles 6 of the spray pipes 4 within the inlet duct 3 is to direct the slurry sprayed from the spray nozzles 6 near the sidewall surface of the inlet duct 3 inwardly from the sidewall surface. This ensures that the sprayed droplets are not permitted to collide against the sidewall surface and are thus prevented from being rescattered, thereby diminishing the amount of mist and reducing the load on the demister 16.

Fourth Embodiment

In a vertical desulfurization plant, mist drops vertically within the absorber tower and is entrained in the gas flow and, hence, the amount of mist scattered is relatively small. On the contrary, in a horizontal desulfurization plant, slurry droplets sprayed from a spray pipes are entrained in the gas flow and, hence, are liable to be scattered and carried over into a downstream demister. If the amount of liquid carried over into the demister is increased, it becomes difficult to treat such liquid using a conventional demister. Accordingly, the number of demisters must be increased, or the distance between the final spray nozzle stage and the demister must be increased, so that the scattered mist is prevented from reaching the demister. When an additional demister is used, if the amount of mist entering into the demister is increased, a wear-resistant material is required, resulting in an increased weight of the demister. The increase in weight of the demister requires reinforcement which, in turn, complicates and increases the size and cost of the plant. For this reason, it is important to prevent the mist sprayed in the absorber tower from reaching the succeeding demister in a large amount.

Therefore, it is important to reduce the amount of mist, without use of an additional demister, by modifying the structure of the absorber tower or the slurry spraying method.

This embodiment is directed to such modification. One desulfurization plant of this embodiment is shown in FIG. 17, wherein parts or components having the same functions as those in the desulfurization plant shown in FIG. 1 are designated by the same reference numerals as in FIG. 1, and the description thereof is omitted.

Smaller-diameter droplets of the absorbing liquid sprayed from a spray nozzles 6 are entrained in an exhaust gas 1 and recovered by a demister 16. However, if the gas flow velocity in an absorber tower 2 is increased, the amount of mist entrained in the gas flow and conveyed into the demister 16 is increased, resulting in an increased liquid load on the demister. In such a case, even if plural demisters 16 are placed at two stages, reentrainment of mist occurs to wet outlet duct 19, causing corrosion of the wall surface of the outlet duct 19. Therefore, an inclined plate 28 for diverting the gas flow in a downward direction, at a predetermined angle with respect to the horizontal, is placed on a ceiling portion of circulation tank 7 or a ceiling portion of the outlet duct 19.

If the gas flow introduced from the furthest downstream stage nozzles 4b in the inlet duct 3 is diverted toward the circulation tank 7 by the downwardly diverting inclined plate 28, the amount of mist reaching the demister 16 can be reduced considerably. By setting the angle of the inclined plate 28 at a value larger than the angle of inclination of the bottom surface of the inlet duct 3 adjacent the circulation tank 7, with respect to the horizontal, the gas flow is turned in a downwardly flowing direction, leading to a reduced amount of mist reaching the demister 16. However, in case it is feared that gypsum may adhere to the inclined plate 28, a device capable of scrubbing the inclined plate 28 with washing water may be provided.

Figure 17:
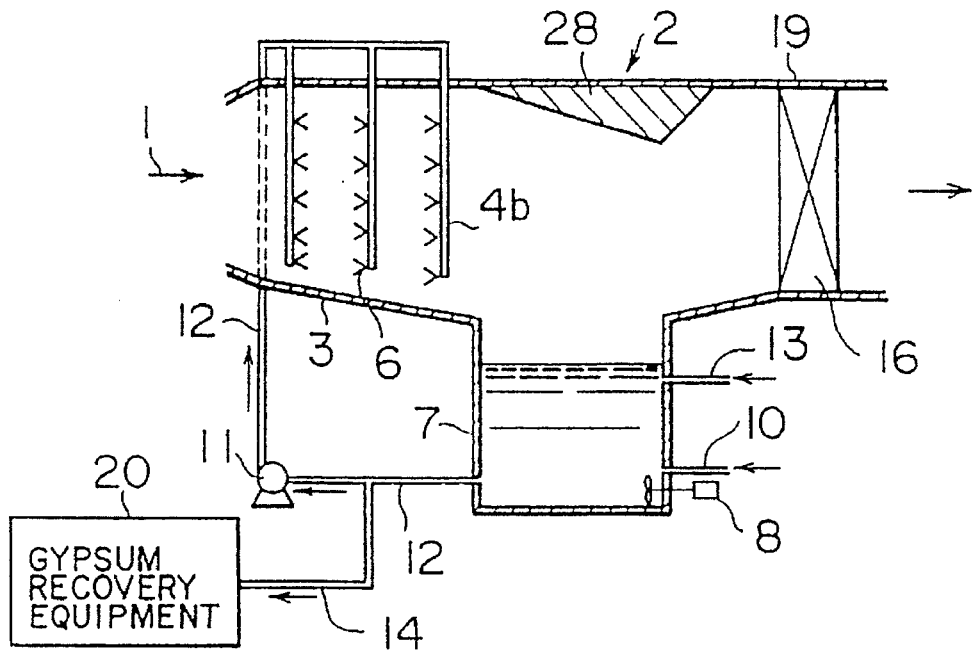
FIG. 17 is a schematic cross-sectional side view of a wet-type flue gas desulfurizing plant according to a fourth embodiment of the present invention.

Even in the structure of the plant shown in FIG. 17 in which the demisters 16 are smaller in number, the load for collecting the mist in the demister 16 can be reduced, the pressure drop is not increased, and the desulfurizing performance is maintained.

Figure 18:
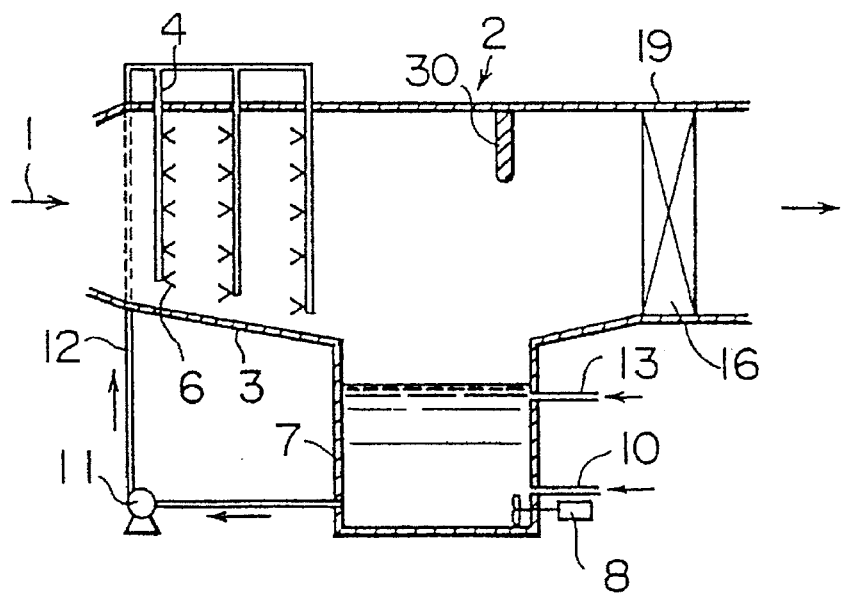
FIG. 18 is a view of a modification to the wet-type flue gas desulfurizing plant shown in FIG. 17.

Referring to FIG. 18, there is illustrated an embodiment in which a baffle 30 is placed hanging from a ceiling portion of the outlet duct 19, upstream of demister 16, or is placed on ceiling portion of a circulation tank 7. In this case, gas flow is turned downwardly within absorber tower 2 above the circulation tank 7, so that mist entrained in the gas is diverted from the gas flow and dropped onto the surface of the absorbing liquid in the circulation tank 7.

It is required that a vertical sectional area of the gas flow path above the absorbing liquid surface at the lowermost end of the inclined plate 28 or the baffle 30 be larger than at least the vertical sectional area of the inlet duct 3, to provide a reduced gas flow resistance, so that the mist easily drops onto the liquid surface in the circulation tank 7.

If an insert such as inclined plate 28 or baffle 30 is placed on the ceiling portion of the circulation tank 7 or the ceiling portion of the outlet duct 19 in the above manner, droplets of the sprayed absorbing liquid are not caused to collide against the insert and therefore, it is possible to reduce the amount of mist reaching the demister 16. In this case, the flow velocity of the gas in the inlet duct 3 need not be lowered and hence, there is no fear of a reduction in desulfurizing performance.

Figure 19:
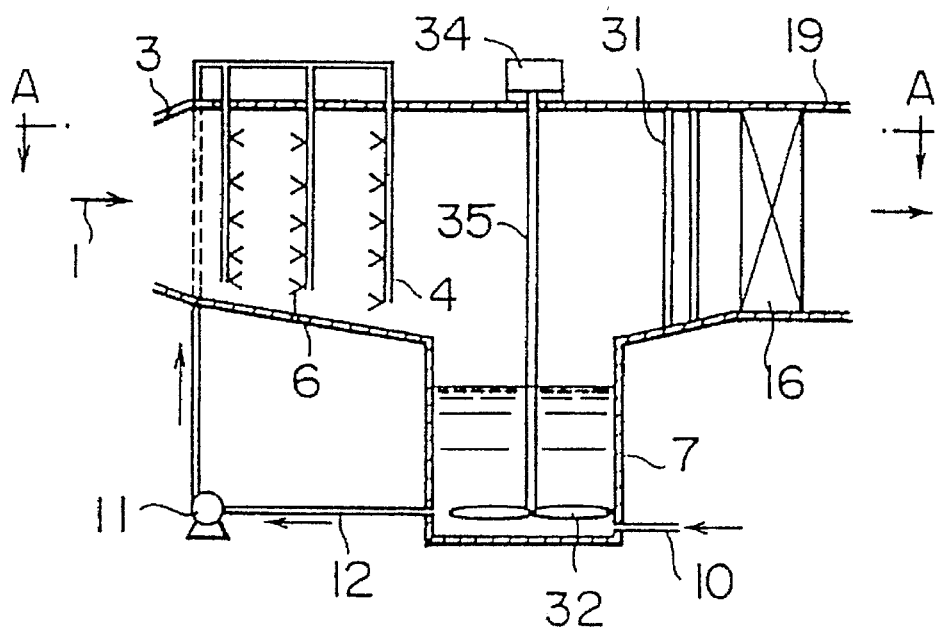
FIG. 19 is a view of another modification to the wet-type flue gas desulfurizing plant shown in FIG. 17.
Figure 20:
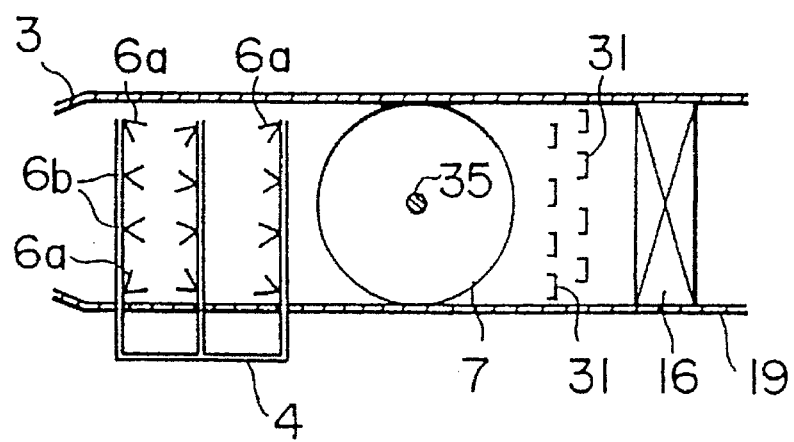
FIG. 20 is a cross-sectional view taken along line A—A in FIG. 19.

An embodiment is shown in FIGS. 19 and 20 (FIG. 20 is a sectional view taken along line A—A in FIG. 19), in which a plurality of collision plates 31, each having an U-shaped section are placed in a vertically zigzag pattern traverse to the gas flow path, upstream of demister 16. In this embodiment, an absorbing liquid, containing $SO_2$ gas absorbed in inlet duct 3, is recovered in circulation tank 7, and oxidizing air is dispersed uniformly into the absorbing liquid by a propeller blade 32 within the tank 7. The propeller blade 32 is rotated through a shaft 35 by a motor 34 mounted on a ceiling portion of the circulation tank 7.

The mist entrained in the gas flow is removed by the U-shaped collision plates 31 placed upstream of the demister 16. Since the U-shaped collision plates 31 are disposed at two or more stages in the zigzag pattern, most of the mist entrained in the gas flow is removed. In addition, since the U-shaped collision plates 31 are disposed in the zigzag pattern, the pressure drop is greatly reduced, and 90% or more of the scattered mist is removed. In order to prevent the absorbing liquid deposited on the U-shaped collision plates 31 from drying and adhering thereto, equipment (not shown) for water washing the collision plates 31 may be provided.

When the spray pipes 4 are mounted horizontally, as already described, the direction of the absorbing liquid sprayed by the spray nozzles 6a near the sidewall surface of the inlet duct 3 is turned inwardly of the inlet duct 3, as shown in FIG. 20, so that the absorbing liquid does not collide against the sidewall, thereby preventing scattered mist from being generated.

For large-sized spray nozzles 6, usually hollow cone nozzles (see FIG. 2) having a spray angle of 90 degree are used. When spray pipes 4 having hollow cone nozzles are mounted horizontally, the direction of absorbing liquid sprayed by the spray nozzles 6 is turned in the gas flow direction and a large amount of the absorbing liquid is blown against the sidewall of the inlet duct 3. On the contrary, when the spray nozzles 6a in the vicinity of the sidewall of the inlet duct 3 shown in FIG. 20 are turned inwardly, the amount of scattered mist is 50% or less of that when the spray from the spray nozzles 6 is turned in the gas flow direction. The spray nozzles 6b at the central portion of the spray pipes 4 in FIG. 20 may be placed in such a manner that the direction of slurry spray is cocurrent with the gas flow.

Figure 21:
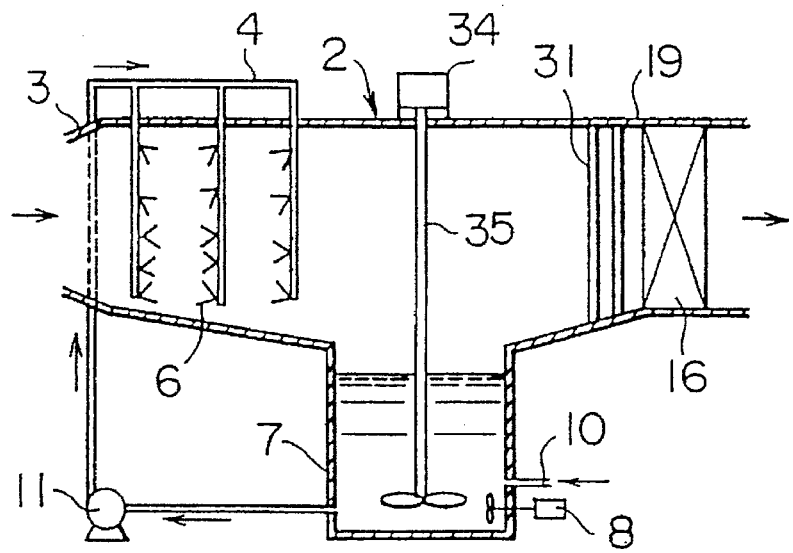
FIG. 21 is a view of a modification to the wet-type flue gas desulfurizing plant shown in FIG. 19.

An example of a desulfurization plant is shown in FIG. 21, in which spray nozzles 6 are placed in the inlet duct 3 in such a manner that the direction of the spray of absorbing liquid sprayed thereby is turned downwardly more than horizontally, leading to a reduced amount of scattered mist. Desirably, spray nozzles 6 at an upper stage are oriented in such a manner that the direction of slurry spray is downward, more than horizontal, and spray nozzles 6 at a lower stage are oriented in such a manner that the direction of slurry spray is horizontal or slightly upward. By establishing the direction of slurry spray from the spray nozzles 6 in this manner, it is possible to reduce the amount of mist reaching the demister 16 without any variation in desulfurizing performance.

Figure 22:
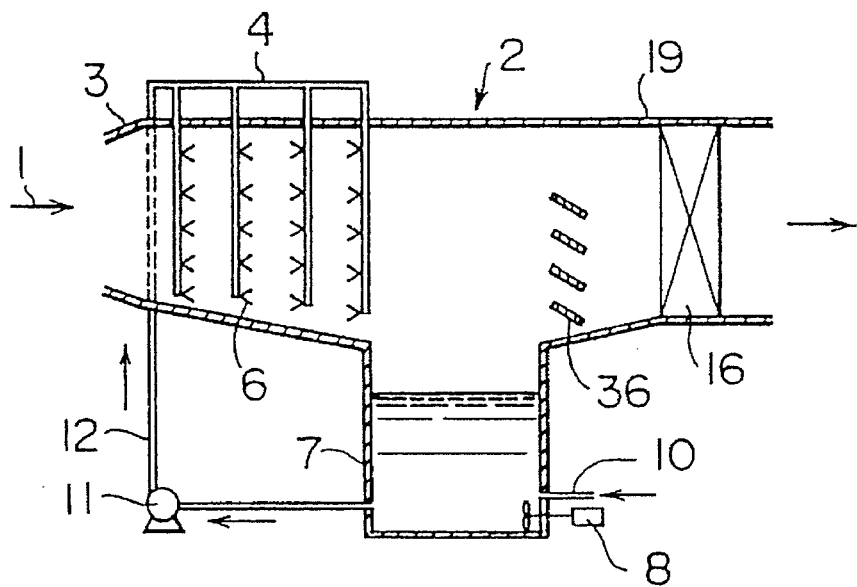
FIG. 22 is a view of a further modification to the wet-type flue gas desulfurizing plant shown in FIG. 17.

Another example of a desulfurization plant is shown in FIG. 22, in which spray nozzles 6 at two stages spray cocurrently to the gas flow and at two stages spray in a countercurrent direction. Slurry droplets sprayed from the spray nozzles 6 are entrained in the gas flow and scattered toward a succeeding demister 16, but most of such mist drops out by gravity before reaching the demister 16. When an exhaust gas 1 is introduced to flow horizontally into the absorber tower 2, mist drops downwardly just upstream of the demister at an angle in the range of 10 to 30 degrees with respect to the horizontal. Thus, most of the mist reaching the demister 16 collides against a lower portion of the demister 16. Therefore, by placing louver-type inserts 36 at a lower portion of the duct upstream of the demister 16, it is possible to remove the mist while wetting both the surface and the back of the louver-type insert 36 with the mist. If the louver-type insert 36 is turned downwardly at an angle in a range of from 5 to 45 degrees with respect to the horizontal, the gas path through the louver-type insert 36 is defined as the same direction as the locus of mist spray at the region in which the louver-type inserts 36 are placed and hence, there is little pressure drop and it is unnecessary to wash the surface of the louver-type insert 36 with water.

Figure 23:
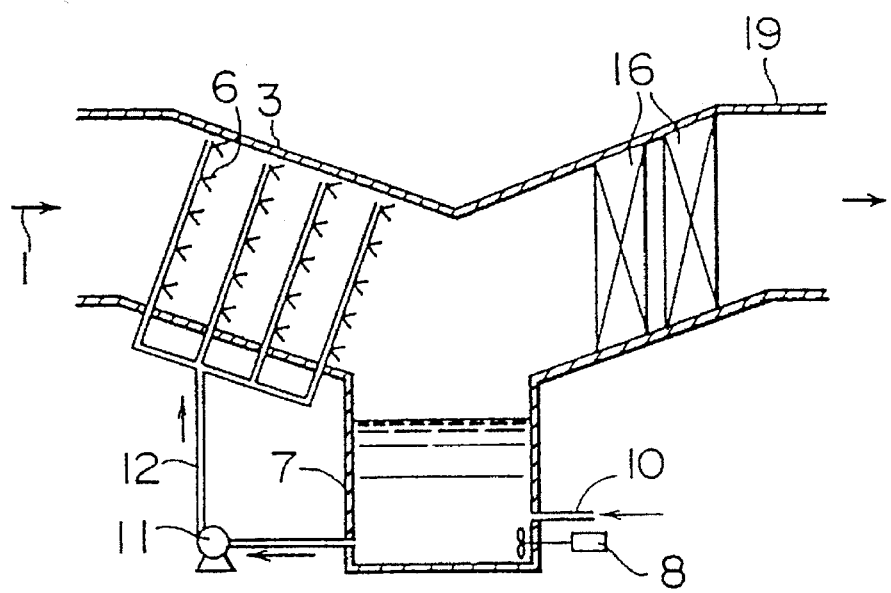
FIG. 23 is a view of a further modification to the wet-type flue gas desulfurizing plant shown in FIG. 17.
Figure 24:
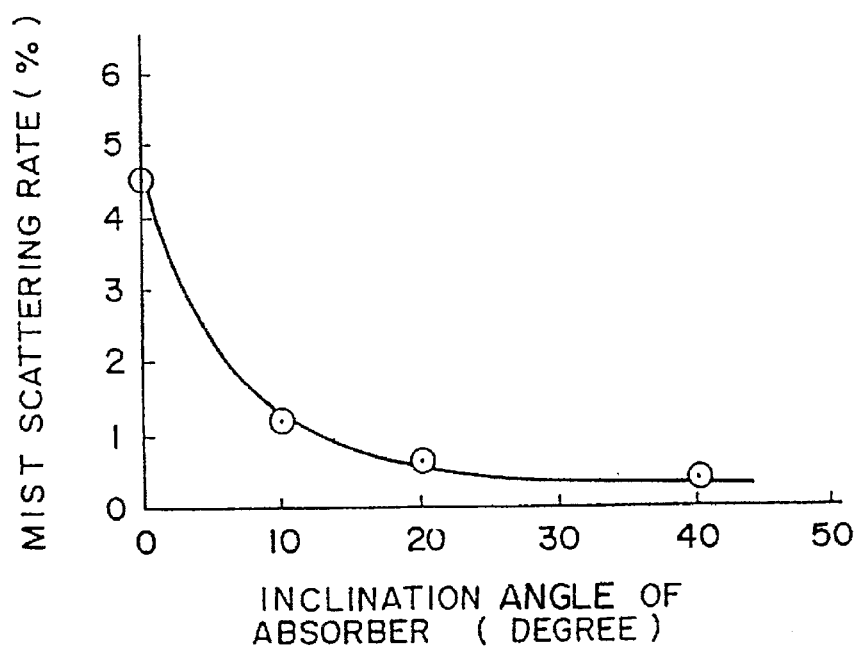
FIG. 24 is a graph of percentage of mist scattering versus angle of inclination of absorber in a cold model test for the plant shown in FIG. 23.

Yet another example of a desulfurization plant is shown in FIG. 23, in which the absorber tower has a V-shaped side configuration. In the desulfurization plant shown in FIG. 23, spray nozzles 6 are mounted parallel to the direction of inclination of inlet duct 3 and parallel to the gas flow. Alternatively, the spray nozzles 6 may be disposed with combined concurrent and countercurrent relationships to the gas flow. An exhaust gas 1 is introduced into the inlet duct 3 inclined downwardly from the horizontal, while the spray of absorbing liquid is moved downwardly by gravity. Above circulation tank 7, the gas flow is reversed upwardly and, hence, scattered mist is diverted from the gas flow and drops onto the surface of the absorbing liquid in the circulation tank 7. In this manner, the amount of mist entrained in the gas flow entering the demister 16 is reduced considerably. It is desirable that the inclination angle of the V-shape of the absorber tower 2 be in a range of 10 to 50 degrees with respect to the horizontal. Results of a cold model experiment are shown in FIG. 24 (the angle of inclination is the abscissa and the percent of mist is the ordinate). If the angle of inclination angle is 10 degrees or more, the amount of mist reaching the demister 16 can be reduced to the extent of one fourth of that when the inclination angle is zero. If the inclination angle is set at 40 degrees, the amount of mist reaching the demister 16 can be reduced to the extent of one tenth of that when the inclination angle is zero. Therefore, it is desirable that the inclination angle be set at a value as large as possible. However, if the inclination angle is set at a larger value, the height of the inlet duct 3 must be correspondingly higher, resulting in an increased cost for manufacture of the absorber tower 2. Thus, it is necessary to set the inclination angle at a value as small as possible. FIG. 24 illustrates results of an experiment which was carried out with a countercurrent spray and a gas flow velocity of 12 m/sec, using a plant including an absorbing tower 2 having a section of 950 mm×950 mm and 2 inch hollow cone type nozzles.

As described above, in the horizontal desulfurization plant, the amount of mist reaching the demister 16 can be reduced without reducing the desulfurizing performance.

Figure 25:
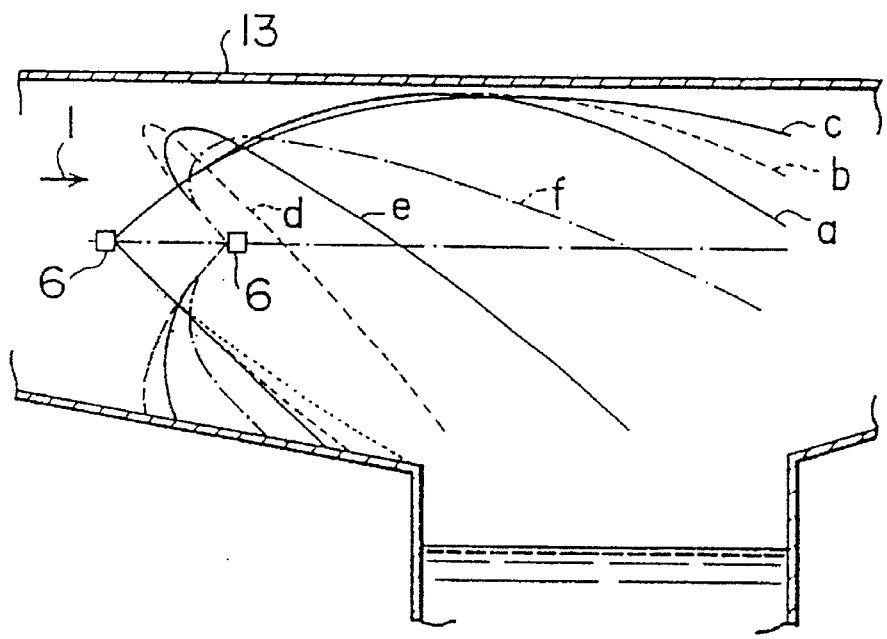
FIG. 25 is a graph illustrating the scattering of mist in full scale operation.

FIG. 25 illustrates results of a simulation analysis of spray in a horizontal desulfurization plant for a generator plant of a 350 MW scale. FIG. 25 illustrates behavior of mist droplets having a diameter of 1.5 mm which were formed using hollow cone-type spray nozzles 6 with a spray angle of 90 degrees. The curves in FIG. 25 represent the following conditions:

Cocurrent Spray

Curve a: 6 m/sec., Curve b: 8 m/sec., Curve c: 12 m/sec.
Countercurrent Spray

Curve d: 6 m/sec., Curve e: 8 m/sec., Curve f: 12 m/sec.

It can be seen from these results that if the gas flow velocity is increased from 6 m/sec. to 12 m/sec., the amount of mist entering the demister 16 is increased, particularly in the case of the countercurrent spray. If the gas flow velocity is increased in this manner, the desulfurization plant can be reduced in size, but the amount of mist is increased, and the load of mist on the demister 16 is increased. For this reason, unless the method as described above is adopted, the desulfurization plant is not practical.

Figure 26:
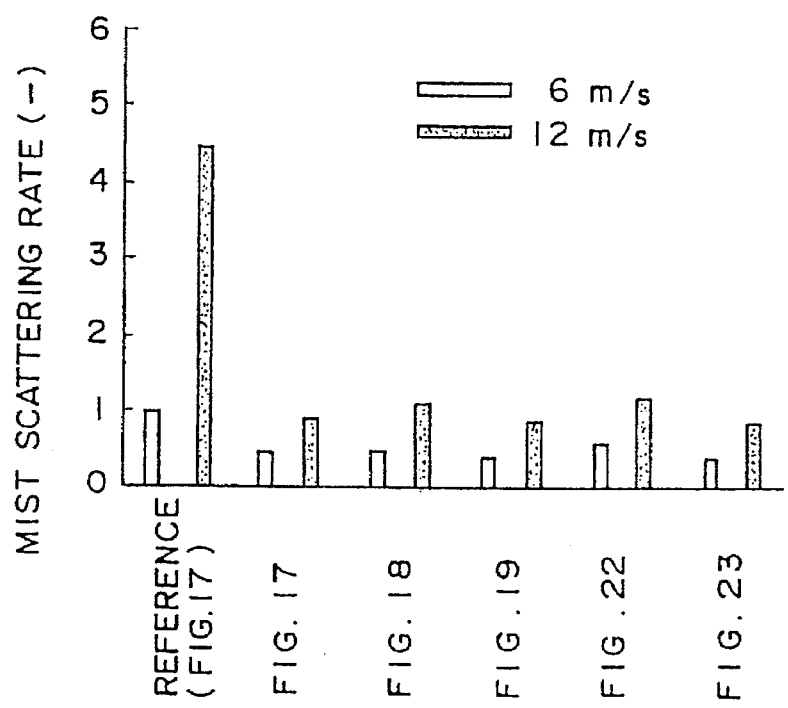
FIG. 26 is a bar graph of amounts of mist scattering for different embodiments in cold model tests on a scale which is one fifth of full scale.

FIG. 26 illustrates results of a test for the present embodiment carried out in a 1/5 cold model. FIG. 26 illustrates a comparison between mist percentage under conditions of gas flow velocities of 6 m/sec. and 12 m/sec. The test results of FIG. 26 were obtained with no insert provided in the duct, as shown FIG. 17. If the gas flow velocity is increased to 12 m/sec., the mist percentage rate, where no insert is provided, is increased to 4.5 times that for 6 m/sec., but if the desulfurization plant according to the present embodiment (FIGS. 17–19 and FIGS. 22, 23) invention is used, the mist percentage rate, particularly even when the gas flow velocity is increased, is substantially equal to that for 6 m/sec. This remains true even with the use of prior art two-stage demisters 16.

Fifth Embodiment

Figure 63:
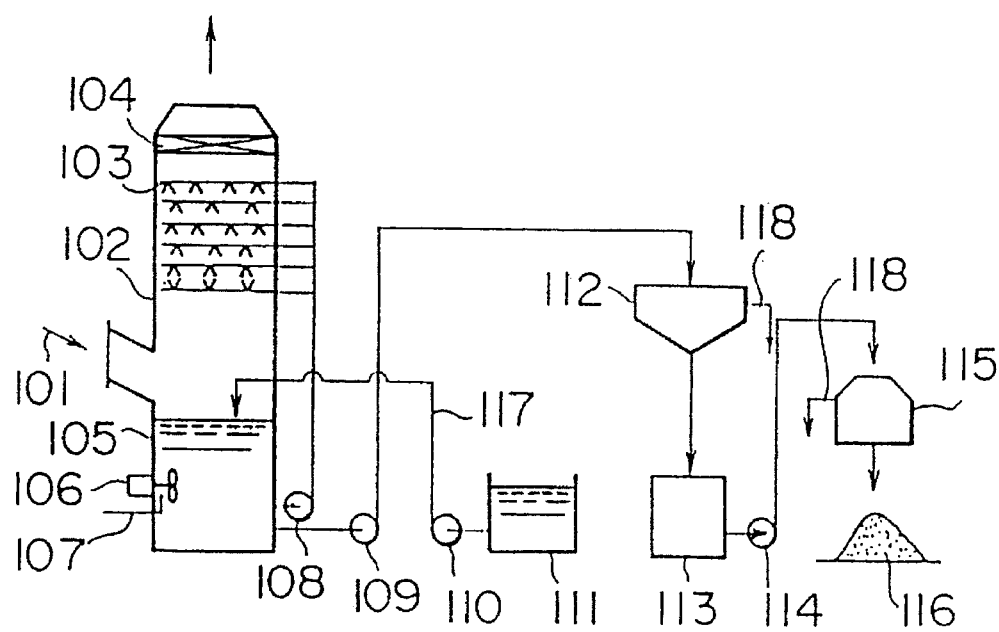
FIG. 63 is a schematic flow diagram of the prior art wet-type exhaust gas desulfurizing plant.

The prior art technique as shown in FIG. 63 suffers from the following problems:

(i) Not only calcium carbonate (limestone), capable of absorbing $SO_2$, but also gypsum, which does not contribute to the absorption of $SO_2$, are contained in large amounts in the absorbing liquid. However, if the proportion of limestone in the absorbing liquid is increased in order to enhance the desulfurizing performance, the quality of gypsum is reduced and as a result, the gypsum is not usable.

(ii) A large amount of oxidizing air is required (a large amount of power is required by the pumps supplying air and by the agitators).

(iii) A large amount of power is required for pulverizing limestone.

Figure 27:
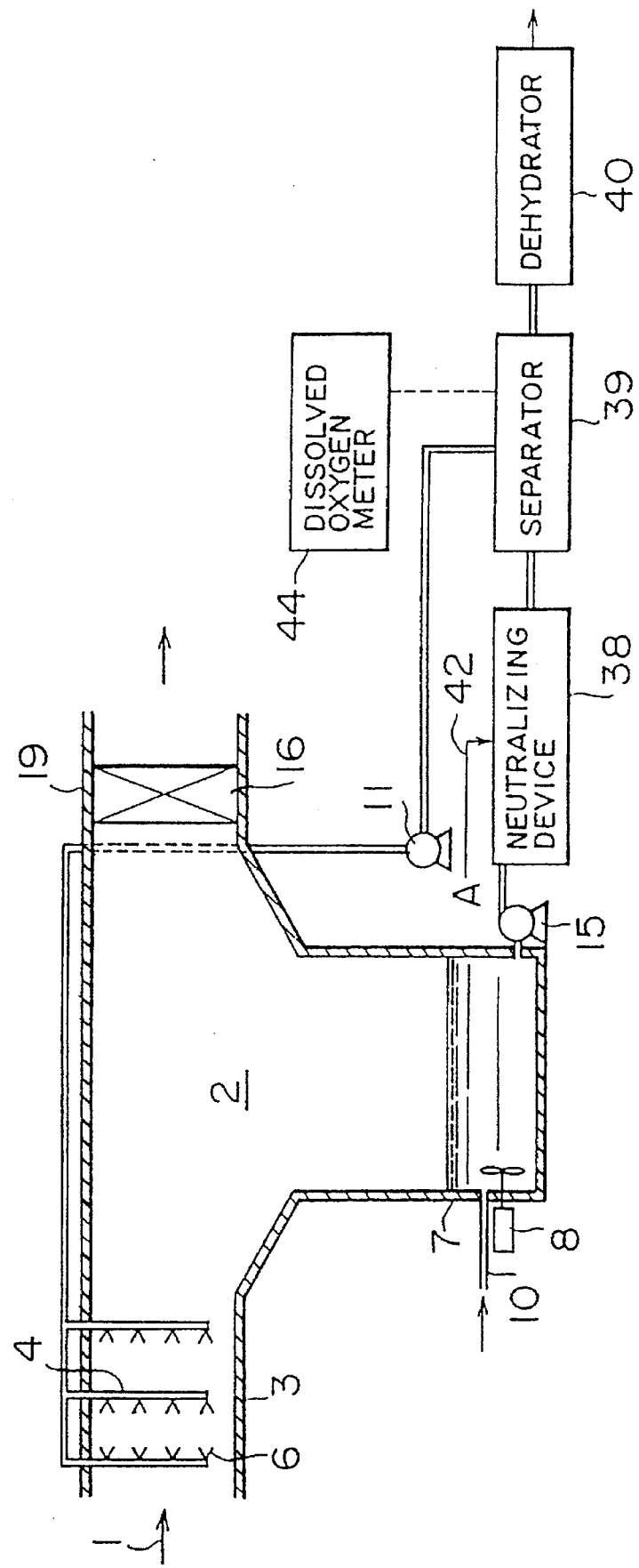
FIG. 27 is a schematic view of a wet-type flue gas desulfurizing plant according to a fifth embodiment of the present invention.

The present embodiment is intended to address the above problems associated with the prior art technique shown in FIG. 63. A horizontal desulfurization plant is schematically shown in FIG. 27. As in the desulfurization plant shown in FIG. 1, the horizontal desulfurization plant shown in FIG. 27 is comprised of an inlet duct 3, spray nozzles 6, a circulating tank 7, agitator means 8, air blowing pipes 10, a demister 16 and an outlet duct 19. The plant of this embodiment further includes a neutralizing device 38 for increasing the pH of the absorbing liquid, after that value has been decreased by absorption of $SO_2$ in exhaust gas 1, and a separator 39 for separating gypsum and limestone.

The absorbing liquid sprayed from the spray nozzles 6 in the inlet duct 3 of absorber tower 2 selectively absorbs $SO_2$ from the exhaust gas 1 to produce sulfurous acid and drops into the circulation tank 7, where the sulfurous acid is oxidized to produce sulfuric acid. The absorbing liquid containing the sulfuric acid is transferred by an absorbing liquid withdrawing pump 15 into the neutralizing device 38, where it is neutralized by limestone and, at the same time, gypsum is produced. The absorbing liquid containing the gypsum is fed to the separator 39, where the limestone and gypsum are separated off. Then, the absorbing liquid containing limestone is recirculated to the spray nozzles 6 to selectively absorb $SO_2$. The absorbing liquid containing a larger amount of gypsum is fed to a dehydrator 40, where it is dehydrated and the gypsum is recovered. The limestone A is supplied to the neutralizing device 38.

Experiment Example 1

A desulfurizing test was carried out using the plant of this embodiment. The concentration of $SO_2$ in exhaust gas 1 in the inlet duct 3 was 1,000 ppm. Limestone (having an average diameter of 5 mm) in an amount equivalent to the moles of $SO_2$ in a two hour flow of the exhaust gas 1 was placed in the neutralizing device 38. Limestone A in the amount 0.97 times the amount of $SO_2$ in the exhaust gas 1, i.e. a molar ratio of 0.97, was supplied from a limestone supply pipe 42. The amount of air blown into the circulation tank 7 provided a molar ratio of oxygen to $SO_2$ in the exhaust gas of 1 to 30.

Figure 28:
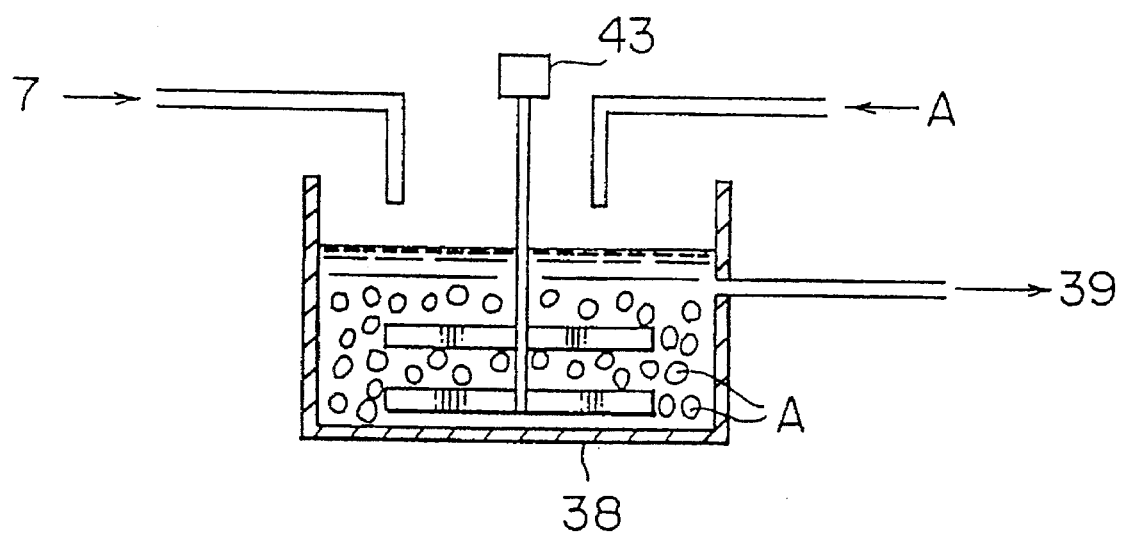
FIG. 28 is a view illustrating the structure of the neutralizing device in the fifth embodiment.
Figure 29:
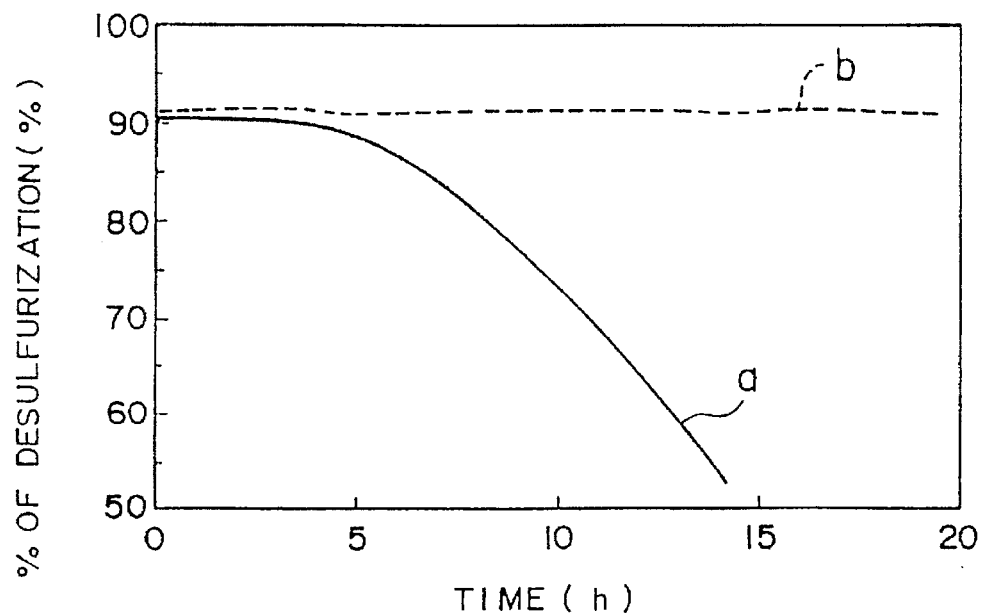
FIG. 29 is a graph illustrating variation (curve a) in percent desulfurization with time, when the absorbing liquid is agitated by a neutralizing device and variation (curve b) in percent desulfurization with time, when the absorbing liquid is not agitated.

FIG. 29 is a graph showing variation in percent desulfurization (the ordinate) with time (the abscissa). At an initial stage of the desulfurizing reaction, a high desulfurizing performance was exhibited, but the percent desulfurization decreased with time. The cause was examined and as a result, it was ascertained that the decrease in percent desulfurization was because gypsum formed a scale covering the surfaces of the limestone particles in the neutralizing device 38, resulting in a reduced reactivity of the limestone. Therefore, the improved plant shown in FIG. 28 agitates the limestone A in the neutralizing device 38 using agitator 43. Curve "b" in FIG. 29 illustrates variation in percent desulfurization with time after the improvement. In this case, a reduction in percent desulfurization was not observed, and a high desulfurizing performance was provided for a long time. The concentration of $SO_2$ in the exhaust gas 1 in the inlet duct 3 was varied from 100 to 5,000 ppm, but under any condition, a high desulfurizing performance was provided for a long time by using the agitator 43.

Experiment Example 2

Figure 30:
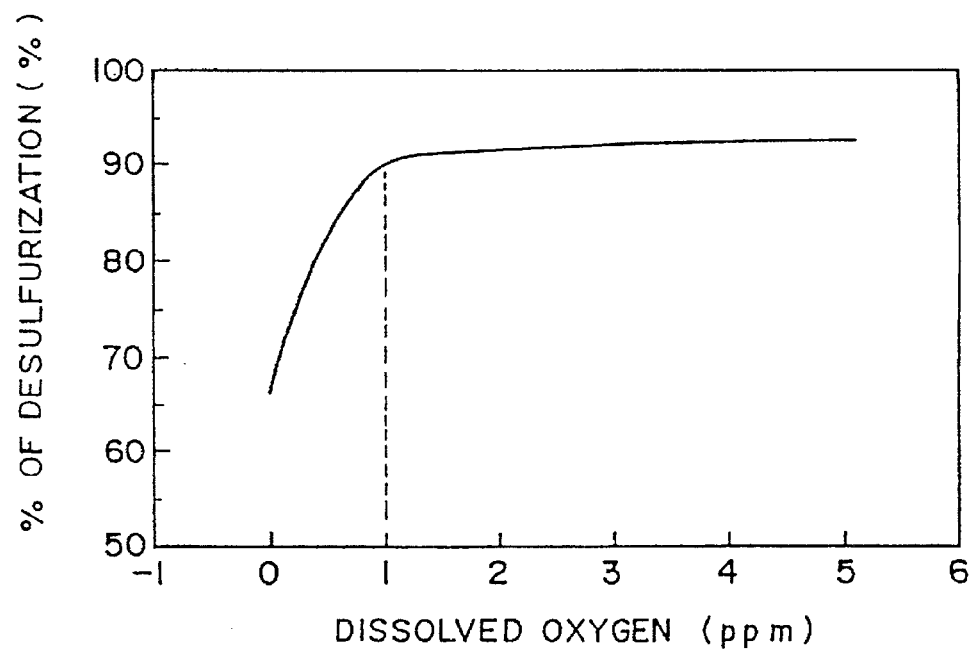
FIG. 30 is a graph of the relationship between the amount of oxygen dissolved in an absorbing liquid and the percent desulfurization in the fifth embodiment.

The desulfurizing performance was examined under the same conditions as in Experiment Example 1, except that the amount of air blown into the circulation tank 7 was varied from 10 times to 100 times $SO_2$ in the exhaust gas 1, and the concentration of oxygen dissolved at that time in the absorbing liquid in the separator 39 was measured using a dissolved-oxygen meter 44. FIG. 30 illustrates the relationship between the dissolved-oxygen concentration (the abscissa) and the percent desulfurization (the ordinate), wherein if the dissolved-oxygen concentration is equal to or less than 1 ppm, the percent desulfurization is decreased. This is presumed to be because if the amount of air blown into the circulation tank 7 is too small, $H_2SO_3$ is not completely oxidized and remains in the liquid and, hence, the advancement of an absorbing reaction ($H_2O+SO_2= H_2SO_3$) becomes slower. It is desirable that the dissolved-oxygen concentration is measured, and the amount of oxidizing air is controlled so that the concentration of the dissolved-oxygen is 1 ppm or more.

The neutralizing device 38 in the above-described embodiment is intended to react the absorbing liquid with the limestone A. A neutralizing device 38 of any structure can be used if it prevents formation of gypsum scale on the surfaces of the limestone particles. In addition to the use of the agitators 43 as described above, prevention of the formation of gypsum scale on the surfaces of the limestone particles may utilize the bubbling of gas such as air in the tank 7. Any means such as a wet-type cyclone, if it is capable of separating the gypsum particles and the limestone particles, may be used as the separator 39. If the concentration of the limestone particles in the absorbing liquid is low or the effect of its presence on quality of gypsum is negligible, the separator 39 can be omitted. Further, the neutralizing device 38 and the separator 39 may be unified into a single device, so that the device has both neutralizing and separating functions.

The present invention is useful regardless of the direction of flow of exhaust gas or the manner of contact between the exhaust gas and the absorbing liquid (in a wet wall type absorber etc.).

Figure 31:
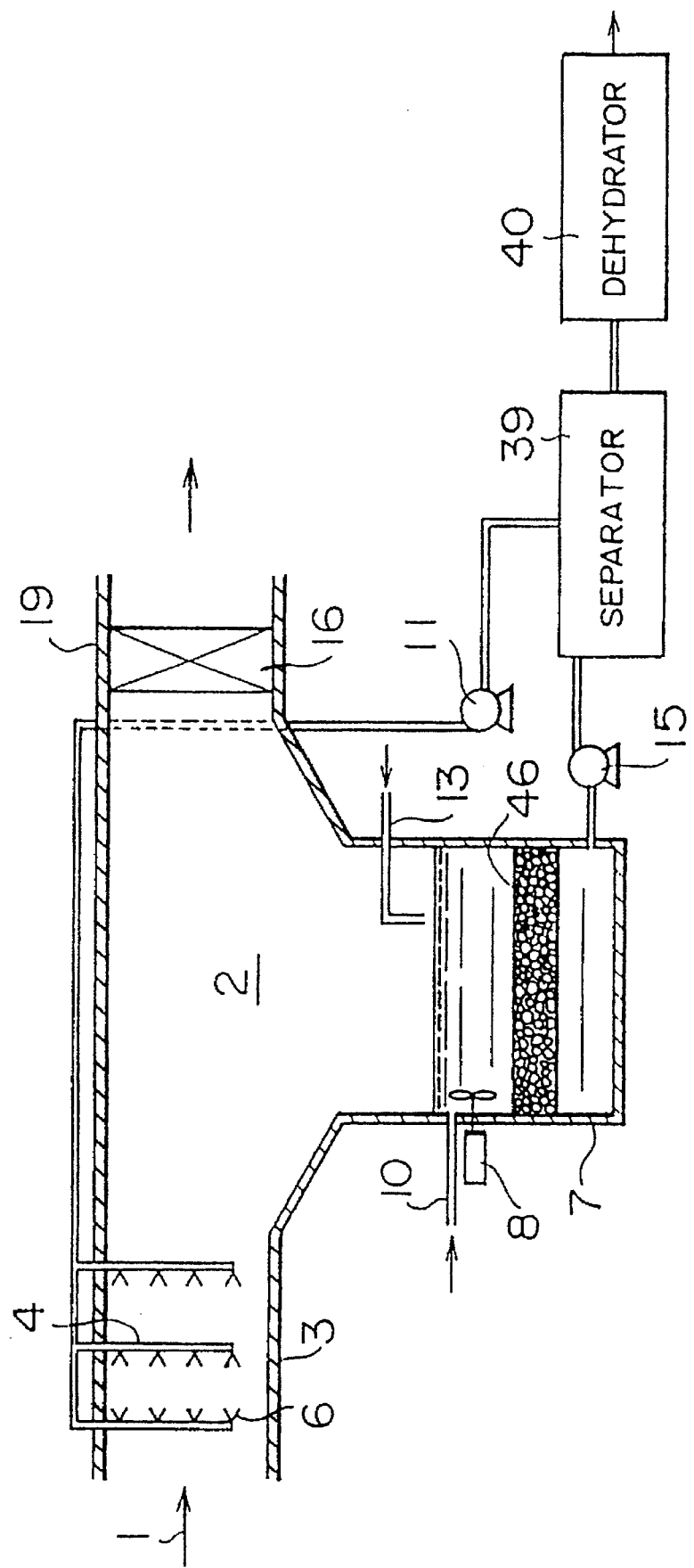
FIG. 31 is a view of a modification to the desulfurizing plant shown in FIG. 27.

In the desulfurizing plant shown in FIG. 27, the neutralizing device 38 is placed outside the absorber tower 2, but a limestone A layer of packing 46 may be provided in a lower portion of the circulation tank 7 as shown in FIG. 31 which illustrates flow in the plant of this embodiment. Even with such a structure, it is preferable to prevent gypsum scale from forming on the limestone particles. If the bottom of the circulation tank 7 functions to separate the gypsum particles and the limestone, the separator 39 may be omitted.

In this way, according to the present embodiment, the amount of air required, because of a high oxidizing rate and the agitators 8 for finely dispersing the air, may be smaller. In addition, because coarse limestone is used, it need not be pulverized. The limestone, which has a large particle size (1 mm or more), can be easily separated from the gypsum particles (usually of 20 to 100 μm), so that the amount of the limestone in the neutralizing device 38 can be increased. Thus, a high desulfurizing performance is provided, and gypsum of an improved quality is obtained, because the limestone is scarcely mixed with the gypsum particles.

Sixth Embodiment

Figure 32:
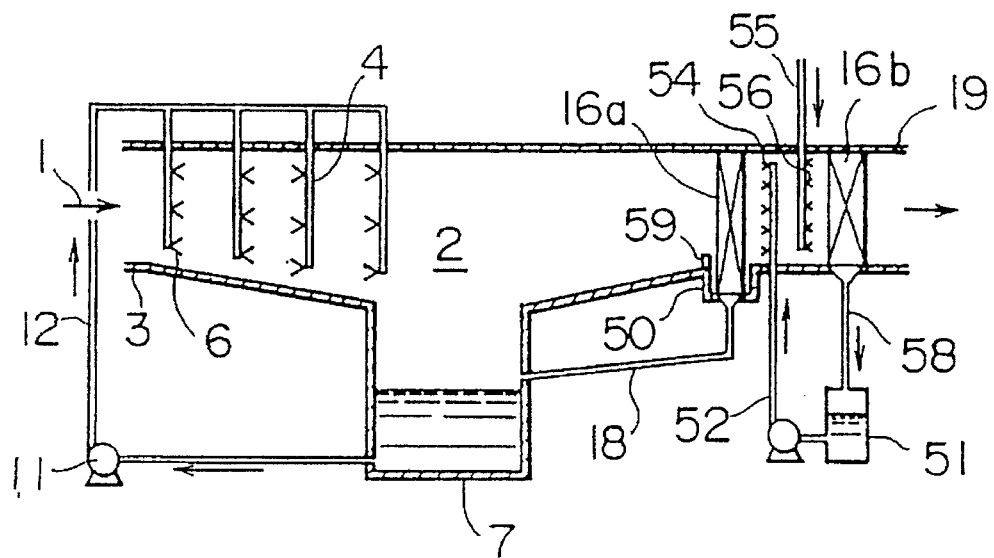
FIG. 32 is a schematic view of a wet-type flue gas desulfurizing plant according to a sixth embodiment of the present invention.
Figure 33:
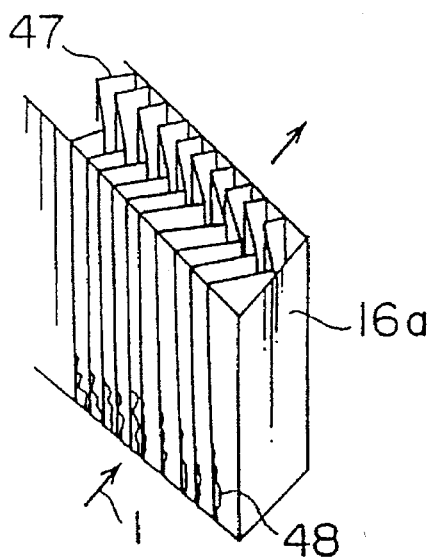
FIG. 33 is a perspective view of the demister in the plant shown in FIG. 32.

A sixth embodiment is shown in FIG. 32. Droplets of smaller diameters in an absorbing liquid spray emanating from spray nozzles 6 are entrained by the exhaust gas 1, but are recovered by demister 16a and demister 16b provided in outlet duct 19. During this time, as shown in FIG. 33, mist reaching the demister 16a collides against an element 47 of the demister 16a and is collected therein and then drops in the form of a liquid film 48 onto a lower portion of the element 47. This liquid is collected in a groove 50 in a wall surface of the duct 19 below the demister 16a and passed through a mist recovery pipe 18 back to a circulation tank 7. Particles including gypsum are contained in the mist and gradually deposit on the surface of the element 47 of the demister 16a. Therefore, in order to wash off the particles deposited on the element 47 of the demister 16a, washing-water accumulated in a washing water tank 51 is supplied into a washing water pipe 52 by a pump and intermittently sprayed from washing water nozzles 54 into the demister 16a. For washing an element of the downstream demister 16b, a liquid free from dust is used as wash water. This washing liquid is supplied from a washing water pipe 55 through washing water spray nozzles 56.

The particle-containing liquid used therein as the washing water is collected in the lower portion of the demister 16b and fed to the washing water tank 51. The amount of particles deposited on the downstream demister 16b is far smaller than that on the upstream demister 16a and, therefore, if this liquid is collected in the washing water tank 51 and utilized for washing the upstream demister 16a, fresh wash water need not be used for the demister 16a.

Figure 34:
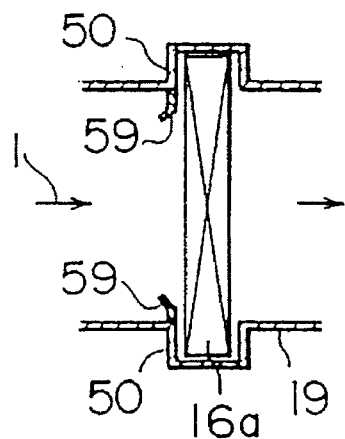
FIG. 34 is a detailed plan view of the demister portion in the plant shown in FIG. 32.

The demister 16a and associated duct are shown in plan view in FIG. 34. The size of the demister 16a is larger than the diameter of the outlet duct 19. Further, the demister 16a is provided with a groove 50 and, hence, scattered liquid cannot be passed between the duct 19 and the demister 16a. Most of the mist is passed along the inner wall surface of the outlet duct 19 to reach the upstream demister 16a and therefore, in order to prevent the mist from entering the demister 16a, a weir 59 may be placed in front of the demister 16a. The weir 59 has its distal end bent in the direction of the gas flow, so that the liquid collected on this portion is permitted to smoothly flow toward the lower portion of outlet duct 19 without being reentrained.

Figure 35:
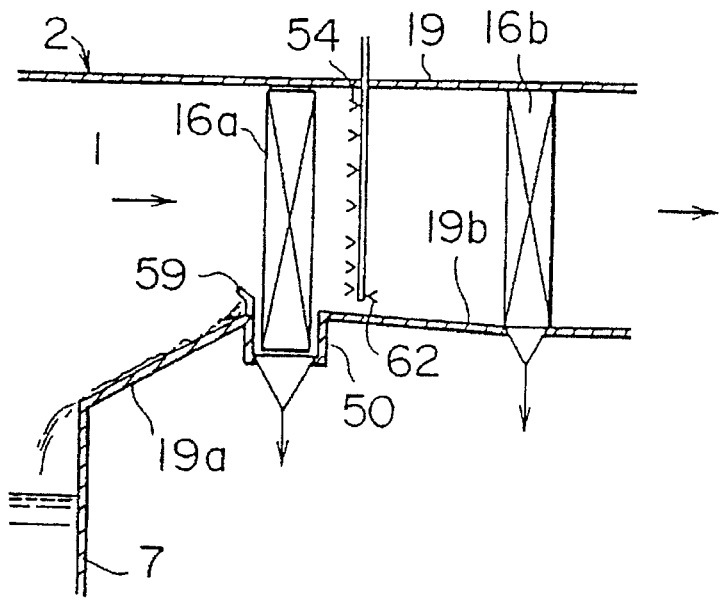
FIG. 35 is a cross-sectional view of a modification to the demister portion of the plant shown in FIG. 32.

FIG. 35 illustrates detailed structure of a section of the demisters 16a and 16b. Since the weir 59 is placed in front of the upstream demister 16a, as described above, the scattered mist, which has passed along the inner wall surface 19 to reach the demister 16a, is collected in the bottom of the duct 19 by the weir 59. A tank-side inclined portion 19a is formed on the bottom surface of the outlet duct 19 to extend from the weir 59 toward the circulation tank below the absorber tower 2. Therefore, the collected liquid is passed along the tank-side inclined portion 19a to promptly flow down into the circulation tank 7 and, hence, cannot be reentrained from the weir 59.

A demister-side inclined portion 19b is formed on the bottom surface of the duct 19 between the demisters 16a and 16b, so that the droplets accumulated on the inclined portion 19b are permitted to flow into the downstream demister 16b. Further, bottom-washing spray nozzles 62 may be placed on the demister-side inclined portion 19b, thereby ensuring that the mist and particles accumulated on the bottom of the duct 19 can be intermittently or constantly washed off to prevent a deposition problem.

Figure 36:
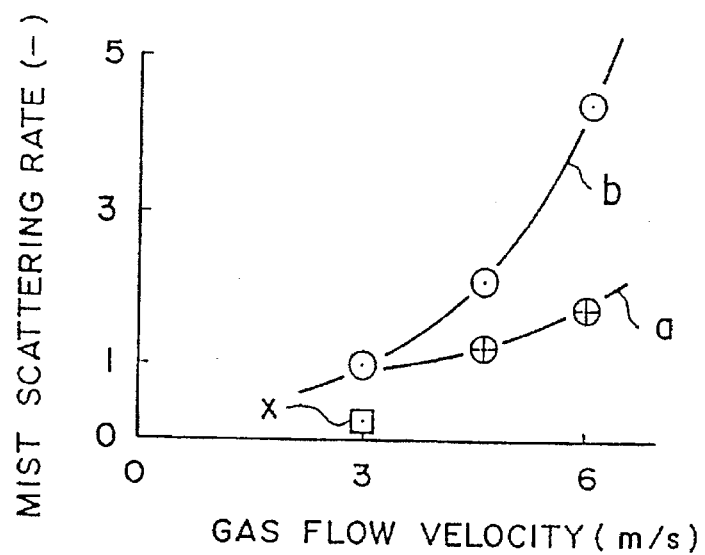
FIG. 36 is a graph of mist scattering rate versus gas flow velocity (curve a) when a weir is provided in the sixth embodiment of the present invention and mist scattering rate versus gas flow velocity (curve b) when a weir is not provided.

FIG. 36 compares the amount of mist scattered in the prior art vertical absorber tower 102 (FIG. 63) with the amount of mist scattered in the horizontal absorber tower 2 in this embodiment. The proportion of the mist scattered based on the total amount of absorbing liquid sprayed is the ordinate, while the gas flow velocity is the abscissa. As used herein, the amount of mist scattered is defined as that amount of mist reaching the upstream demister 16a. If the amounts of mist scattered at a gas flow velocity of 3 m/sec in the prior art vertical absorber tower 102 and in the horizontal absorber tower 2 are compared with each other, the amount of mist scattered (point X in FIG. 35) in the prior art vertical absorber tower 102 is very small, i.e. 0.2, provided the amount of mist scattered (curve a) in this embodiment is defined to be 1. On the contrary, in the horizontal absorber tower 2 having no weir 59, the amount of mist scattered (curve b) increases as the gas flow velocity is increased and if the gas flow velocity is 6 m/sec, the amount increases to a level about 4 times that in the present embodiment. This is because most of the mist entrained in the gas flow collides against the inner wall surface of the duct 19 and reaches the demister 16a. On the contrary, in the present embodiment, even if the gas flow velocity is increased, most of scattered mist colliding against the weir 59 on the inner wall surface of the outlet duct 19, which might otherwise reach the demister 16a, can be collected by the weir 59. Therefore, even if the gas flow velocity is increased, the load on the demister 16 is not increased, and the mist collecting performance of the demister 16 does not suffer.

As described above, in this embodiment, even if the gas flow velocity is increased to increase the amount of mist, the load on the demisters 16a and 16b increases less and consequently, the performance of the demisters 16a and 16b is not reduced, and it is unnecessary to provide an additional device for collecting the mist.

Seventh Embodiment

Figure 37:
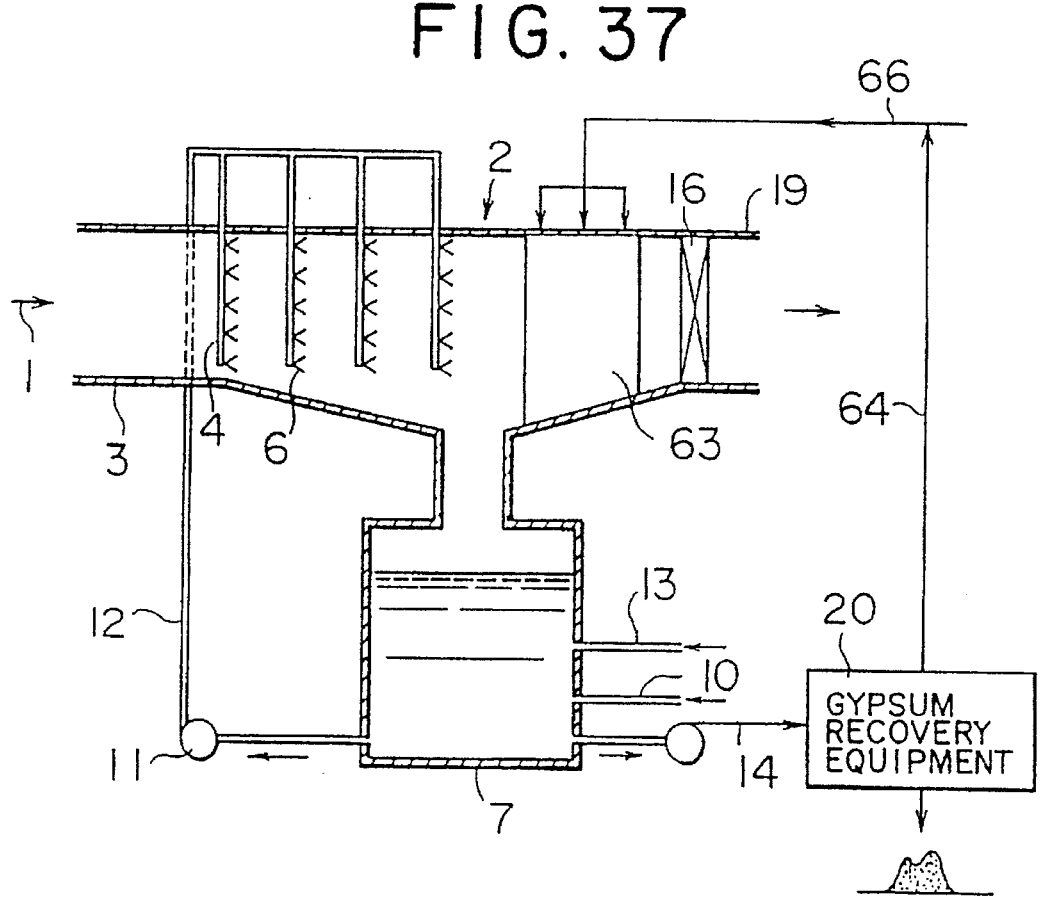
FIG. 37 is a schematic view of a wet-type flue gas desulfurizing plant according to a seventh embodiment of the present invention.

The desulfurizing plant of this embodiment is shown in FIG. 37. A bottom wall surface of an inlet duct 3 in absorber tower 2 is gently inclined in order to recover the absorbing liquid sprayed from spray nozzles 6 in the inlet duct 3. A substantial portion of the absorbing liquid sprayed from the spray nozzles 6 is collected on a plurality of vertical plates 63 placed in outlet duct 19, the collected liquid forming a film on the surface of each of the vertical plates 63, thereby absorbing and removing sulfur dioxide gas which has been escaped capture by spray from spray nozzles 6. The vertical plates 63 are arranged in parallel to the gas flow direction, as shown in an enlarged view of FIG. 38. In order to prevent scaling of the vertical plates 63, they may be washed by supernatant water from line 64, recovered from gypsum recovery tank 20, or by supplemental water from line 66. The absorbing liquid incapable of being completely collected by the vertical plates 63 is removed by a demister 16.

Figure 39:
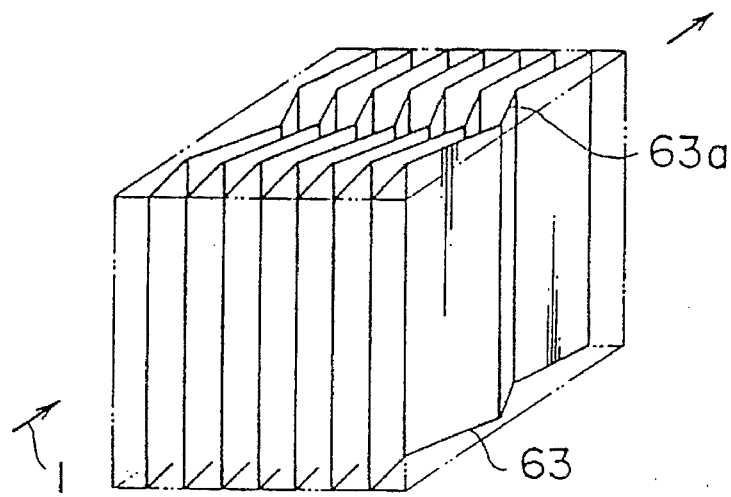
FIG. 39 is a perspective view of a modification to the vertical plate portion shown in FIG. 38.

A vertical plate 63 folded as shown in FIG. 39 may be employed. In this case, when the scattered mist passes a folded portion 63a, it is deposited on the vertical plate 63 by an inertial collision, leading to an improved efficiency of removal of the scattered mist.

Experiment Example

Figure 38:
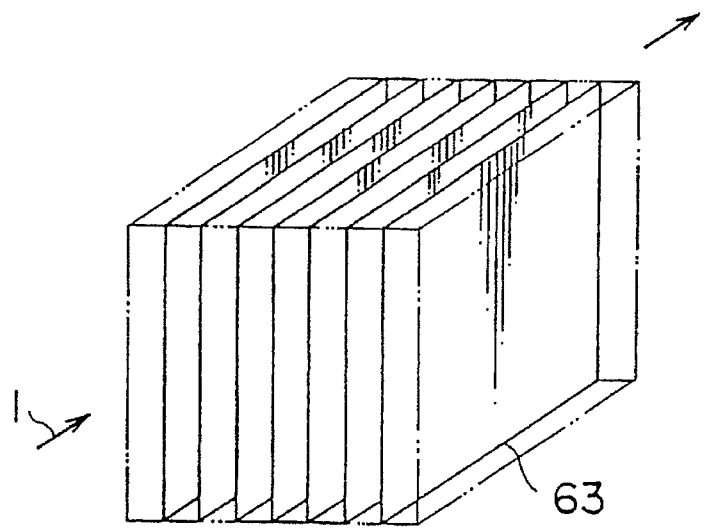
FIG. 38 is a perspective view of a vertical plate portion in the plant shown in FIG. 37.

In order to certify the effectiveness of this embodiment (using vertical plates 63 as shown in FIG. 38), a test was carried out using a 2,500 m³N/hr pilot. Results are shown below.

(1) Conditions

| | |
|---|---|
| Amount of Exhaust gas: | 2,500 m³N/hr |
| SO₂ Concentration in Inlet: | 2,000 ppm |
| Liquid-Gas Ratio: | 15 liter/m³N |
| Gas Flow velocity in Tower: | 5–12 m/sec. |

(2) Results

| Item | G.F.V. of 5 m/sec Absence of V.P. | G.F.V. of 5 m/sec Presence of V.P. (Present Example) | G.F.V. of 12 m/sec Presence of V.P. (Present Example) |
|---|---|---|---|
| Desulfurization (%) | 86.0 | 92.4 | 94.3 |
| Amount of mist in Inlet of Demister 16 (g/m³N) | 200 | 12 | 100 |
| Amount of mist in Outlet of Demister 16 (mg/m³N) | 120 | 22 | 54 |

G.F.V. = Gas Flow Velocity
V.P. = Vertical plate

It was confirmed from the above test results that the amount of mist in the inlet of the demister 16 could be reduced and the desulfurizing performance could be increased by placing the plurality of vertical plates 63 upstream of the demister 16 in the outlet duct 19.

The placement of the plurality of vertical plates 63 downstream of the spray nozzles 6 in this manner ensures that even if the gas flow velocity in the absorber tower 2 is increased and the amount of scattering of sprayed droplets is thereby increased, the scattered mist can be collected by the vertical plates 63, and the liquid film of the absorbing liquid formed on the vertical plates 63 will absorb that portion of sulfurous acid gas not removed in the inlet duct 3, leading to an improved desulfurizing effect.

Eighth Embodiment

Figure 40:
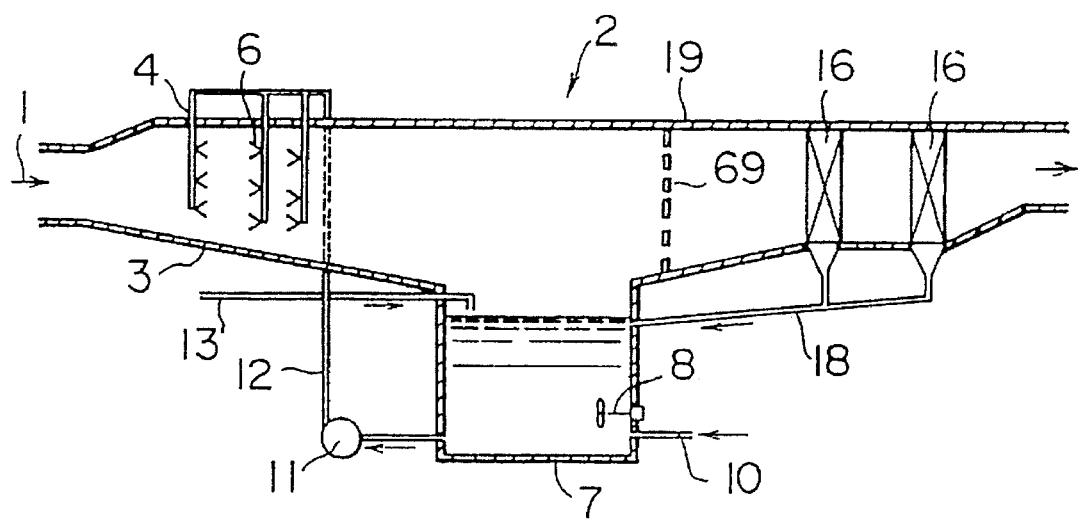
FIG. 40 is a schematic view of a wet-type flue gas desulfurizing plant according to an eighth embodiment of the present invention.
Figure 41:
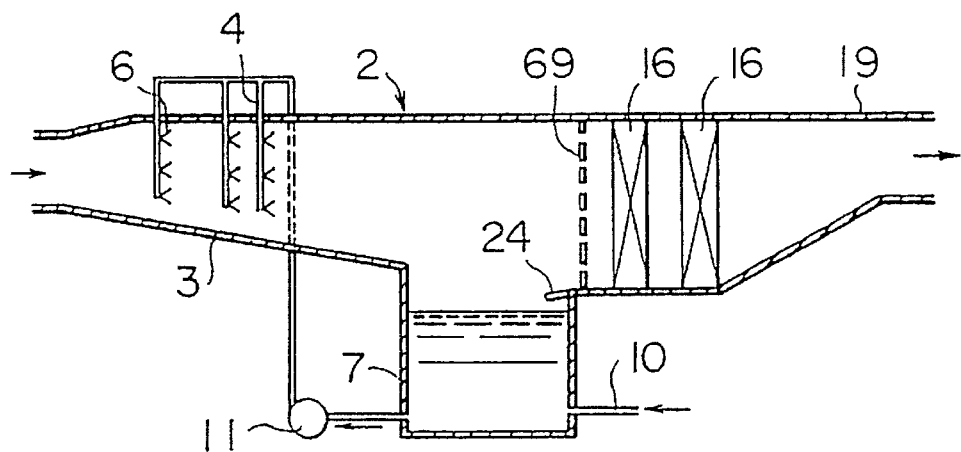
FIGS. 41, 42 and 43 are cross-sectional views of modifications to the plant shown in FIG. 40.
Figure 42:
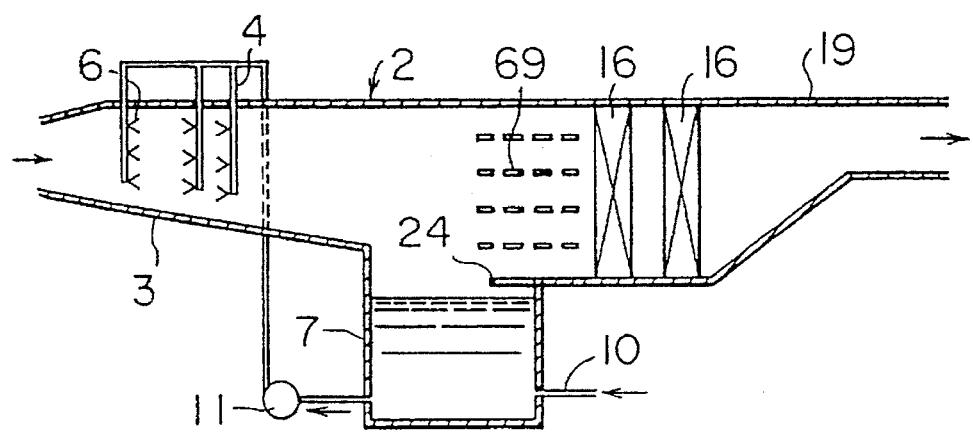

The desulfurization plant of this embodiment is shown in FIG. 40. This embodiment has a porous plate 69 extending across a section in the duct at the gas outlet side of an absorber tower 2, i.e., downstream of and above circulation tank 7. It is preferable that a porous baffle 24 for preventing scattering of mist raised by the gas flow be provided at the junction between the horizontal portion with an outlet duct 19 and the sidewall of the circulation tank 7, as shown in FIGS. 41 and 42.

Exhaust gas 1 passing through the inlet duct 3 flows, with mist of an absorbing liquid entrained therein, in a downstream direction, but when it passes through the liquid film formed by the scattered mist colliding against the porous plate 69, placed upstream of a demister 16, a target percent desulfurization is achieved. That is, the surface (boundary film) of absorbing liquid spray droplets entrained in the exhaust gas 1 may have low velocity relative to the exhaust gas 1 in some cases, so that the surfaces of the sprayed droplets are not renewed; and, when such surfaces reach saturation with $SO_x$ desulfurizing performance will become lower, even if there is sufficient contact space between spray pipes 4 and the demister 16. However, the placement of resisting means such as the porous plate 69 between the spray pipes 4 and the demister 16 ensures not only that the scattered mist collides against the resisting means and is thus collected, but also that the liquid film is renewed to effectively achieve a desulfurizing reaction by passage of the exhaust gas through the liquid film formed on the porous plate 69 by the collected mist.

The resisting means is not limited to the porous plate 69, and any resisting member may be employed if it is capable of renewing the surface of the sprayed droplet of the absorbing liquid.

Figure 43:
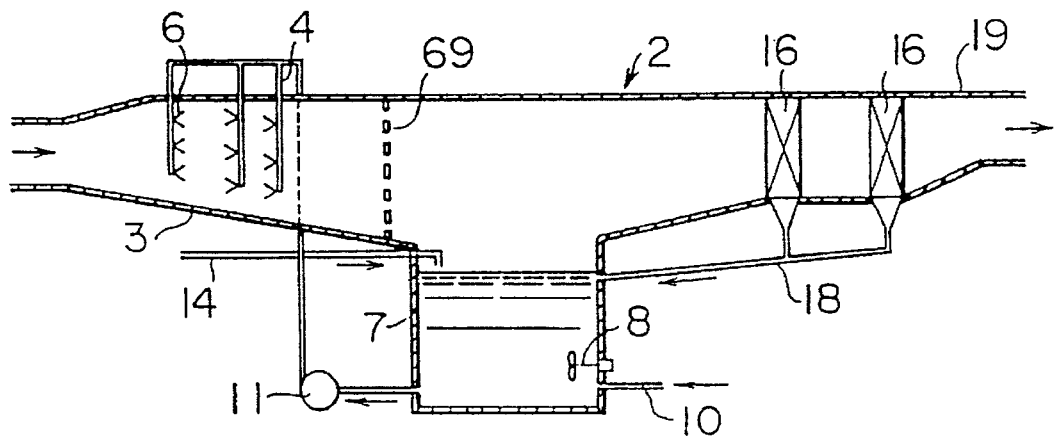

The porous plate 69 may be provided at the furthest downstream portion of the inlet duct 3, as shown in FIG. 43. It is desirable that the porous plate 69 have a pore size of 10 mm or more and an open portion of 20% or more, in order to handle the absorbing liquid and to reduce the pressure drop to the extent possible. A porous plate 69 having openings of equal size and equal pore spacing may be used, but the opening size and spacing can vary in a direction perpendicular to the exhaust gas flow. When the opening size and spacing are varied, it is preferable that the opening size in the lower portion of the porous plate 69 be larger than that in an upper portion, or that the spacing be smaller, while the proportion of openings is made larger, because the mist load is larger at the lower portion of the porous plate 69. In addition, it is desirable that the inlet duct 3 have a structure integral with the circulation tank 7 in order to reduce the scattering of mist downstream to a small extent, that the exhaust gas contact time be as long as possible, and that the sprayed absorbing liquid can be recovered to the extent possible.

A liquid-withdrawing slit may be provided in the porous plate 69 at a portion connected with the bottom of the absorber tower 2 and inclined with respect to the circulation tank 7.

Figure 44:
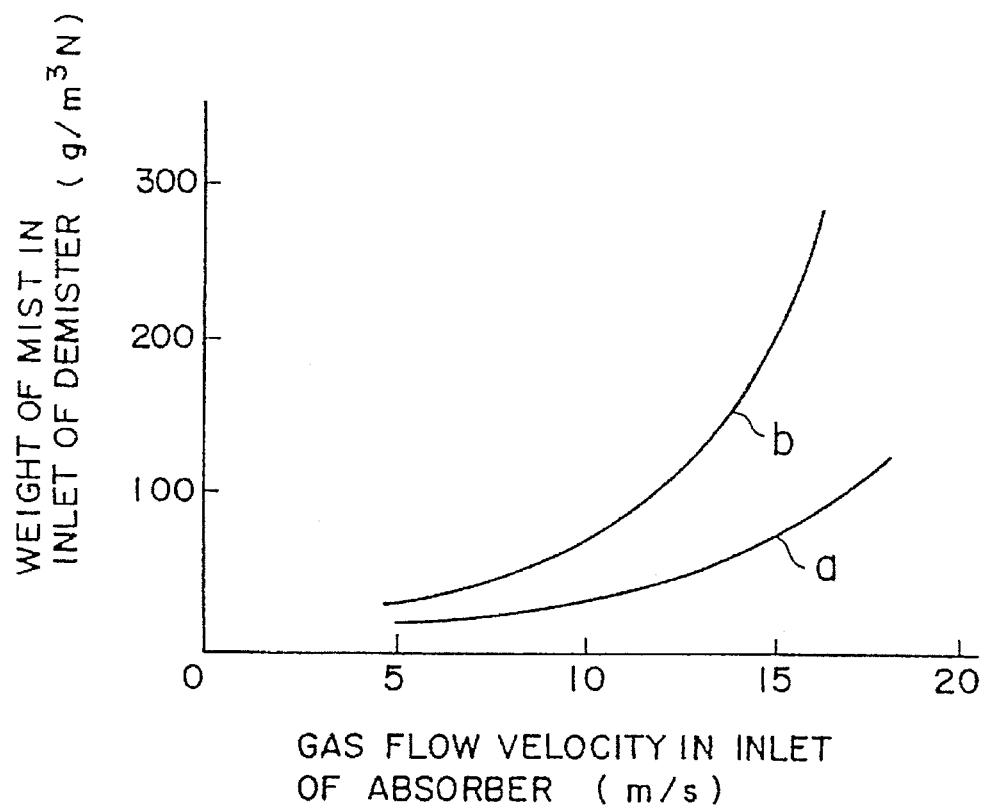
FIG. 44 is a graph of the weight of mist versus gas flow velocity (curve a) in the inlet of a demister when a porous plate is provided and the weight of mist versus gas flow velocity (curve b) in the inlet when the porous plate is not provided.

FIG. 44 is a graph illustrating the relationship between the gas flow velocity (abscissa) at the inlet of the absorber tower 2 and the amount of mist (ordinate) in the inlet of the demister 16, which were determined with a gas rate of 3,000 $m^3N/hr$ and an $SO_2$ concentration of 2,000 ppm. It has been found that when the porous plate 69 is provided (curve a), the amount of mist in the inlet of the demister 16 is smaller than that when the porous plate 69 is not provided (curve b), even if the gas flow velocity is increased and, thus, the provision of the porous plate 69 provides a considerable advantage.

Experiment Example 1

An exhaust gas treating experiment was carried out using the wet-type desulfurizing plant shown in FIG. 40. Test conditions and results were as follows:

| | |
|---|---|
| Amount of Gas: | 3,000 m3N/hr. |
| $SO_2$ Concentration: | 2,000 ppm |
| Concentration of Dust at Inlet: | 200 mg/m$^3$N |
| Temperature of Gas at Inlet: | 15° C. |
| Amount of Oxidizing Air: | 30 m$^3$N/hr |
| Number of Stages of Spray Pipes: | 3 |
| Liquid-Gas Ratio: | 15 liter/m$^3$N |
| Size of Inlet of Absorber Tower: | □350 mm |
| Percent of Excess Limestone: | 10% |
| Porous Plate | |
| Pore Size: | 40 mm |
| Opening Proportion: | 50% |
| (Test Results) | |
| Desulfurization Percent: | 80% |
| Oxidation Percent: | 99.7% |
| Tower Pressure Drop: | 100 mm $H_2O$ |
| Amount of Mist at Outlet: | 100 mg/m$^3$N |

Experiment Example 2

An exhaust gas treating experiment was carried out using the desulfurizing plant shown in FIG. 43. Test conditions and results are as follows:

| | |
|---|---|
| Amount of Gas: | 3,000 m$^3$N/hr. |
| $SO_2$ Concentration: | 2,000 ppm |
| Concentration of Dust at Inlet: | 200 mg/m$^3$N |
| Temperature of Gas at Inlet: | 15° C. |
| Amount of oxidizing Air: | 30 m$^3$N/hr |
| Number of Stages of Spray Pipes: | 3 |
| Liquid-Gas Ratio: | 15 liter/m$^3$N |
| Size of Inlet of Absorber Tower: | □350 mm |
| Percent of Excess Limestone: | 10% |
| Porous Plate | |
| Pore Size: | 40 mm |
| Opening Proportion: | 50% |
| (Test Results) | |
| Desulfurization Percent: | 83% |
| Oxidation Percent: | 99.7% |
| Tower Pressure Drop: | 115 mm $H_2O$ |
| Amount of Mist at Outlet: | 95 mg/m$^3$N |

Experiment Example 3

An exhaust gas treating experiment was carried out using the desulfurizing plant shown in FIG. 40, but using the inlet duct 3 (in FIG. 41) permitting all the absorbing liquid spray to be turned in a direction parallel to the gas flow. Test conditions and results were as follows:

| | |
|---|---|
| Amount of Gas: | 3,000 m³N/hr. |
| SO₂ Concentration: | 2,000 ppm |
| Concentration of Dust at Inlet: | 200 mg/m³N |
| Temperature of Gas at Inlet: | 150° C. |
| Amount of Oxidizing Air: | 30 m³N/hr |
| Number of Stages of Spray Pipes: | 3 |
| Liquid-Gas Ratio: | 20 liter/m³N |
| Size of Inlet of Absorber Tower: | □350 mm |
| Percent of Excess Limestone: | 10% |
| Porous Plate | |
| Pore Size: | 40 mm |
| Opening Proportion: | 50% |
| (Test Results) | |
| Desulfurization Percent: | 80% |
| Oxidation Percent: | 99.7% |
| Tower Pressure Drop: | 55 mm H₂O |
| Amount of Mist at Outlet: | 150 mg/m³N |

Comparative Experiment Example 1

An exhaust treating experiment was carried out substantially in the same manner as Example 1, except that the porous plate 69 mounted between the inlet duct 3 and the demister 16 in Experiment Example 1 was removed. Test results were as follows:

| (Test Results) | |
|---|---|
| Desulfurization Percent: | 67% |
| Oxidation Percent: | 99.7% |
| Tower Pressure Drop: | 80 mm H₂O |
| Amount of Mist at Outlet: | 150 mg/m³N |

After operation for 100 hours, the interior was inspected and as a result, considerable wear was observed in the demister 16.

In this embodiment, an equivalent effect is provided, even when all the spray nozzles 6 spray the absorbing liquid in a flow cocurrent with the exhaust gas flow, as shown in the above Experiment Example 3. In this case, however, the mist load is very high and hence, it is desirable that the porous plate 69 be placed downstream of the circulation tank 7 and upstream of the demister 16. It should be noted that when the demister 16 removes sprayed droplets, the maximum flow velocity may be approximately 7 to 8 m/sec and thus, in some cases, the size of the outlet duct 19 including the demister 16 may be larger than the size of the inlet duct 3 located upstream of the circulation tank 7.

In this embodiment, the purpose can be achieved to some extent even by providing porous plates 69 at a plurality of stages horizontally, i.e., in a direction parallel to the exhaust gas flow, as shown in FIG. 42. This is because the scattered mist flows in a downstream direction while dropping and, therefore, it can be collected even by the porous plates 69 to form a liquid film, thereby effecting desulfurization.

Figure 45:
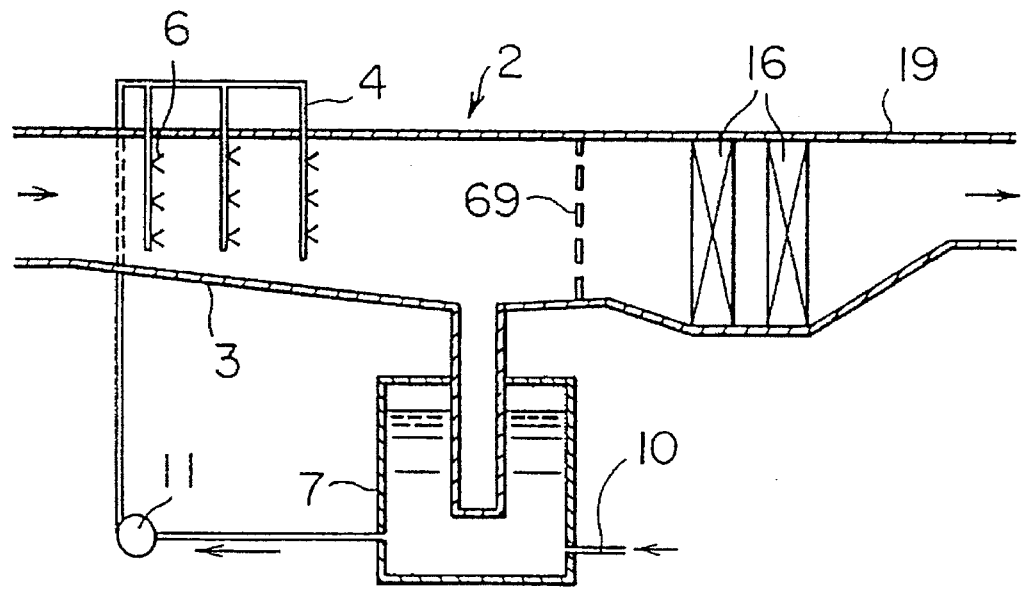
FIG. 45 is a view of a modification to the plant shown in FIG. 40.

This embodiment has been described as being of the structure in which the absorber tower 2 and the circulation tank 7 are integral with each other but, even in a structure in which the 25 absorber tower 2 and the circulation tank 7 are separate from each other and interconnected by a downcomer, as shown in FIG. 45, a similar effect can be obtained.

In this way, according to the present embodiment, the height of the absorber tower 2 is lower and a high desulfurizing performance and a reduction in amount of mist in the outlet can be achieved, leading to labor-savings and an increase in performance.

Ninth Embodiment

The wet-type flue gas desulfurizing plant of this embodiment is a horizontal type, as shown in FIG. 4. A schematic vertical sectional view (a view taken along line A—A in FIG. 4) of the inlet duct 3 and a circulation tank 7 is shown in FIG. 46, and a schematic sectional view taken along a line A—A in FIG. 46 is shown in FIG. 47.

Figure 46:
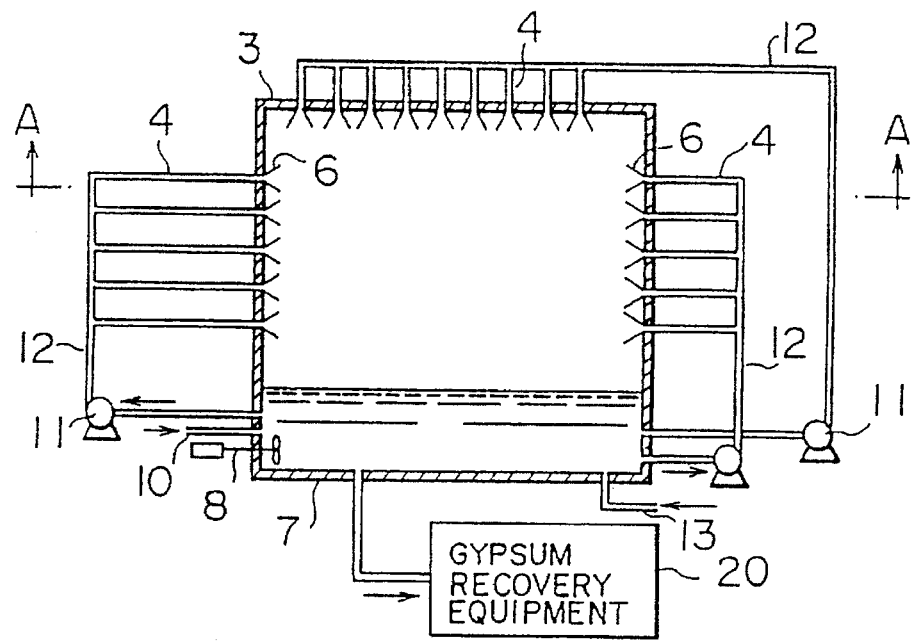
FIG. 46 is a cross-sectional view of a wet-type flue gas desulfurizing plant according to a ninth embodiment of the present invention, as viewed in the direction of gas flow.
Figure 47:
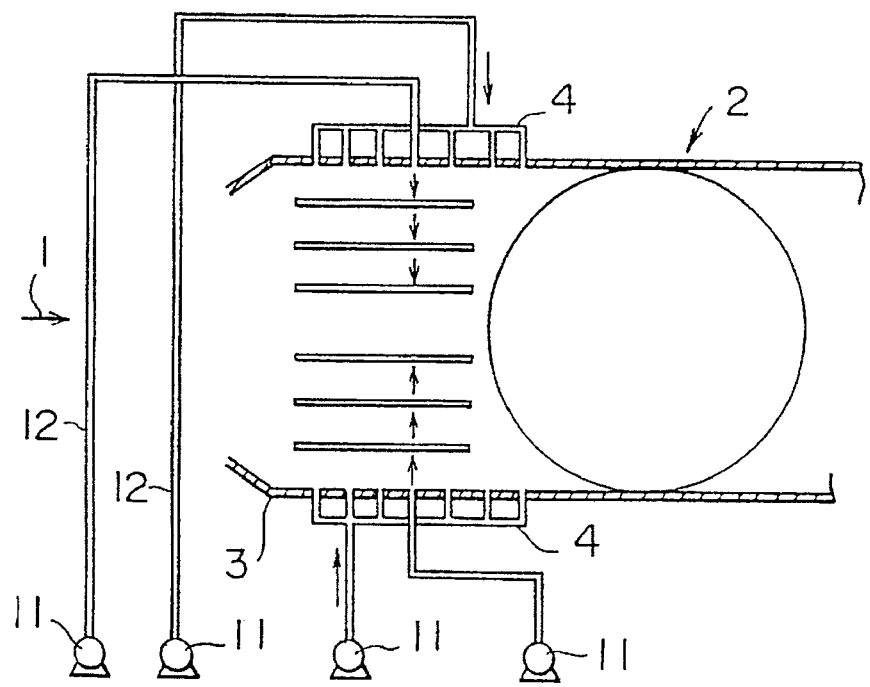
FIG. 47 is a cross-sectional view taken along line A—A in FIG. 46.

In the embodiment shown in FIG. 46, spray nozzles 6 are placed directly on two opposed sidewall surfaces and a ceiling wall surface of the inlet duct 3. Spray pipes 4 and liquid-circulating pipes 12 are mounted outside the inlet duct 3 and connected to the spray nozzles 6. Absorbing liquid is supplied from the circulation tank 7 via these pipes to the spray nozzles 6 by a circulating pump 11. It should be noted that the spray nozzles 6 mounted on the ceiling wall surface and the spray pipes 4 therefor may be omitted.

The absorber tower 2 in this embodiment has a structure in which the spray pipes 4 and supports for the spray pipes 4 are not located within the inlet duct 3 and hence there is no collision of the droplets of absorbing liquid against such elements which would render those colliding droplets unavailable for the absorbing reaction with $SO_x$ gas. Thus, in this embodiment, the absorbing liquid droplets are all capable of effectively contributing to a desulfurizing reaction and, therefore, to achieve the same percent desulfurization as in the desulfurizing plant shown in FIG. 4, a reduction in amount of absorbing liquid sprayed is possible.

In addition, in the absorber tower 2 in this embodiment, a circulation pump 11 is utilized for each group of spray pipes 4 disposed on the sidewalls and ceiling of the inlet duct 3. Therefore, the amount of absorbing liquid sprayed can be varied for a particular sidewall or at a particular ceiling portion, depending upon the type, flow rate or $SO_2$ content of the exhaust gas.

It should be noted that in all the embodiments of the present invention, the amount of absorbing liquid sprayed from the spray nozzles 6 is adjusted by spray amount adjusting means (not shown) provided in the spray pipes 4.

The vertical sectional contour of the absorber tower 2 has been shown as being square in FIG. 46, but may be rounded. In addition, the spray pipes 4 and the spray nozzles 6 have been shown as been placed horizontally in FIGS. 46 and 47, but the invention is not limited to this orientation and these elements may be oriented vertically.

When spray pipes 4 and supports for the pipes 4 are placed within the absorber tower 2, it is conventional practice to use a high-quality material such as a stainless steel for the pipes 4 10 in order to prevent corrosion, because the slurry liquid is strongly acidic. In this embodiment, however, such a high-quality material need not be used, because the spray pipes 4 and the like are placed outside the absorber tower.

With this embodiment, if the same desulfurizing performance 15 as in the plant shown in FIG. 4 is intended to be obtained, the amount of liquid sprayed can be reduced, leading to a reduced cost of operation. In addition, since there is no insert within the desulfurizing plant, the manufacture cost of the plant can be reduced.

Tenth Embodiment

Figure 48:
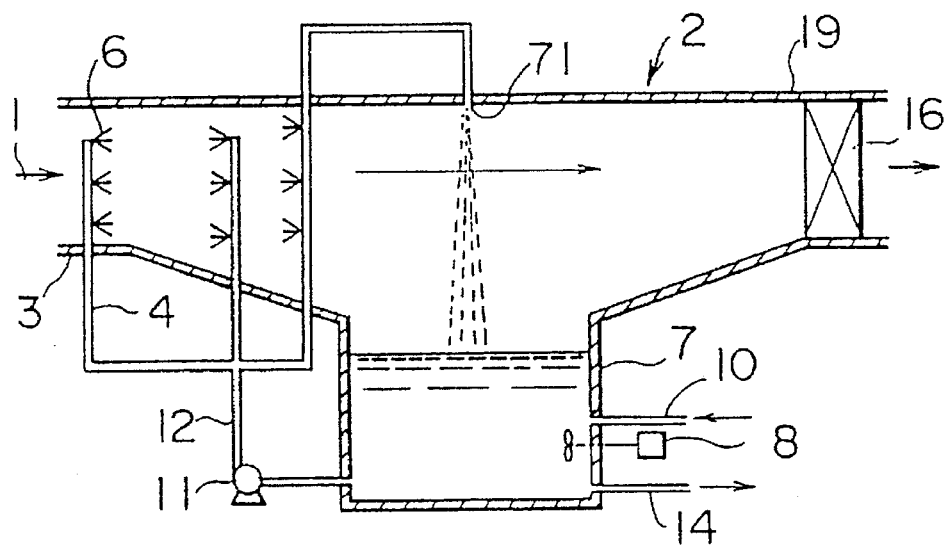
FIG. 48 is a schematic view, in cross-section, of a wet-type flue gas desulfurizing plant according to a tenth embodiment of the present invention.

This embodiment is shown in FIG. 48. In this embodiment, a 15 mist-removing spray nozzle 71, for spraying an absorbing liquid, is mounted on a ceiling portion of a circulation tank 7, i.e. a ceiling portion of an absorber tower 2. The purpose of this embodiment is to collect the scattered mist contained in the exhaust gas and to thereby reduce the mist collecting load on the demister 16, by utilizing the dusting function for mist of the absorbing liquid spray, particularly, from the spray nozzle 71, without use of any insert such as the porous plate 69 provided in the outlet duct 19 shown in FIG. 40. A portion of the absorbing liquid supplied from circulating pump 11 is sprayed from the mist-removing spray nozzle 71 toward the liquid surface within the circulation tank 7. Therefore, exhaust gas 1 introduced through the inlet duct 3 is passed in a direction perpendicular to this spray. During this time, the scattered mist collides against the spray droplets travelling toward the liquid surface in the circulation tank 7 and is thereby collected.

Figure 50:
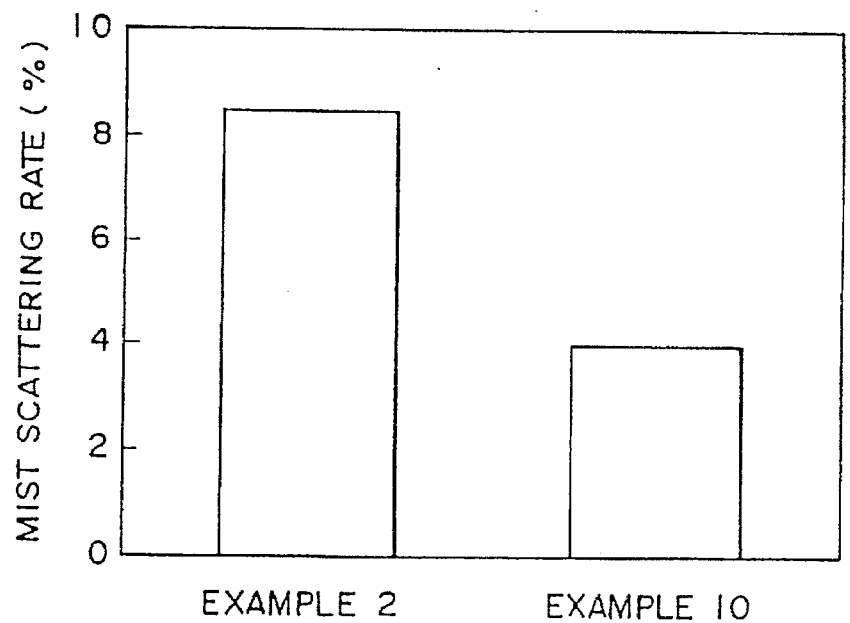
FIG. 50 is a bar graph comparing mist scattering rates in the tenth and first embodiments.
Figure 51:
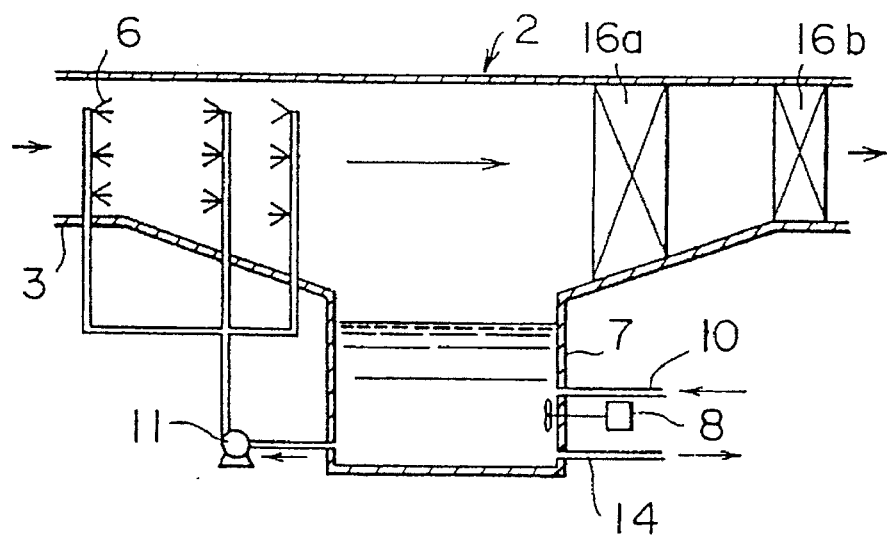
FIG. 51 is a cross-sectional view of another modification to the plant shown in FIG. 48.

Operation of this embodiment is illustrated in FIG. 50. It can be seen from FIG. 50 that the mist scattering rate (the proportion of the amount of mist scattered based on the total amount of absorbing liquid sprayed) at the inlet of the demister 16 is reduced to substantially one half of that in the second embodiment (in FIG. 4) using the single stage demister 16 without provision of an upstream demister 16a (FIG. 51), thereby providing an effect substantially equivalent to that when the upstream demister 16a (FIG. 51) is provided.

The absorbing liquid sprayed from the mist-removing spray nozzle 71 also absorbs $SO_2$ in the exhaust gas 1 and, therefore, the above-described function can be sufficiently achieved by withdrawing a portion of the absorbing liquid supplied to the spray nozzles 6 without increasing the amount of absorbing liquid recirculated by the circulation pump 11. Thus, the power for the circulation pump 11 need not be increased.

Figure 49:
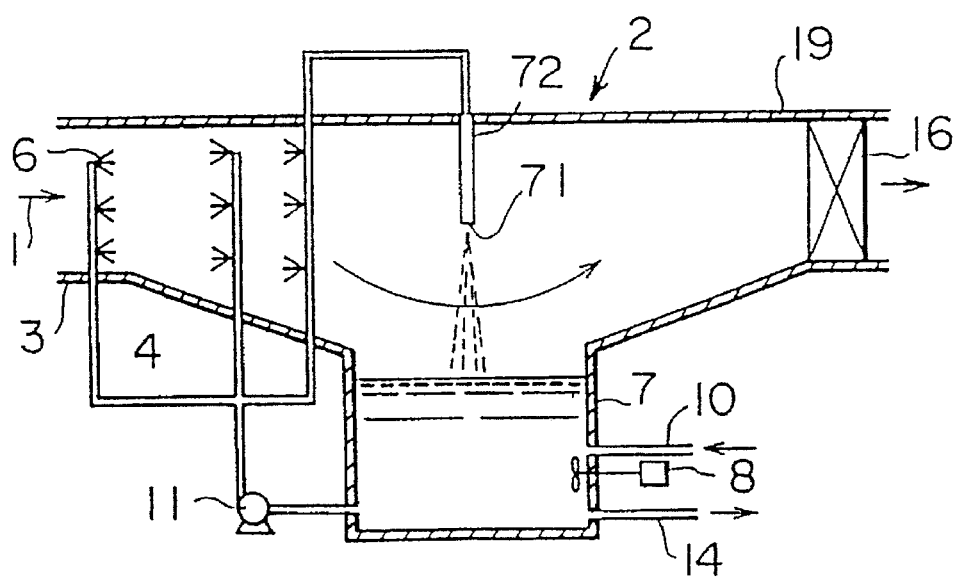
FIG. 49 is a cross-sectional view of a modification to the plant shown in FIG. 48.

In the embodiment shown in FIG. 49, a partition plate 72 is mounted on the ceiling of the circulation tank 7, so that a portion of the exhaust gas flowing between the ceiling of the circulation tank 7 and the liquid surface, as shown in FIG. 48, is blocked, forcing the exhaust gas to flow in the vicinity of the liquid surface. A mist-removing spray nozzle 71 is mounted on the lower end of the partition plate 72. Thus, by using the partition plate 72 to force the exhaust gas to flow more in the vicinity of the liquid surface than in the embodiment shown in FIG. 48, the mist is allowed to collide against the liquid surface of circulation tank 7 or the tower bottom wall by utilizing the inertial force of the mist. In the embodiment shown in FIG. 49, the gas flow velocity is increased when the exhaust gas 1 passes the group of droplets sprayed from the mist-removing spray nozzle 71, as compared with the embodiment shown in FIG. 48 and, hence, the inertial force of the spray droplets in the exhaust gas 1 is also increased, and the removal of the scattered mist by the spray droplets in the exhaust gas is improved.

Figure 52:
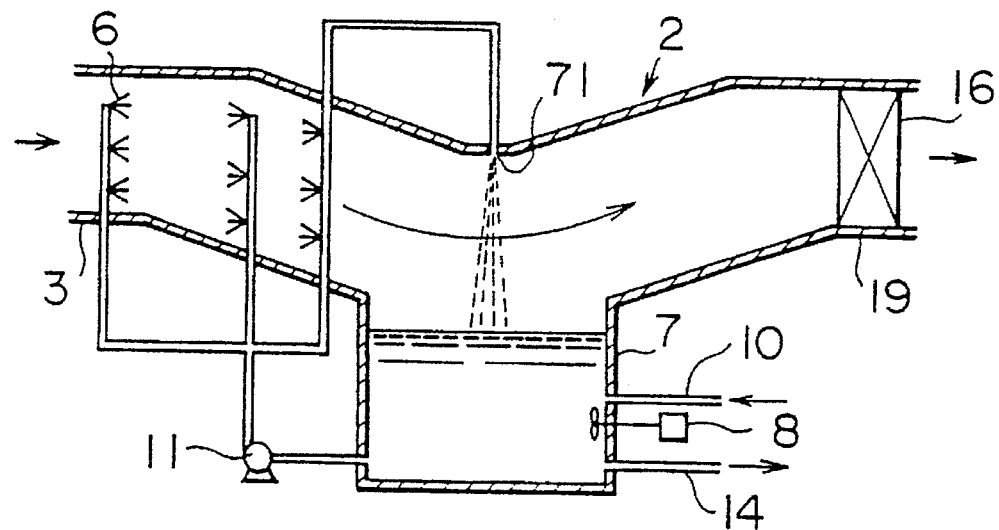
FIG. 52 is a cross-sectional view of a further modification to the plant shown in FIG. 48.

In the embodiment shown in FIG. 52, the ceiling of circulation tank 7 is lowered, instead of using the partition plate 72 as shown in FIG. 49, so that a portion of the ceiling is closer to the liquid surface in the circulation tank 7, and a mist-removing spray nozzle 71 is mounted on that ceiling portion closer to the liquid surface. Thus, as in the embodiment shown in FIG. 49, it is possible to further enhance the effect of removing scattered mist from exhaust gas 1.

According to the embodiments shown in FIGS. 48, 49 and 52, no structure for removing the scattered mist is placed upstream of the demister 16 and hence, it is possible to reduce the cost of equipment, to reduce the pressure drop within the absorber tower 2 and to save the power consumption of a desulfurizing fan. Therefore, it is possible to provide a compact structure for the absorber tower 2 by an increase in gas flow velocity.

Eleventh Embodiment

The desulfurizing plant of this embodiment is a horizontal type, as shown in FIGS. 3 and 4, but has a different inlet duct 3. A schematic vertical sectional view (a view taken along line A—A in FIG. 4) of the inlet duct 3 and circulation tank 7 is shown in FIG. 53, and a schematic sectional view taken along line A—A in FIG. 53 is shown in FIG. 54, wherein parts or components having the same functions as those of the absorber tower 2 shown in FIGS. 3 and 4 are designated by the same reference numerals as in FIGS. 3 and 4, and the description thereof is omitted.

Figure 53:
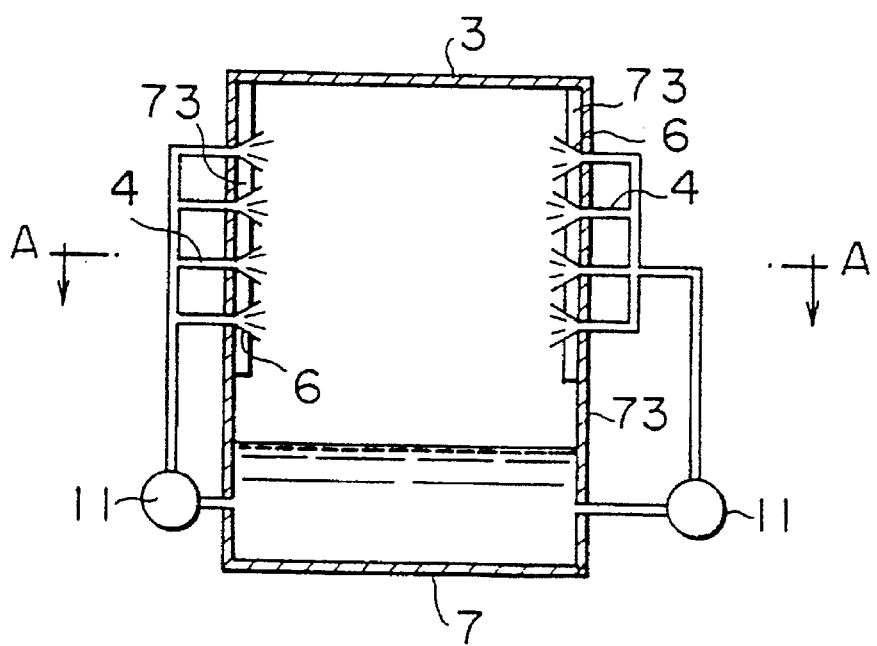
FIG. 53 is a cross-sectional view of a wet-type flue gas desulfurizing plant according to an eleventh embodiment of the present invention, as viewed in the direction of gas flow.
Figure 54:
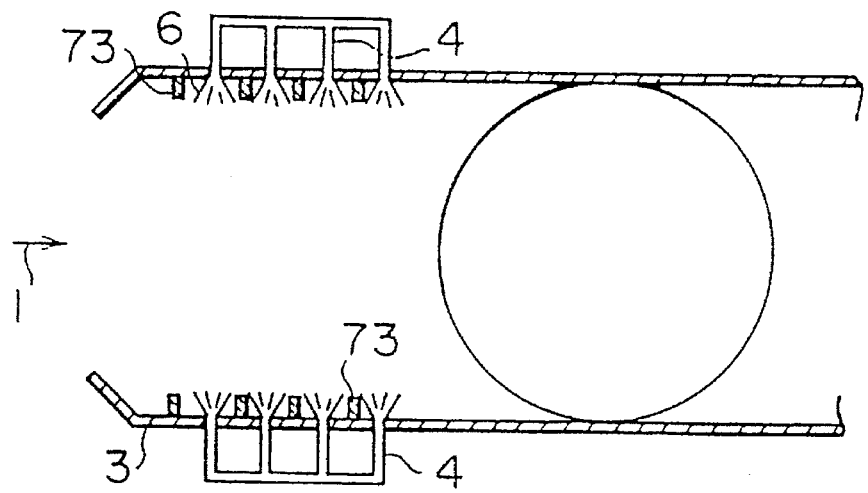
FIG. 54 is a cross-sectional view taken along line A—A in FIG. 53.

As shown in FIGS. 53 and 54, spray nozzles 6 are mounted at multiple stages on opposing sidewalls of the inlet duct 3 which has a square tubular shape (or which may be of a rounded tubular shape) and, hence, spray pipes 4 can be placed outside the inlet duct 3. Thus, there is no corrosion of outer surfaces of the spray pipes 4, and supports for supporting the spray pipes 4 and the spray nozzles 6 are not required. Further, fittings for the spray nozzles 6 can be provided outside the absorber tower 2 and, hence, there is no corrosion, and an inexpensive material can be used. Yet further, an increase in the pressure drop of the flow of sprayed droplets, due to inserts such as fittings for the spray nozzles 6, is not observed.

However, if the spray nozzles 6 are merely mounted on the sidewalls of the inlet duct 3, the spray pattern spreads conically from the spray nozzle 6 as an apex and, for this reason, a region in which sprayed droplets of the absorbing liquid are not present is formed between the spray nozzles 6. Thus, a portion of gas in the inlet duct 3 is not brought into contact with the absorbing liquid and blows through the absorber tower 2, resulting in a reduced exhaust gas desulfurizing performance on the whole. Therefore, as shown in in FIGS. 53 and 54, gas blow-through preventing plates 73 are mounted at multiple stages between the spray nozzles 6 disposed at multiple stages on the sidewalls of the inlet duct 3, thereby ensuring that the exhaust gas can be prevented from blowing through a clearance defined between the sprayed droplets spread conically and the sidewall inner surface of the inlet duct 3. The gas blow-through preventing plates 73 are turned in the direction of travel of the droplets sprayed from the spray nozzles 6. Moreover, the width of the gas blow-through preventing plates 73 in the direction of the spray is limited to that region in which there is no spray. Therefore, the spraying of the droplets is not hindered.

Figure 55:
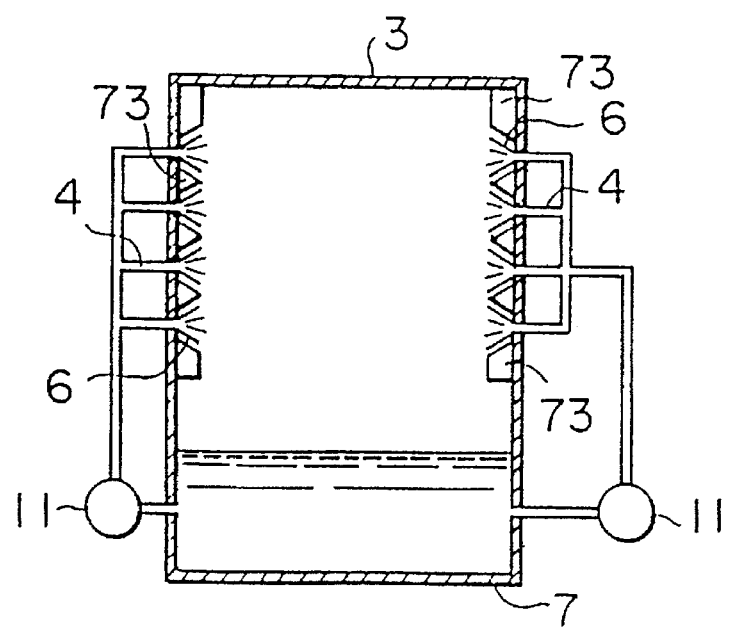
FIGS. 55, 56 and 57 are cross-sectional views of modifications to the plant shown in FIGS. 53 and 54.

The embodiment shown in FIG. 55 is a modification of the embodiment shown in FIG. 53, the difference from the embodiment shown in FIG. 53 being in the configuration of the gas blow-through preventing plates 73. The gas blow-through preventing plates 73 are mounted at a plurality of stages on sidewalls of inlet duct 3 between the stages of the spray nozzles 6, and extend along the angle formed by the spray pattern from the spray nozzles 6. In this case, the width of the gas blow-through preventing plate 73 in the direction of droplets sprayed is limited to the region outside the spray pattern and therefore, it prevents the exhaust gas from blowing through, between the spray nozzles 6.

Figure 56:
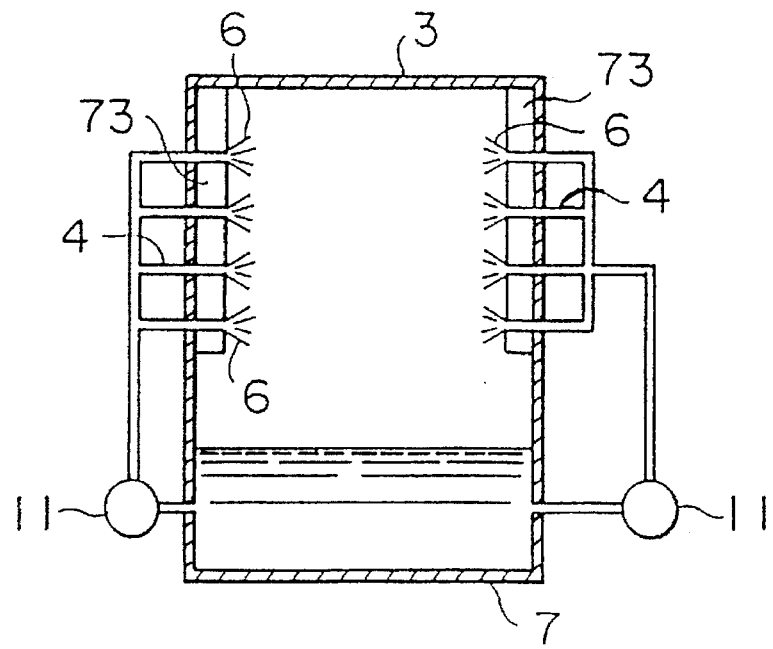

One modification of the embodiment shown in FIG. 53 is shown in FIG. 56. In this modification, spray nozzles 6 are mounted at locations of the same height as the multi-stage gas blow-through preventing plates 73 mounted on sidewalls of an inlet duct 3, so that their tip ends face the inner ends of the preventing plates 73, thereby preventing the blowing-through of the exhaust gas 1.

Figure 57:
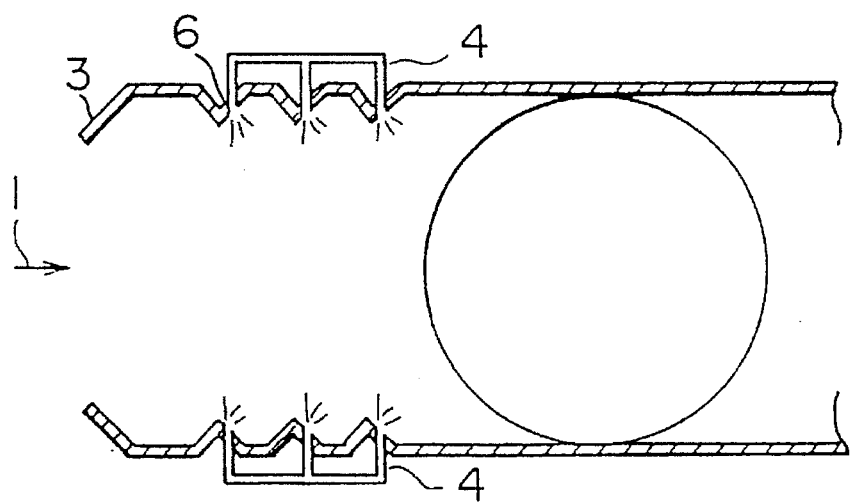

Another alternative embodiment having a similar object is shown in FIG. 57. In this alternative embodiment, portions of a sidewall of an inlet duct 3 are bent inwardly to define vertical recessed grooves. Spray nozzles 6 are mounted on lower slanted portions of the recessed grooves, respectively, as shown in FIG. 57, whereby absorbing liquid can be sprayed cocurrently with the gas flow. Moreover, spray nozzles 6 downstream in the inlet duct 3 may be mounted on upper slanted portions of the recessed grooves, whereby an absorbing liquid can be sprayed countercurrent to the gas flow. If the spray nozzles 6 are provided at a single stage, then a region in which sprayed droplets are not present is created between spray nozzles 6 upon spraying of the absorbing liquid from the spray nozzles 6. However, by disposing the spray nozzles 6 at two or more stages and arranging the upstream and lowerstream spray nozzles 6 in a vertically zigzag pattern, such regions in which the sprayed droplets are not present can be eliminated.

Although the gas blow-through preventing plates 73 or the recessed grooves are provided or defined vertically on or in the sidewalls of the inlet duct 3 in the above embodiments, it should be appreciated that these gas blow-through preventing means may be provided on a horizontal portion of the sidewalls of the inlet duct 3 or a portion thereof inclined at a predetermined angle from the vertical. In this case, the absorbing liquid may be supplied from the same spray pipe 4 into the group of the spray nozzles 6 in a horizontal direction or a direction inclined at the predetermined angle from the vertical.

Twelfth Embodiment

Figure 58:
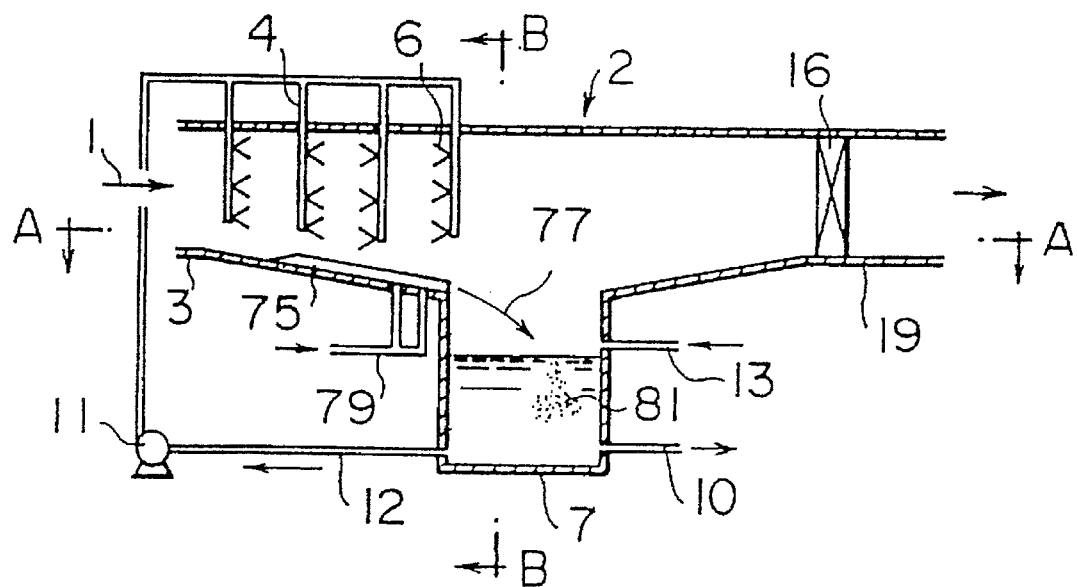
FIG. 58 is a schematic view, in cross-section, of a wet-type flue gas desulfurizing plant according to a twelfth embodiment of the present invention.

This embodiment is shown in FIGS. 58 to 62. In the horizontal desulfurizing plant shown in FIG. 58 with an inclined bottom in absorber tower 2, most of the liquid sprayed from spray nozzles 6 drops onto the bottom of inlet duct 3, where it is collected and delivered to circulation tank 6. By providing a weir 75 or a groove 76 (FIG. 61) at an inclined portion of such bottom, as shown in FIG. 58, the sprayed absorbing liquid is collected by the weir 75. By placing the weir 75 at a location displaced from the center of the bottom of the absorber tower 2 toward the wall (see FIG. 59), the absorbing liquid dropped from the inclined portion is dropped in a direction tangential to the side wall circle of circulation tank 7, so that the liquid in the circulation tank 7 is circulated without agitation by the energy of the falling liquid 77.

Usually, the requirement for circulating the liquid within the circulation tank 7 can be satisfied by using agitators having the capability of agitating about one half of the amount of liquid (per minute) present in the circulation tank 7. However, the volume of the circulation tank 7 may be too large to allow for adequate agitation of the liquid held in the circulation tank 7 by the energy of the falling absorbing liquid alone. In this case, it is necessary to place agitators in the circulation tank 7, as in the prior art. But given a short residence time of the liquid in the circulation tank 7, it is possible to sufficiently circulate the liquid without placing an agitator in the circulation tank 7.

According to this embodiment, agitators for dispersing air supplied to the circulation tank 7 can be eliminated, leading to a simplified structure of the circulation tank 7 and further to a reduced power cost.

Further, the amount of air supplied to the circulation tank 7 can be also reduced by supplying oxidizing air through a bottom air-pipe 79 to an inclined portion of a bottom of the inlet duct 3 where the liquid is moved violently, or by supplying the oxidizing air through an air pipe 80 to a portion near the liquid surface in the circulation tank 7. Oxygen in the air supplied through the bottom air-pipe 79 is dissolved as dissolved oxygen in the absorbing liquid by the intense flow of the liquid, to oxidize the calcium bisulfite in the liquid. The air supplied to the portion near the liquid surface in the circulation tank 7 is included in the liquid as bubbles 81 and thus, the oxidation of calcium bisulfite is further advanced. In this manner, it is possible to reduce the amount of air supplied through an air blowing pipe 10 by supplying air to the inclined portion of the bottom of the inlet duct 3 where the liquid is moved violently, or to the portion near the liquid surface in the circulation tank 7.

Figure 59:
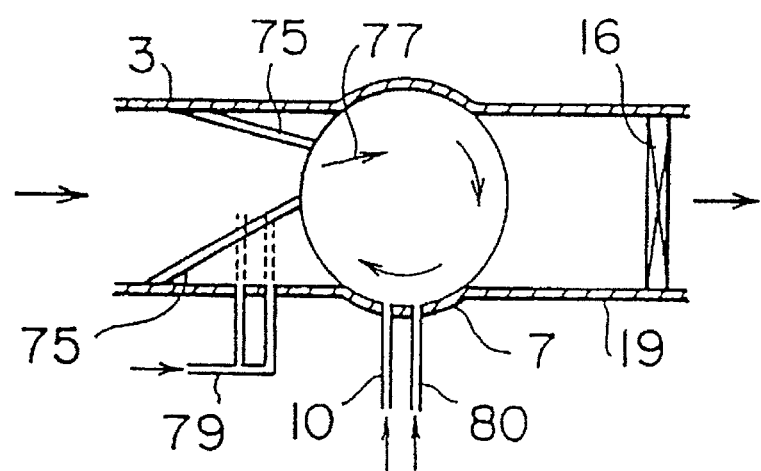
FIG. 59 is a cross-sectional view taken along line A—A in FIG. 58.

In FIG. 59, the structure of the bottom is shown in a sectional view taken along line A—A in FIG. 58. In this embodiment, the horizontal section of the circulation tank 7 is circular, but is not limited thereto and may be, for example, rectangular. The absorbing liquid sprayed from the spray nozzles 6, after absorbing $SO_2$ gas, drops onto the inclined portion of the bottom of inlet duct 3 of the absorber tower 2, is redirected by the weir 75 placed at a location displaced from the center of the absorber tower 2 toward the sidewall, and enters circulation tank in a direction tangent to the circular side wall of circulation tank 7. By permitting the liquid 77 to drop into the circulation tank 7 in this manner, the liquid in the circulation tank 7 can be circulated by the energy of the falling liquid 77. In addition, the gypsum particles produced by desulfurization cannot be accumulated on the bottom of the circulation tank 7 due to the circulation of the liquid.

Figure 60:
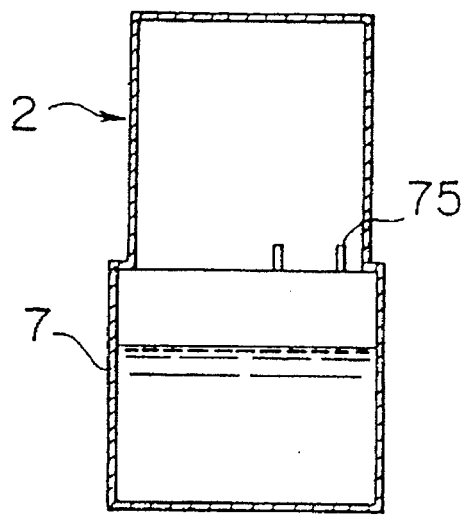
FIG. 60 is a cross-sectional view taken along line B—B in FIG. 58.

A section taken along line B—B in FIG. 58 is shown in FIG. 60. The weir 75 is placed on the inclined portion of the bottom of the absorber tower 2 and is displaced from the center of the absorber tower 2 toward the sidewall and, therefore, the liquid 77 drops in a direction (see FIG. 59) tangent to the circular side wall of circulation tank 7.

Figure 61:
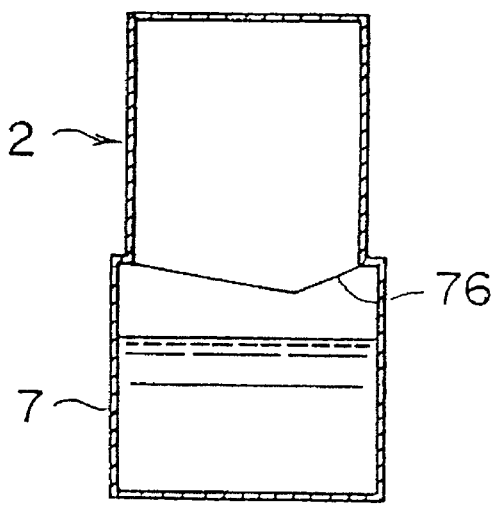
FIG. 61 is a cross-sectional view of a modification to the desulfurizing plant shown in FIG. 60.
Figure 62:
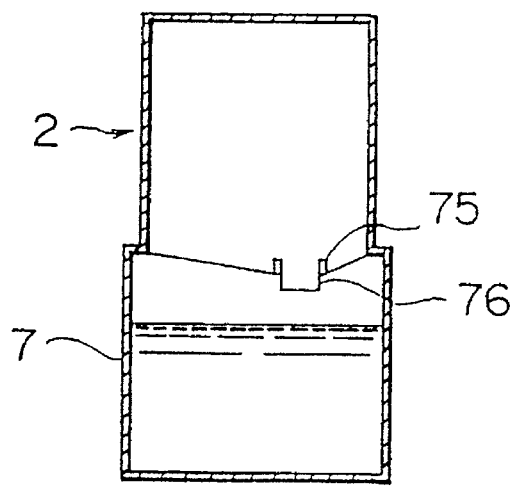
FIG. 62 is a cross-sectional view of a modification to the desulfurizing plant shown in FIG. 60.

In FIG. 61 an embodiment is shown as a view taken along line B—B in FIG. 58, wherein a groove 76 is provided in an inclined portion of a bottom of an absorber tower 2. In the embodiment shown in FIG. 61, the groove 76 is disposed at a location displaced from the center of the bottom of the absorber tower 2 toward the sidewall, as is the weir 75 shown in FIG. 60. An embodiment is shown in FIG. 62 (which is similar to the view taken along a line B—B in FIG. 58), in which both a weir 75 and a groove 76 are provided on the bottom of absorber tower 2.

As discussed above, the utilization of the present invention enables agitators, which would otherwise be required in the circulation tank 7, to be eliminated, leading to a simplified design for the circulation tank 7 and further to a reduction of power cost. In addition, it is possible to reduce the amount of air supplied to the circulation tank 7 by supplying the oxidizing air to the inclined portion of the bottom of the absorber tower 2 where the liquid is moved violently, and/or the portion near the liquid surface of the circulation tank 7.

What is claimed is:

1. A wet-type flue gas desulfurization plant comprising:
    an absorber housing defining a gas flow path therein in a direction which is not vertical and including a central area, an inlet duct upstream from said central area for admission of an exhaust gas containing sulfur oxides and an outlet duct downstream of said central area;
    spray means, located within said inlet duct and defining a spraying zone therein, for spraying an absorbing liquid into contact with the exhaust gas, said spray means including plural spray nozzles arrayed within said inlet duct along said gas flow path;

a demister mounted in said outlet duct for removing mist;

a circulation tank for receiving and storing absorbing liquid dropping from the absorber housing and for oxidizing sulfur oxides contained in the stored absorbing liquid with air, while the absorbing liquid is being stored, said central area being that area within said absorber housing located directly above said circulation tank, wherein said inlet duct includes a bottom wall having an inclined portion which is inclined downward toward said circulation tank and which extends along said gas flow path coextensive with said arrayed spray nozzles;

circulating means for returning the stored absorbing liquid to said spray means in the inlet duct of said absorber housing; and wherein said absorber housing, including the inlet and outlet ducts, is integral with and supported by the circulation tank.

2. A wet-type flue gas desulfurization plant according to claim 1, wherein the cross-sectional area of the inlet duct perpendicular to the gas flow path is stepwise increased in the direction of gas flow, and the inlet duct has a downstream end with a cross-sectional area perpendicular to the gas flow smaller than the cross-sectional area, perpendicular to the gas flow, of the gas flow path located in said central area between the inlet and outlet ducts and above the circulation tank.

3. A wet-type flue gas desulfurization plant according to claim 1, wherein the spray means further includes spray pipes on which said plural spray nozzles are mounted, said spray pipes having opposing ends supported by sidewalls of the inlet duct and horizontally traversing the gas flow path in the inlet duct.

4. A wet-type flue gas desulfurization plant according to claim 1, further comprising diversion means for diverting the gas flow path downwardly between the inlet and outlet ducts.

5. A wet-type flue gas desulfinization plant according to claim 4, wherein said diversion means is a baffle plate extending downwardly from a top portion of the circulation tank.

6. A wet-type flue gas desulfurization plant according to claim 1, further comprising a limestone slurry, means for removing the absorbing liquid from the circulation tank and neutralizing it with said limestone slurry, the limestone in said limestone slurry having a particle size greater than that of gypsum obtained by neutralizing the absorbing liquid with the limestone slurry, and means for neutralizing the absorbing liquid with the limestone slurry, and means for recirculating the neutralized liquid to said spray means in the inlet duct.

7. A wet-type flue gas desulfurization plant according to claim 1, wherein said spray means further includes a plurality of spray pipes on which said plural spray nozzles are mounted and wherein the inside diameter of said each spray pipe at a central portion in the inlet duct is smaller than that at other portions, and further comprising supports for said central portions.

8. A wet-type flue gas desulfurization plant according to claim 1, wherein said spray means further includes a plurality of spray pipes on which said plural spray nozzles are mounted and wherein said each spray pipe has spray nozzles mounted thereon for emission of spray at a level lower than the pipe.

9. A wet-type flue gas desulfurization plant according to claim 1, wherein said plural spray nozzles include spray nozzles in the vicinity of the wall surface of the inlet duct which are turned away from said inlet duct wall surface.

10. A wet-type flue gas desulfurization plant according to claim 1, further comprising means for supplying air into the absorbing liquid collected on the inclined bottom of the inlet duct or to a point near the liquid surface in the circulation tank where the liquid moves violently.

11. A wet-type flue gas desulfurization plant comprising an absorber housing defining a gas flow path therein in a direction which is not vertical and including an inlet duct for admission of an exhaust gas containing sulfur oxides and spray means, located within said inlet duct and defining a spraying zone therein, for spraying an absorbing liquid into contact with the exhaust gas, and an outlet duct having a demister for removing mist;

a circulation tank for receiving and storing absorbing liquid dropping from the absorber housing and for oxidizing sulfur oxides in the absorbing liquid with air, while the absorbing liquid is being stored;

circulating means for returning the stored absorbing liquid to said spray means in the inlet duct of said absorber housing; and wherein said spray means includes first spray nozzles in an upstream spraying stage of the spraying zone oriented for spraying the absorbing liquid in a direction cocurrent with the exhaust gas flow, and second spray nozzles in a downstream spraying stage of the spraying zone for spraying the absorbing liquid in a direction countercurrent to the exhaust gas flow.

12. A wet-type flue gas desulfurization plant according to claim 11, wherein the cross-sectional area of the inlet duct perpendicular to the gas flow path is stepwise increased in the direction of gas flow, and the inlet duct has a downstream end with a cross-sectional area perpendicular to the gas flow smaller than the cross-sectional area, perpendicular to the gas flow, of the gas flow path located between the inlet and outlet ducts and above the circulation tank.

13. A wet-type flue gas desulfurization plant according to claim 11, wherein the spray means comprises spray pipes, said spray pipes having opposing ends supported by sidewalls of the inlet duct and horizontally traversing the gas flow path in the inlet duct.

14. A wet-type flue gas desulfurization plant according to claim 11, further comprising diversion means for diverting the gas flow path downwardly between the inlet and outlet ducts.

15. A wet-type flue gas desulfurization plant according to claim 11, further comprising means for removing the absorbing liquid from the circulation tank and neutralizing it with limestone having a particle size greater than that of gypsum obtained by neutralizing the absorbing liquid with the limestone, and means for neutralizing the absorbing liquid with the limestone, and means for recirculating the neutralized liquid to said spray means in the inlet duct.

16. A wet-type flue gas desulfurization plant comprising:

an absorber housing defining a gas flow path therein in a direction which is not vertical and including a central area, an inlet duct upstream from said central area for admission of an exhaust gas containing sulfur oxides and spray means, located within said inlet duct and including plural spray nozzles arrayed along said gas flow path to define a spraying zone in said inlet duct, for spraying an absorbing liquid into contact with the exhaust gas, and an outlet duct located downstream of said central area and having a demister for removing mist;

a circulation tank for receiving and storing absorbing liquid dropping from the absorber housing and for oxidizing sulfur oxides in the absorbing liquid with air, while the absorbing liquid is being stored, said central area being that area within said absorber housing located directly above said circulation tank, wherein said inlet duct includes a bottom wall having an inclined portion which is inclined downward toward said circulation tank and which extends along said gas flow path coextensive with said arrayed spray nozzles;

circulating means for returning the stored absorbing liquid to the inlet duct of the absorber housing; and wherein the cross-sectional area, perpendicular to the gas flow path, of the inlet duct is stepwise increased in the direction of gas flow, and the inlet duct has a downstream end with a cross-sectional area perpendicular to the gas flow smaller than the cross-sectional area, perpendicular to the gas flow, of the gas flow path located in said central area between the inlet and outlet ducts and above the circulation tank.

17. A wet-type flue gas desulfurization plant according to claim 16, wherein said spray means further includes spray pipes having said plural spray nozzles mounted thereon and arranged in a plurality of stages in the gas flow direction and, wherein said plural spray nozzles in each stage include a lowermost spray nozzle, said lowermost spray nozzles being arranged in substantially the same horizontal plane.

18. A wet-type flue gas desulfurization plant according to claim 16, further comprising resisting means, located in the gas flow path between the spray pipes and the demister, for providing an impact surface for spray droplets entrained in the gas flow and for thereby collecting the entrained spray as a liquid film on the impact surface.

19. A wet-type flue gas desulfurization plant according to claim 16, wherein said plural spray nozzles are mounted on a wall surface of the inlet duct, and further comprising gas blow-through preventing means, mounted on a portion of the wall surface which is located between the spray nozzles and extending into a region free from sprayed droplets, for preventing gas flow through said region.

20. A wet-type flue gas desulfurization plant according to claim 16, further comprising spray nozzles mounted on a ceiling portion of the circulation tank for spraying the absorbing liquid toward the liquid surface of the absorbing liquid stored in the circulation tank.

21. A wet-type flue gas desulfurization plant according to claim 16, wherein said spray means further includes spray pipes on which said plural spray nozzles are mounted, said spray pipes having opposing ends supported by sidewalls of the inlet duct and horizontally transversing the gas flow path in the inlet duct.

22. A wet-type flue gas desulfurization plant according to claim 16, further comprising diversion means for diverting the gas flow path downwardly between the inlet and outlet ducts.

23. A wet-type flue gas desulfinization plant according to claim 22, wherein said diversion means is a baffle plate extending downwardly from a top portion of the circulation tank.

24. A wet-type flue gas desulfurization plant according to claim 16 further comprising a limestone slurry, means for removing the absorbing liquid from the circulation tank and neutralizing it with said limestone slurry, the limestone in said limestone slurry having a particle size greater than that of the gypsum obtained by neutralizing the absorbing liquid with the limestone slurry, and means for recirculating the neutralized liquid to said spray means in the inlet duct.

25. A wet-type flue gas desulfurization plant comprising:

an absorber housing defining a gas flow path therein in a direction which is not vertical and including a central area, an inlet duct upstream from said central area for admission of an exhaust gas containing sulfur oxides and spray means, located within said inlet duct and including plural spray nozzles arrayed along said gas flow path to define a spraying zone in said inlet duct, for spraying an absorbing liquid into contact with the exhaust gas, and an outlet duct located downstream of said central area and having a demister for removing mist;

a circulation tank for receiving and storing absorbing liquid dropping from the absorber housing and for oxidizing sulfur oxides contained in the stored absorbing liquid with air, while the absorbing liquid is being stored, said central area being that area within said absorber housing located directly above said circulation tank, wherein said inlet duct includes a bottom wall having an inclined portion which is inclined downward toward said circulation tank and which extends along said gas flow path coextensive with said arrayed spray nozzles;

circulating means for returning the stored absorbing liquid to said spray means in the absorber housing; and diversion means for diverting the gas flow path downwardly in said central area between the inlet and outlet ducts.

26. A wet-type flue gas desulfinization plant according to claim 25, wherein said diversion means is a baffle plate extending downwardly from a top portion of the circulation tank.

27. A wet-type flue gas desulfurization plant comprising:

a limestone slurry;

an absorber housing defining a gas flow path therein in a direction which is not vertical and including a central area, an inlet duct for admission of an exhaust gas containing sulfur oxides and spray means, located within said inlet duct and including plural spray nozzles arrayed along said gas flow path to define a spraying zone in said inlet duct, for spraying an absorbing liquid into contact with the exhaust gas, and an outlet duct located downstream of said central area and having a demister for removing mist;

a circulation tank for receiving and storing absorbing liquid dropping from the absorber housing and for oxidizing sulfur oxides contained in the absorbing liquid with air, while the absorbing liquid is being stored, said central area being that area within said absorber housing located directly above said circulation tank, wherein said inlet duct includes a bottom wall having an inclined portion which is inclined downward toward said circulation tank and which extends along said gas flow path coextensive with said arrayed spray nozzles;

circulating means for returning the stored absorbing liquid to said spray means in the inlet duct of said absorber housing; and means for removing the absorbing liquid from the circulation tank and neutralizing it with said limestone slurry, the limestone in said limestone slurry having a particle size greater than that of the gypsum obtained by neutralizing the absorbing liquid with the limestone slurry; and means for recirculating the neutralized liquid to said spray means in the inlet duct.

28. A wet-type flue gas desulfurization plant comprising:

an absorber housing defining a gas flow path therein in a direction which is not vertical and including an inlet duct for admission of an exhaust gas containing sulfur oxides and spray means, said spray means including plural spray nozzles arranged in spaced stages arrayed along a portion of the gas flow path located within said inlet duct and defining a spraying zone in said inlet duct, for spraying an absorbing liquid into contact with the exhaust gas, and an outlet duct having a demister for removing mist;

a circulation tank for receiving and storing absorbing liquid dropping from the absorber housing and for oxidizing sulfur oxides contained in the stored absorbing liquid with air, while the absorbing liquid is being stored;

circulating means for returning the stored absorbing liquid to said spray means in the inlet duct of said absorber housing;

wherein said spray means comprises spray nozzles mounted on a wall surface of the inlet duct; and gas blow-through preventing means mounted on said wall surface at locations between said spaced stages and extending from said wall surface through a region free from sprayed droplets, for preventing gas flow through said region.

29. A wet-type flue gas desulfurization plant according to claim 28, wherein said absorber housing including the inlet and outlet ducts is integral with and supported by said circulation tank.

30. A wet-type flue gas desulfurization plant according to claim 28, wherein said inlet duct includes a bottom wall having an inclined portion which is inclined downward toward said circulation tank.

31. A wet-type flue gas desulfurization plant according to claim 28, further comprising diversion means for diverting the gas flow path downwardly between the inlet and outlet ducts.

32. A wet-type flue gas desulfurization plant according to claim 28, further comprising a limestone slurry, means for removing the absorbing liquid from the circulation tank and neutralizing it with said limestone slurry, the limestone in said limestone slurry having a particle size which is greater than that of the gypsum obtained by neutralizing absorbing liquid with the limestone slurry, and means for recirculating the neutralized liquid to the spray means in the inlet duct.

* * * * *